US006345017B1

(12) United States Patent
Inoue

(10) Patent No.: US 6,345,017 B1
(45) Date of Patent: Feb. 5, 2002

(54) REPRODUCING APPARATUS CAPABLE OF SUPPRESSING MECHANICAL NOISE DURING ACCESS OF SUB DATA AND MAIN DATA

(75) Inventor: Hiraku Inoue, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/449,724

(22) Filed: Nov. 24, 1999

(30) Foreign Application Priority Data

Nov. 26, 1998 (JP) .......................................... 10-336136

(51) Int. Cl.[7] ............................................... G11B 17/22
(52) U.S. Cl. ........................................... 369/33; 386/97
(58) Field of Search .......................... 369/33, 32, 47.1, 369/47.15, 47.16, 47.52; 386/97, 126

(56) References Cited

U.S. PATENT DOCUMENTS 6,072,936 A * 6/2000 Koyama ...................... 386/95
6,088,304 A * 7/2000 Aramaki et al. .............. 369/32
6,188,662 B1 * 2/2001 Maeda et al. ................. 369/83

FOREIGN PATENT DOCUMENTS

JP 11-232849 * 8/1999 .................. 369/32

* cited by examiner

*Primary Examiner*—Tan Dinh
(74) *Attorney, Agent, or Firm*—Frommer Lawrence & Haug LLP; William S. Frommer; Bruno Polito

(57) ABSTRACT

A playback apparatus allowing one of a variety of playback modes to be selected when playing back main data and/or sub-data from a disc-shaped recording medium. The playback apparatus is capable of suppressing the mechanical noise generated during access to a sub data area of the disc-shaped recording medium when the sub data area is separate from a main data area. The apparatus suppresses mechanical noise by prohibiting synchronous playback of the sub data when the user desires high quality audio playback.

7 Claims, 38 Drawing Sheets

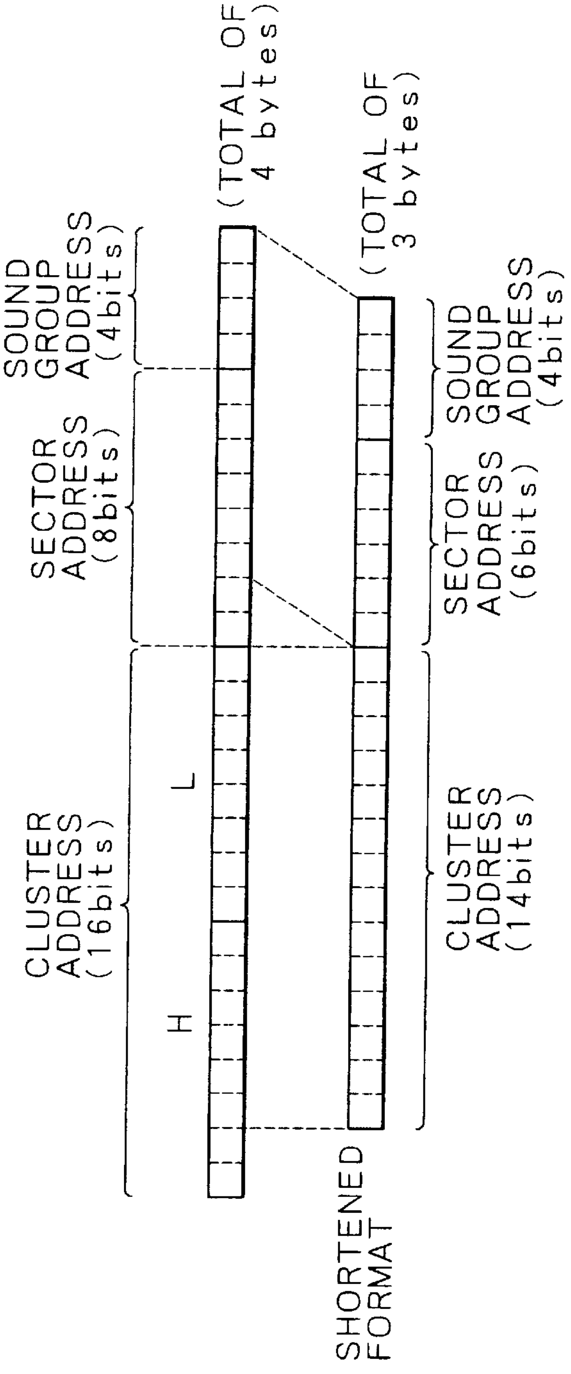
FIG.3A
FIG.3B
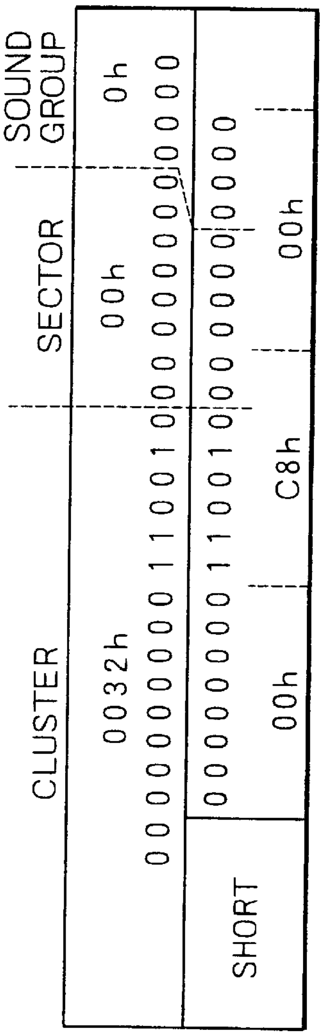
FIG.4A

FIG. 4B

| | CLUSTER | SECTOR | SOUND GROUP |
|---|---|---|---|
| | 0032h | 04h | 0h |
| | 0000000000110010 | 00000100 | 0000 |
| SHORTENED-FORMAT ABSOLUTE ADDRESS | 00000000110010 | 000100 | 0000 |
| | 00h C8h | 40h | |
| SHORTENED-FORMAT OFFSET ADDRESS | 00000000000000 | 000100 | 0000 |
| | 00h 00h | 40h | |

FIG. 4C

| | CLUSTER | SECTOR | SOUND GROUP |
|---|---|---|---|
| | 0032h | 13h | 9h |
| | 00 0000000000110010 | 00010011 | 1001 |
| SHORTENED-FORMAT ABSOLUTE ADDRESS | 00000000110010 | 010011 | 1001 |
| | 00h C9h | 39h | |
| SHORTENED-FORMAT OFFSET ADDRESS | 00000000000000 | 010011 | 1001 |
| | 00h 01h | 39h | |

FIG. 6

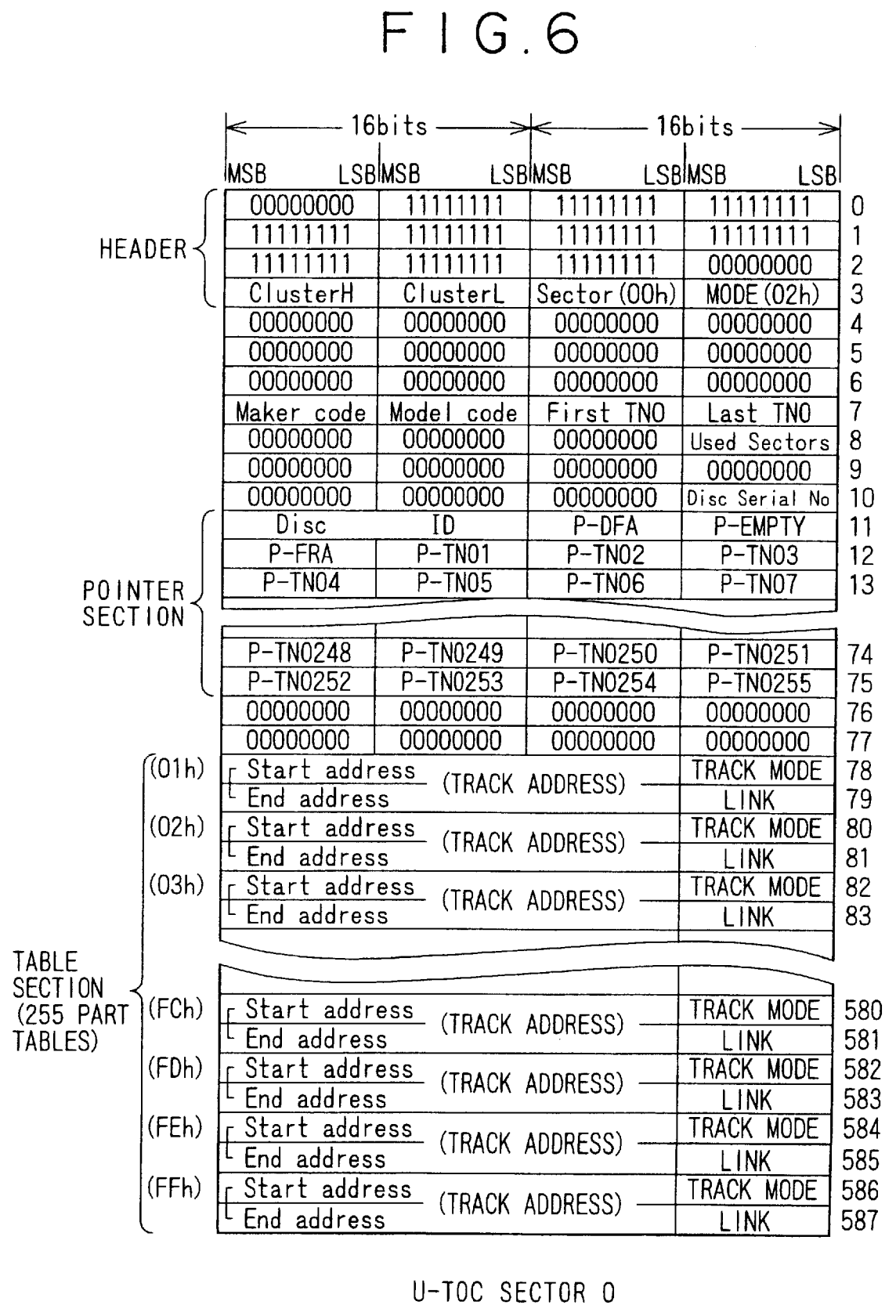

| | ← 16bits → | | ← 16bits → | | |
|---|---|---|---|---|---|
| | MSB LSB | MSB LSB | MSB LSB | MSB LSB | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector (00h) | MODE (02h) | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | Maker code | Model code | First TNO | Last TNO | 7 |
| | 00000000 | 00000000 | 00000000 | Used Sectors | 8 |
| | 00000000 | 00000000 | 00000000 | 00000000 | 9 |
| | 00000000 | 00000000 | 00000000 | Disc Serial No | 10 |
| POINTER SECTION | Disc | ID | P-DFA | P-EMPTY | 11 |
| | P-FRA | P-TN01 | P-TN02 | P-TN03 | 12 |
| | P-TN04 | P-TN05 | P-TN06 | P-TN07 | 13 |
| | … | … | … | … | |
| | P-TN0248 | P-TN0249 | P-TN0250 | P-TN0251 | 74 |
| | P-TN0252 | P-TN0253 | P-TN0254 | P-TN0255 | 75 |
| | 00000000 | 00000000 | 00000000 | 00000000 | 76 |
| | 00000000 | 00000000 | 00000000 | 00000000 | 77 |
| TABLE SECTION (255 PART TABLES) (01h) | Start address | (TRACK ADDRESS) | | TRACK MODE | 78 |
| | End address | (TRACK ADDRESS) | | LINK | 79 |
| (02h) | Start address | (TRACK ADDRESS) | | TRACK MODE | 80 |
| | End address | (TRACK ADDRESS) | | LINK | 81 |
| (03h) | Start address | (TRACK ADDRESS) | | TRACK MODE | 82 |
| | End address | (TRACK ADDRESS) | | LINK | 83 |
| | … | … | … | … | |
| (FCh) | Start address | (TRACK ADDRESS) | | TRACK MODE | 580 |
| | End address | (TRACK ADDRESS) | | LINK | 581 |
| (FDh) | Start address | (TRACK ADDRESS) | | TRACK MODE | 582 |
| | End address | (TRACK ADDRESS) | | LINK | 583 |
| (FEh) | Start address | (TRACK ADDRESS) | | TRACK MODE | 584 |
| | End address | (TRACK ADDRESS) | | LINK | 585 |
| (FFh) | Start address | (TRACK ADDRESS) | | TRACK MODE | 586 |
| | End address | (TRACK ADDRESS) | | LINK | 587 |

U-TOC SECTOR 0

FIG. 8

| Section | Slot | 16 bits (MSB–LSB) | (MSB–LSB) | 16 bits (MSB–LSB) | (MSB–LSB) | |
|---|---|---|---|---|---|---|
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | ClusterH | ClusterL | Sector (01h) | MODE | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | 00000000 | 00000000 | 00000000 | 00000000 | 7 |
| | | 00000000 | 00000000 | 00000000 | 00000000 | 8 |
| | | 00000000 | 00000000 | 00000000 | 00000000 | 9 |
| | | 00000000 | 00000000 | 00000000 | 00000000 | 10 |
| POINTER SECTION | | 00000000 | 00000000 | 00000000 | P-EMPTY | 11 |
| POINTER SECTION | | 00000000 | P-TNA1 | P-TNA2 | P-TNA3 | 12 |
| POINTER SECTION | | P-TNA4 | P-TNA5 | P-TNA6 | P-TNA7 | 13 |
| POINTER SECTION | | ⋮ | ⋮ | ⋮ | ⋮ | |
| POINTER SECTION | | P-TNA248 | P-TNA249 | P-TNA250 | P-TNA251 | 74 |
| POINTER SECTION | | P-TNA252 | P-TNA253 | P-TNA254 | P-TNA255 | 75 |
| SLOT SECTION OF (255+1) SLOTS | (00h) | DISC NAME | | | | 76 |
| SLOT SECTION OF (255+1) SLOTS | | DISC NAME | | | LINK | 77 |
| SLOT SECTION OF (255+1) SLOTS | (01h) | DISC NAME/TRACK NAME | | | | 78 |
| SLOT SECTION OF (255+1) SLOTS | | DISC NAME/TRACK NAME | | | LINK | 79 |
| SLOT SECTION OF (255+1) SLOTS | (02h) | DISC NAME/TRACK NAME | | | | 80 |
| SLOT SECTION OF (255+1) SLOTS | | DISC NAME/TRACK NAME | | | LINK | 81 |
| SLOT SECTION OF (255+1) SLOTS | (03h) | DISC NAME/TRACK NAME | | | | 82 |
| SLOT SECTION OF (255+1) SLOTS | | DISC NAME/TRACK NAME | | | LINK | 83 |
| SLOT SECTION OF (255+1) SLOTS | | ⋮ | | | | |
| SLOT SECTION OF (255+1) SLOTS | (FEh) | DISC NAME/TRACK NAME | | | | 584 |
| SLOT SECTION OF (255+1) SLOTS | | DISC NAME/TRACK NAME | | | LINK | 585 |
| SLOT SECTION OF (255+1) SLOTS | (FFh) | DISC NAME/TRACK NAME | | | | 586 |
| SLOT SECTION OF (255+1) SLOTS | | DISC NAME/TRACK NAME | | | LINK | 587 |

U-TOC SECTOR 1

FIG. 9

| Section | Slot | 16bits: MSB … LSB | MSB … LSB | 16bits: MSB … LSB | MSB … LSB | Row |
|---|---|---|---|---|---|---|
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | ClusterH | ClusterL | Sector (02h) | MODE | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | 00000000 | 00000000 | 00000000 | 00000000 | 7 |
| | | 00000000 | 00000000 | 00000000 | 00000000 | 8 |
| | | 00000000 | 00000000 | 00000000 | 00000000 | 9 |
| | | 00000000 | 00000000 | 00000000 | 00000000 | 10 |
| POINTER SECTION | | 00000000 | 00000000 | 00000000 | P-EMPTY | 11 |
| POINTER SECTION | | 00000000 | P-TRD1 | P-TRD2 | P-TRD3 | 12 |
| POINTER SECTION | | P-TRD4 | P-TRD5 | P-TRD6 | P-TRD7 | 13 |
| POINTER SECTION | | … | … | … | … | |
| POINTER SECTION | | P-TRD248 | P-TRD249 | P-TRD250 | P-TRD251 | 74 |
| POINTER SECTION | | P-TRD252 | P-TRD253 | P-TRD254 | P-TRD255 | 75 |
| SLOT SECTION OF (255+1) SLOTS | (00h) | DISC RECORDING TIME AND DATE | | | | 76 |
| SLOT SECTION OF (255+1) SLOTS | | | | MAKER CODE | MODEL CODE | 77 |
| SLOT SECTION OF (255+1) SLOTS | (01h) | TRACK RECORDING TIME AND DATE | | | | 78 |
| SLOT SECTION OF (255+1) SLOTS | | | | MAKER CODE | MODEL CODE | 79 |
| SLOT SECTION OF (255+1) SLOTS | (02h) | TRACK RECORDING TIME AND DATE | | | | 80 |
| SLOT SECTION OF (255+1) SLOTS | | | | MAKER CODE | MODEL CODE | 81 |
| SLOT SECTION OF (255+1) SLOTS | (03h) | TRACK RECORDING TIME AND DATE | | | | 82 |
| SLOT SECTION OF (255+1) SLOTS | | | | MAKER CODE | MODEL CODE | 83 |
| SLOT SECTION OF (255+1) SLOTS | | … | … | … | … | |
| SLOT SECTION OF (255+1) SLOTS | (FEh) | TRACK RECORDING TIME AND DATE | | | | 584 |
| SLOT SECTION OF (255+1) SLOTS | | | | MAKER CODE | (LINK) | 585 |
| SLOT SECTION OF (255+1) SLOTS | (FFh) | TRACK RECORDING TIME AND DATE | | | | 586 |
| SLOT SECTION OF (255+1) SLOTS | | | | MAKER CODE | (LINK) | 587 |

U-TOC SECTOR 2

FIG.10

| Section | Slot | 16bits: MSB–LSB | 16bits: MSB–LSB | 16bits: MSB–LSB | 16bits: MSB–LSB | Row |
|---|---|---|---|---|---|---|
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | ClusterH | ClusterL | Sector (04h) | MODE | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | 00000000 | 00000000 | 00000000 | 00000000 | 7 |
| | | 00000000 | 00000000 | 00000000 | 00000000 | 8 |
| | | 00000000 | 00000000 | 00000000 | 00000000 | 9 |
| | | 00000000 | 00000000 | 00000000 | char.code | 10 |
| | | 00000000 | 00000000 | 00000000 | P-EMPTY | 11 |
| POINTER SECTION | | 00000000 | P-TNA1 | P-TNA2 | P-TNA3 | 12 |
| POINTER SECTION | | P-TNA4 | P-TNA5 | P-TNA6 | P-TNA7 | 13 |
| POINTER SECTION | | P-TNA248 | P-TNA249 | P-TNA250 | P-TNA251 | 74 |
| POINTER SECTION | | P-TNA252 | P-TNA253 | P-TNA254 | P-TNA255 | 75 |
| SLOT SECTION OF (255+1) SLOTS | (00h) | DISC NAME | | | | 76 |
| SLOT SECTION OF (255+1) SLOTS | | DISC NAME | | | LINK | 77 |
| SLOT SECTION OF (255+1) SLOTS | (01h) | DISC NAME/TRACK NAME | | | | 78 |
| SLOT SECTION OF (255+1) SLOTS | | DISC NAME/TRACK NAME | | | LINK | 79 |
| SLOT SECTION OF (255+1) SLOTS | (02h) | DISC NAME/TRACK NAME | | | | 80 |
| SLOT SECTION OF (255+1) SLOTS | | DISC NAME/TRACK NAME | | | LINK | 81 |
| SLOT SECTION OF (255+1) SLOTS | (03h) | DISC NAME/TRACK NAME | | | | 82 |
| SLOT SECTION OF (255+1) SLOTS | | DISC NAME/TRACK NAME | | | LINK | 83 |
| SLOT SECTION OF (255+1) SLOTS | (FEh) | DISC NAME/TRACK NAME | | | | 584 |
| SLOT SECTION OF (255+1) SLOTS | | DISC NAME/TRACK NAME | | | LINK | 585 |
| SLOT SECTION OF (255+1) SLOTS | (FFh) | DISC NAME/TRACK NAME | | | | 586 |
| SLOT SECTION OF (255+1) SLOTS | | DISC NAME/TRACK NAME | | | LINK | 587 |

U-TOC SECTOR 4

FIG. 11

| | 16bits even m: Wm B | 16bits even m: Wm A | 16bits odd m: Wm B | 16bits odd m: Wm A | |
|---|---|---|---|---|---|
| | MSB LSB | MSB LSB | MSB LSB | MSB LSB | |
| | d1 d8 | d1 d8 | d1 d8 | d1 d8 | |
| HEADER | 00000000 | 11111111 | 11111111 | 11111111 | 0 |
| HEADER | 11111111 | 11111111 | 11111111 | 11111111 | 1 |
| HEADER | 11111111 | 11111111 | 11111111 | 00000000 | 2 |
| HEADER | ClusterH | ClusterL | Sector (00h) | MODE (02h) | 3 |
| | (00h) | (00h) | (00h) | (00h) | 4 |
| | (00h) | (00h) | (00h) | (00h) | 5 |
| | "M" | "D" | "A" | "D" | 6 |
| | (Maker code) | (Model code) | (00h) | (00h) | 7 |
| | Used Sector3 | Used Sector2 | Used Sector1 | Used Sector0 | 8 |
| | (00h) | (00h) | (00h) | (00h) | 9 |
| | (00h) | (00h) | (00h) | (00h) | 10 |
| POINTER SECTION | (00h) | (00h) | (00h) | (P-EMPTY) | 11 |
| POINTER SECTION | (P-BLANK) | (00h) | (00h) | (00h) | 12 |
| | (00h) | (00h) | (00h) | (00h) | 13 |
| | (00h) | (00h) | (00h) | (00h) | 14 |
| | (00h) | (00h) | (00h) | (00h) | 15 |
| | (00h) | (00h) | (00h) | (00h) | 16 |
| | | | | | |
| | (00h) | (00h) | (00h) | (00h) | 74 |
| | (00h) | (00h) | (00h) | (00h) | 75 |
| | (00h) | (00h) | (00h) | (00h) | 76 |
| | (00h) | (00h) | (00h) | (00h) | 77 |
| TABLE SECTION (99 PART TABLES) (01h) | Start address | | | (00h) | 78 |
| | End address | | | (LINK) | 79 |
| (02h) | Start address | | | (00h) | 80 |
| | End address | | | (LINK) | 81 |
| (03h) | Start address | | | (00h) | 82 |
| | End address | | | (LINK) | 83 |
| (04h) | Start address | | | (00h) | 84 |
| | End address | | | (LINK) | 85 |
| . | | | | | 86 |
| . | | | | | |
| . | | | | | |
| (63h) | Start address | | | (00h) | 274 |
| | End address | | | (LINK) | 275 |
| (64h) | (zeros) | | | | 276 |
| | (zeros) | | | | 277 |
| . | (zeros) | | | | |
| . | | | | | |
| . | | | | | |
| (FFh) | (zeros) | | | | 586 |
| | (zeros) | | | | 587 |

AUX-TOC SECTOR 0
(AREA ALLOCATION TABLE)

F I G.12

| | 16bits even m: Wm B | 16bits even m: Wm A | 16bits odd m: Wm B | 16bits odd m: Wm A | |
|---|---|---|---|---|---|
| | MSB LSB | MSB LSB | MSB LSB | MSB LSB | |
| | d1 d8 | d1 d8 | d1 d8 | d1 d8 | |
| HEADER | 00000000 | 11111111 | 11111111 | 11111111 | 0 |
| HEADER | 11111111 | 11111111 | 11111111 | 11111111 | 1 |
| HEADER | 11111111 | 11111111 | 11111111 | 00000000 | 2 |
| HEADER | ClusterH | ClusterL | Sector (01h) | MODE (02h) | 3 |
| | (00h) | (00h) | (00h) | (00h) | 4 |
| | (00h) | (00h) | (00h) | (00h) | 5 |
| | "M" | "D" | "A" | "D" | 6 |
| | (Maker code) | (Model code) | First PNO | Last PNO | 7 |
| | (00h) | (00h) | (00h) | (00h) | 8 |
| | (00h) | (00h) | (00h) | (00h) | 9 |
| | (00h) | (00h) | (00h) | (00h) | 10 |
| POINTER SECTION | (00h) | (00h) | (00h) | (P-EMPTY) | 11 |
| POINTER SECTION | (P-PFRA) | P-PN01 | P-PN02 | P-PN03 | 12 |
| POINTER SECTION | P-PN04 | P-PN05 | P-PN06 | P-PN07 | 13 |
| POINTER SECTION | P-PN092 | P-PN093 | P-PN094 | P-PN095 | 35 |
| POINTER SECTION | P-PN096 | P-PN097 | P-PN098 | P-PN099 | 36 |
| | (00h) | (00h) | (00h) | (00h) | 37 |
| | (00h) | (00h) | (00h) | (00h) | 74 |
| | (00h) | (00h) | (00h) | (P-PN0255) | 75 |
| TABLE SECTION ((99+1) PART TABLES) (00h) | Start address (cover picture) | | | S.Pict.MODE | 76 |
| | End address | | | (00h) | 77 |
| (01h) | Start address | | | S.Pict.MODE | 78 |
| | End address | | | (00h) | 79 |
| (02h) | Start address | | | S.Pict.MODE | 80 |
| | End address | | | (00h) | 81 |
| (03h) | Start address | | | S.Pict.MODE | 82 |
| | End address | | | (00h) | 83 |
| (04h) | Start address | | | S.Pict.MODE | 84 |
| . | End address | | | (00h) | 85 |
| . | | | | | 86 |
| . | | | | | |
| (63h) | Start address | | | (00h) | 274 |
| | End address | | | (LINK) | 275 |
| (64h) | (zeros) | | | | 276 |
| . | (zeros) | | | | 277 |
| . | (zeros) | | | | |
| . | | | | | |
| (FFh) | (zeros) | | | | 586 |
| | (zeros) | | | | 587 |

AUX-TOC SECTOR 1
(PICTURE ALLOCATION TABLE)

FIG.13

| Section | Slot | 16bits even m: Wm B (MSB d1 – LSB d8) | 16bits even m: Wm A (MSB d1 – LSB d8) | 16bits odd m: Wm B (MSB d1 – LSB d8) | 16bits odd m: Wm A (MSB d1 – LSB d8) | |
|---|---|---|---|---|---|---|
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | ClusterH | ClusterL | Sector (02h) | MODE (02h) | 3 |
| | | (00h) | (00h) | (00h) | (00h) | 4 |
| | | (00h) | (00h) | (00h) | (00h) | 5 |
| | | "M" | "D" | "A" | "D" | 6 |
| | | (Maker code) | (Model code) | First PIF | Last PIF | 7 |
| | | (00h) | (00h) | (00h) | (00h) | 8 |
| | | (00h) | (00h) | (00h) | (00h) | 9 |
| | | (00h) | (00h) | (00h) | char. code | 10 |
| POINTER SECTION | | (00h) | (00h) | (00h) | (P-EMPTY) | 11 |
| POINTER SECTION | | (00h) | P-PIF1 | P-PIF2 | P-PIF3 | 12 |
| POINTER SECTION | | P-PIF4 | P-PIF5 | P-PIF6 | P-PIF7 | 13 |
| POINTER SECTION | | P-PIF92 | P-PIF93 | P-PIF94 | P-PIF95 | 35 |
| POINTER SECTION | | P-PIF96 | P-PIF97 | P-PIF98 | P-PIF99 | 36 |
| | | (00h) | (00h) | (00h) | (00h) | 37 |
| | | (00h) | (00h) | (00h) | (00h) | 74 |
| | | (00h) | (00h) | (00h) | (P-PIF255) | 75 |
| TABLE SECTION ((255+1) SLOTS) | (00h) | Cover Picture information | | | | 76 |
| TABLE SECTION ((255+1) SLOTS) | | Cover Picture information | | | LINK | 77 |
| TABLE SECTION ((255+1) SLOTS) | (01h) | Cover Picture or still Picture information | | | | 78 |
| TABLE SECTION ((255+1) SLOTS) | | Cover Picture or still Picture information | | | LINK | 79 |
| TABLE SECTION ((255+1) SLOTS) | (02h) | Cover Picture or still Picture information | | | | 80 |
| TABLE SECTION ((255+1) SLOTS) | | Cover Picture or still Picture information | | | LINK | 81 |
| TABLE SECTION ((255+1) SLOTS) | (03h) | Cover Picture or still Picture information | | | | 82 |
| TABLE SECTION ((255+1) SLOTS) | | Cover Picture or still Picture information | | | LINK | 83 |
| TABLE SECTION ((255+1) SLOTS) | (04h) | Cover Picture or still Picture information | | | | 84 |
| TABLE SECTION ((255+1) SLOTS) | | Cover Picture or still Picture information | | | LINK | 85 |
| TABLE SECTION ((255+1) SLOTS) | · | | | | | 86 |
| TABLE SECTION ((255+1) SLOTS) | (63h) | Cover Picture or still Picture information | | | | 274 |
| TABLE SECTION ((255+1) SLOTS) | | Cover Picture or still Picture information | | | LINK | 275 |
| TABLE SECTION ((255+1) SLOTS) | (64h) | Cover Picture or still Picture information | | | | 276 |
| TABLE SECTION ((255+1) SLOTS) | | Cover Picture or still Picture information | | | LINK | 277 |
| TABLE SECTION ((255+1) SLOTS) | (FFh) | Cover Picture or still Picture information | | | | 586 |
| TABLE SECTION ((255+1) SLOTS) | | Cover Picture or still Picture information | | | LINK | 587 |

AUX-TOC SECTOR 2
(PICTURE INFORMATION TABLE)

FIG.14

| | | 16bits even m | | 16bits odd m | | |
|---|---|---|---|---|---|---|
| | | Wm B | Wm A | Wm B | Wm A | |
| | | MSB LSB | MSB LSB | MSB LSB | MSB LSB | |
| | | d1 d8 | d1 d8 | d1 d8 | d1 d8 | |
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | ClusterH | ClusterL | Sector (03h) | MODE (02h) | 3 |
| | | (00h) | (00h) | (00h) | (00h) | 4 |
| | | (00h) | (00h) | (00h) | (00h) | 5 |
| | | "M" | "D" | "A" | "D" | 6 |
| | | (Maker code) | (Model code) | First TNP | Last TNP | 7 |
| | | (00h) | (00h) | (00h) | (00h) | 8 |
| | | (00h) | (00h) | (00h) | (00h) | 9 |
| | | (00h) | (00h) | (00h) | (00h) | 10 |
| POINTER SECTION | | (00h) | (00h) | (00h) | (P-EMPTY) | 11 |
| POINTER SECTION | | (00h) | P-TNP1 | P-TNP2 | P-TNP3 | 12 |
| POINTER SECTION | | P-TNP4 | P-TNP5 | P-TNP6 | P-TNP7 | 13 |
| POINTER SECTION | | … | … | … | … | |
| POINTER SECTION | | P-TNP92 | P-TNP93 | P-TNP94 | P-TNP95 | 35 |
| POINTER SECTION | | P-TNP96 | P-TNP97 | P-TNP98 | P-TNP99 | 36 |
| | | (00h) | (00h) | (00h) | (00h) | 37 |
| | | … | … | … | … | |
| | | (00h) | (00h) | (00h) | (00h) | 74 |
| | | (00h) | (00h) | (00h) | (P-TNP255) | 75 |
| TABLE SECTION ((99+1) PART TABLES) | (00h) | zeros | | | P-PN0j | 76 |
| TABLE SECTION ((99+1) PART TABLES) | | zeros | | | LINK | 77 |
| TABLE SECTION ((99+1) PART TABLES) | (01h) | Start offset address | | | P-PN0j | 78 |
| TABLE SECTION ((99+1) PART TABLES) | | End offset address | | | LINK | 79 |
| TABLE SECTION ((99+1) PART TABLES) | (02h) | Start offset address | | | P-PN0j | 80 |
| TABLE SECTION ((99+1) PART TABLES) | | End offset address | | | LINK | 81 |
| TABLE SECTION ((99+1) PART TABLES) | (03h) | Start offset address | | | P-PN0j | 82 |
| TABLE SECTION ((99+1) PART TABLES) | | End offset address | | | LINK | 83 |
| TABLE SECTION ((99+1) PART TABLES) | (04h) | Start offset address | | | P-PN0j | 84 |
| TABLE SECTION ((99+1) PART TABLES) | . | End offset address | | | LINK | 85 |
| TABLE SECTION ((99+1) PART TABLES) | . | … | | | … | 86 |
| TABLE SECTION ((99+1) PART TABLES) | (63h) | Start offset address | | | P-PN0j | 274 |
| TABLE SECTION ((99+1) PART TABLES) | | End offset address | | | LINK | 275 |
| | (64h) | (zeros) | | | | 276 |
| | | (zeros) | | | | 277 |
| | . | (zeros) | | | | |
| | . | … | | | … | |
| | (FFh) | (zeros) | | | | 586 |
| | | (zeros) | | | | 587 |

AUX-TOC SECTOR 3
(PICTURE PLAYBACK SEQUENCE TABLE)

FIG. 15

| | 16bits even m: Wm B | 16bits even m: Wm A | 16bits odd m: Wm B | 16bits odd m: Wm A | |
|---|---|---|---|---|---|
| | MSB LSB | MSB LSB | MSB LSB | MSB LSB | |
| | d1 d8 | d1 d8 | d1 d8 | d1 d8 | |
| HEADER | 00000000 | 11111111 | 11111111 | 11111111 | 0 |
| HEADER | 11111111 | 11111111 | 11111111 | 11111111 | 1 |
| HEADER | 11111111 | 11111111 | 11111111 | 00000000 | 2 |
| HEADER | ClusterH | ClusterL | Sector (04h) | MODE (02h) | 3 |
| | (00h) | (00h) | (00h) | (00h) | 4 |
| | (00h) | (00h) | (00h) | (00h) | 5 |
| | "M" | "D" | "A" | "D" | 6 |
| | (Maker code) | (Model code) | First TXNO | Last TXNO | 7 |
| | (00h) | (00h) | (00h) | (00h) | 8 |
| | (00h) | (00h) | (00h) | (00h) | 9 |
| | (00h) | (00h) | (00h) | (00h) | 10 |
| POINTER SECTION | (00h) | (00h) | (00h) | (P-EMPTY) | 11 |
| POINTER SECTION | (P-PFRA) | P-TXN01 | P-TXN02 | P-TXN03 | 12 |
| POINTER SECTION | P-TXN04 | P-TXN05 | P-TXN06 | P-TXN07 | 13 |
| POINTER SECTION | | | | | |
| POINTER SECTION | P-TXN092 | P-TXN093 | P-TXN094 | P-TXN095 | 35 |
| POINTER SECTION | P-TXN096 | P-TXN097 | P-TXN098 | P-TXN099 | 36 |
| | (00h) | (00h) | (00h) | (00h) | 37 |
| | | | | | |
| | (00h) | (00h) | (00h) | (00h) | 74 |
| | (00h) | (00h) | (00h) | (P-TXN0255) | 75 |
| TABLE SECTION ((99+1) PART TABLES) (00h) | Start address (cover text) | | | Text MODE | 76 |
| | End address | | | LINK | 77 |
| (01h) | Start address | | | Text MODE | 78 |
| | End address | | | LINK | 79 |
| (02h) | Start address | | | Text MODE | 80 |
| | End address | | | LINK | 81 |
| (03h) | Start address | | | Text MODE | 82 |
| | End address | | | LINK | 83 |
| (04h) | Start address | | | Text MODE | 84 |
| . | End address | | | LINK | 85 |
| . | | | | | 86 |
| . | | | | | |
| (63h) | Start address | | | Text MODE | 274 |
| | End address | | | LINK | 275 |
| (64h) | (zeros) | | | | 276 |
| | (zeros) | | | | 277 |
| . | (zeros) | | | | |
| . | | | | | |
| (FFh) | (zeros) | | | | 586 |
| | (zeros) | | | | 587 |

AUX-TOC SECTOR 4
(TEXT ALLOCATION TABLE)

FIG.16

| Section | Slot | 16bits even m: Wm B | 16bits even m: Wm A | 16bits odd m: Wm B | 16bits odd m: Wm A | |
|---|---|---|---|---|---|---|
| | | MSB d1 … LSB d8 | MSB d1 … LSB d8 | MSB d1 … LSB d8 | MSB d1 … LSB d8 | |
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | ClusterH | ClusterL | Sector (05h) | MODE (02h) | 3 |
| | | (00h) | (00h) | (00h) | (00h) | 4 |
| | | (00h) | (00h) | (00h) | (00h) | 5 |
| | | "M" | "D" | "A" | "D" | 6 |
| | | (Maker code) | (Model code) | First TXIF | Last TXIF | 7 |
| | | (00h) | (00h) | (00h) | (00h) | 8 |
| | | (00h) | (00h) | (00h) | (00h) | 9 |
| | | (00h) | (00h) | (00h) | char. code | 10 |
| POINTER SECTION | | (00h) | (00h) | (00h) | (P-EMPTY) | 11 |
| POINTER SECTION | | (00h) | P-TXIF1 | P-TXIF2 | P-TXIF3 | 12 |
| POINTER SECTION | | P-TXIF4 | P-TXIF5 | P-TXIF6 | P-TXIF7 | 13 |
| POINTER SECTION | | P-TXIF92 | P-TXIF93 | P-TXIF94 | P-TXIF95 | 35 |
| POINTER SECTION | | P-TXIF96 | P-TXIF97 | P-TXIF98 | P-TXIF99 | 36 |
| | | (00h) | (00h) | (00h) | (00h) | 37 |
| | | (00h) | (00h) | (00h) | (00h) | 74 |
| | | (00h) | (00h) | (00h) | (P-TXIF255) | 75 |
| TABLE SECTION ((255+1) SLOTS) | (00h) | Cover text information | | | | 76 |
| TABLE SECTION ((255+1) SLOTS) | | Cover text information | | | LINK | 77 |
| TABLE SECTION ((255+1) SLOTS) | (01h) | Cover text or text information | | | | 78 |
| TABLE SECTION ((255+1) SLOTS) | | Cover text or text information | | | LINK | 79 |
| TABLE SECTION ((255+1) SLOTS) | (02h) | Cover text or text information | | | | 80 |
| TABLE SECTION ((255+1) SLOTS) | | Cover text or text information | | | LINK | 81 |
| TABLE SECTION ((255+1) SLOTS) | (03h) | Cover text or text information | | | | 82 |
| TABLE SECTION ((255+1) SLOTS) | | Cover text or text information | | | LINK | 83 |
| TABLE SECTION ((255+1) SLOTS) | (04h) | Cover text or text information | | | | 84 |
| TABLE SECTION ((255+1) SLOTS) | . | Cover text or text information | | | LINK | 85 |
| TABLE SECTION ((255+1) SLOTS) | . | | | | | 86 |
| TABLE SECTION ((255+1) SLOTS) | (63h) | Cover text or text information | | | | 274 |
| TABLE SECTION ((255+1) SLOTS) | | Cover text or text information | | | LINK | 275 |
| TABLE SECTION ((255+1) SLOTS) | (64h) | Cover text or text information | | | | 276 |
| TABLE SECTION ((255+1) SLOTS) | . | Cover text or text information | | | LINK | 277 |
| TABLE SECTION ((255+1) SLOTS) | (FFh) | Cover text or text information | | | | 586 |
| TABLE SECTION ((255+1) SLOTS) | | Cover text or text information | | | LINK | 587 |

AUX-TOC SECTOR 5
(TEXT INFORMATION TABLE)

PICTURE-FILE SECTOR

FIG. 18

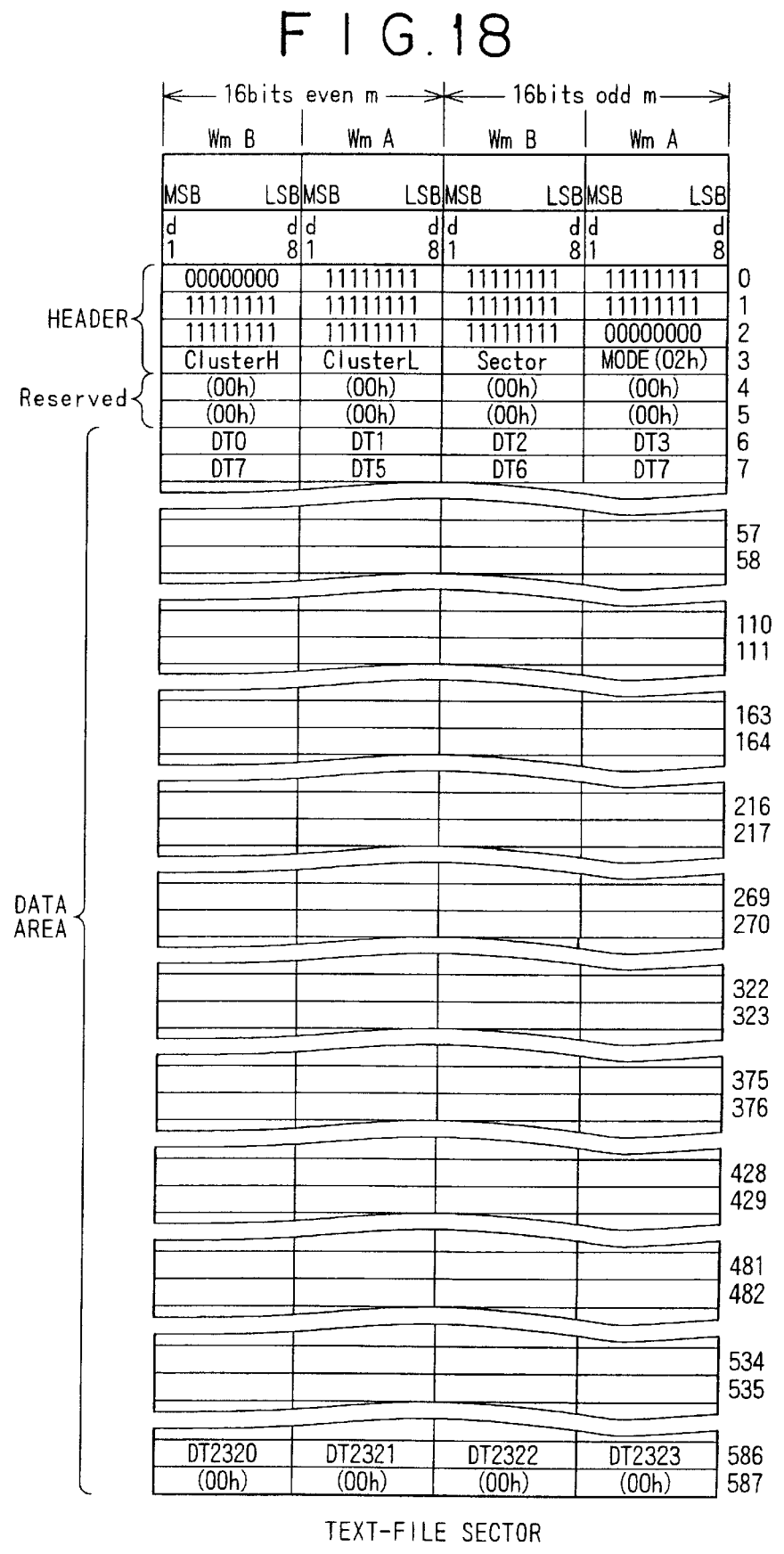

| | 16bits even m | | 16bits odd m | | |
|---|---|---|---|---|---|
| | Wm B | Wm A | Wm B | Wm A | |
| | MSB LSB | MSB LSB | MSB LSB | MSB LSB | |
| | d1 d8 | d1 d8 | d1 d8 | d1 d8 | |
| HEADER | 00000000 | 11111111 | 11111111 | 11111111 | 0 |
| HEADER | 11111111 | 11111111 | 11111111 | 11111111 | 1 |
| HEADER | 11111111 | 11111111 | 11111111 | 00000000 | 2 |
| HEADER | ClusterH | ClusterL | Sector | MODE (02h) | 3 |
| Reserved | (00h) | (00h) | (00h) | (00h) | 4 |
| Reserved | (00h) | (00h) | (00h) | (00h) | 5 |
| DATA AREA | DT0 | DT1 | DT2 | DT3 | 6 |
| DATA AREA | DT7 | DT5 | DT6 | DT7 | 7 |
| DATA AREA | | | | | 57 |
| DATA AREA | | | | | 58 |
| DATA AREA | | | | | 110 |
| DATA AREA | | | | | 111 |
| DATA AREA | | | | | 163 |
| DATA AREA | | | | | 164 |
| DATA AREA | | | | | 216 |
| DATA AREA | | | | | 217 |
| DATA AREA | | | | | 269 |
| DATA AREA | | | | | 270 |
| DATA AREA | | | | | 322 |
| DATA AREA | | | | | 323 |
| DATA AREA | | | | | 375 |
| DATA AREA | | | | | 376 |
| DATA AREA | | | | | 428 |
| DATA AREA | | | | | 429 |
| DATA AREA | | | | | 481 |
| DATA AREA | | | | | 482 |
| DATA AREA | | | | | 534 |
| DATA AREA | | | | | 535 |
| DATA AREA | DT2320 | DT2321 | DT2322 | DT2323 | 586 |
| DATA AREA | (00h) | (00h) | (00h) | (00h) | 587 |

TEXT-FILE SECTOR

FIG.19A

| | | |
|---|---|---|
| d1–d2 (COPY STATUS) | 0h | CAN BE COPIED |
| | 1h | CAN BE COPIED ONCE |
| | 2h | CAN BE COPIED ONCE THROUGH AN AUTHENTICATED BUS (CAN NOT BE COPIED THROUGH AN UNAUTHENTICATED BUS) |
| | 3h | CAN NOT BE COPIED |
| d3～d8 | Reserved(UNDEFINED) | |

S. Pict. MODE (COPY STATUS)

FIG.19B

| | BEFORE COPYING | AFTER COPYING |
|---|---|---|
| COPY STATUS | 0h (CAN BE COPIED) | 0h (CAN BE COPIED) |
| | 1h (CAN BE COPIED ONCE) | 3h (CAN NOT BE COPIED) |
| | 2h (CAN BE COPIED ONCE THROUGH AN AUTHENTICATED BUS) | 3h (CAN NOT BE COPIED) |
| | 3h (CAN NOT BE COPIED) | ―― |

COPY-STATUS UPDATING TABLE

DATA STRUCTURE OF A PICTURE (TEXT)-INFORMATION FILE

FIG. 21

| | | |
|---|---|---|
| d1, d2 (COPY STATUS) | 0h | CAN BE COPIED |
| | 1h | CAN BE COPIED ONCE |
| | 2h | CAN BE COPIED ONCE THROUGH AN AUTHENTICATED BUS (CAN NOT BE COPIED THROUGH AN UNAUTHENTICATED BUS) |
| | 3h | CAN NOT BE COPIED |
| d3, d4 | 0h | sung text |
| | 1h | INFORMATION ON ARTISTS |
| | 2h | LINER NOTES |
| | 3h | OTHERS |
| d5 | 0 | NO TIME STAMP |
| | 1 | WITH A TIME STAMP |
| d6, d7, d8 | 0h | ASCII |
| | 1h | modified ISO 8859-1 |
| | 2h | Music Shifted JIS |
| | 3h | KS C 5601-1989 |
| | 4h | GB2312-80 |
| | 5h | reserved |
| | 6h | reserved |
| | 7h | plain text |

Text MODE

FIG.25

| Section | | 16bits | | 16bits | | |
|---|---|---|---|---|---|---|
| | | MSB LSB | MSB LSB | MSB LSB | MSB LSB | |
| HEADER | | 00000000 | 11111111 | 11111111 | 11111111 | 0 |
| | | 11111111 | 11111111 | 11111111 | 11111111 | 1 |
| | | 11111111 | 11111111 | 11111111 | 00000000 | 2 |
| | | CL·H (00h) | CL·L (03h ~ 05h) | Sector (00h) | MODE (02h) | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | Maker code | Model code | F·TNO (01h) | L·TNO (03h) | 7 |
| | | 00000000 | 00000000 | 00000000 | US (01h) | 8 |
| | | 00000000 | 00000000 | 00000000 | 00000000 | 9 |
| | | 00000000 | 00000000 | 00000000 | Disc Serial No | 10 |
| POINTER SECTION | | Disc | ID | P-DFA (00h) | P-EMPTY (07h) | 11 |
| | | P-FRA (06h) | P-TN01 (01h) | P-TN02 (03h) | P-TN03 (04h) | 12 |
| | | P-TN04 (00h) | P-TN05 | P-TN06 | P-TN07 | 13 |
| | | ... | ... | ... | ... | |
| | | P-TN0248 | P-TN0249 | P-TN0250 | P-TN0251 | 74 |
| | | P-TN0252 | P-TN0253 | P-TN0254 | P-TN0255 | 75 |
| | | 00000000 | 00000000 | 00000000 | 00000000 | 76 |
| | | 00000000 | 00000000 | 00000000 | 00000000 | 77 |
| TABLE SECTION (255 PART TABLES) | (01h) | Start address | 32h. 00h=La | | TRACK MODE (06h) | 78 |
| | | End address | Lb | | LINK (02h) | 79 |
| | (02h) | Start address | Lc | | C6h | 80 |
| | | End address | Ld | | 00h | 81 |
| | (03h) | Start address | Le | | C6h | 82 |
| | | End address | Lf | | 00h | 83 |
| | (04h) | Start address | Lg | | C6h | 84 |
| | | End address | Lh | | 05h | 85 |
| | (05h) | Start address | Li | | C6h | 86 |
| | | End address | Lj | | 00h | 87 |
| | (06h) | Start address | Lk | | TRACK MODE | 88 |
| | | End address | 8Ch. 1Fh | | 00h | 89 |
| | (07h) | Start address | (TRACK ADDRESS) | | TRACK MODE | 90 |
| | | End address | | | 08h | 91 |
| | (08h) | Start address | (TRACK ADDRESS) | | TRACK MODE | 92 |
| | | End address | | | 09h | 93 |
| | (09h) | Start address | (TRACK ADDRESS) | | TRACK MODE | 94 |
| | | End address | | | 0Ah | 95 |
| | | ... | ... | | ... | |
| | (FCh) | Start address | (TRACK ADDRESS) | | TRACK MODE | 580 |
| | | End address | | | LINK | 581 |
| | (FDh) | Start address | (TRACK ADDRESS) | | TRACK MODE | 582 |
| | | End address | | | LINK | 583 |
| | (FEh) | Start address | (TRACK ADDRESS) | | TRACK MODE | 584 |
| | | End address | | | LINK | 585 |
| | (FFh) | Start address | (TRACK ADDRESS) | | TRACK MODE | 586 |
| | | End address | | | LINK | 587 |

U-TOC SECTOR 0

FIG. 26

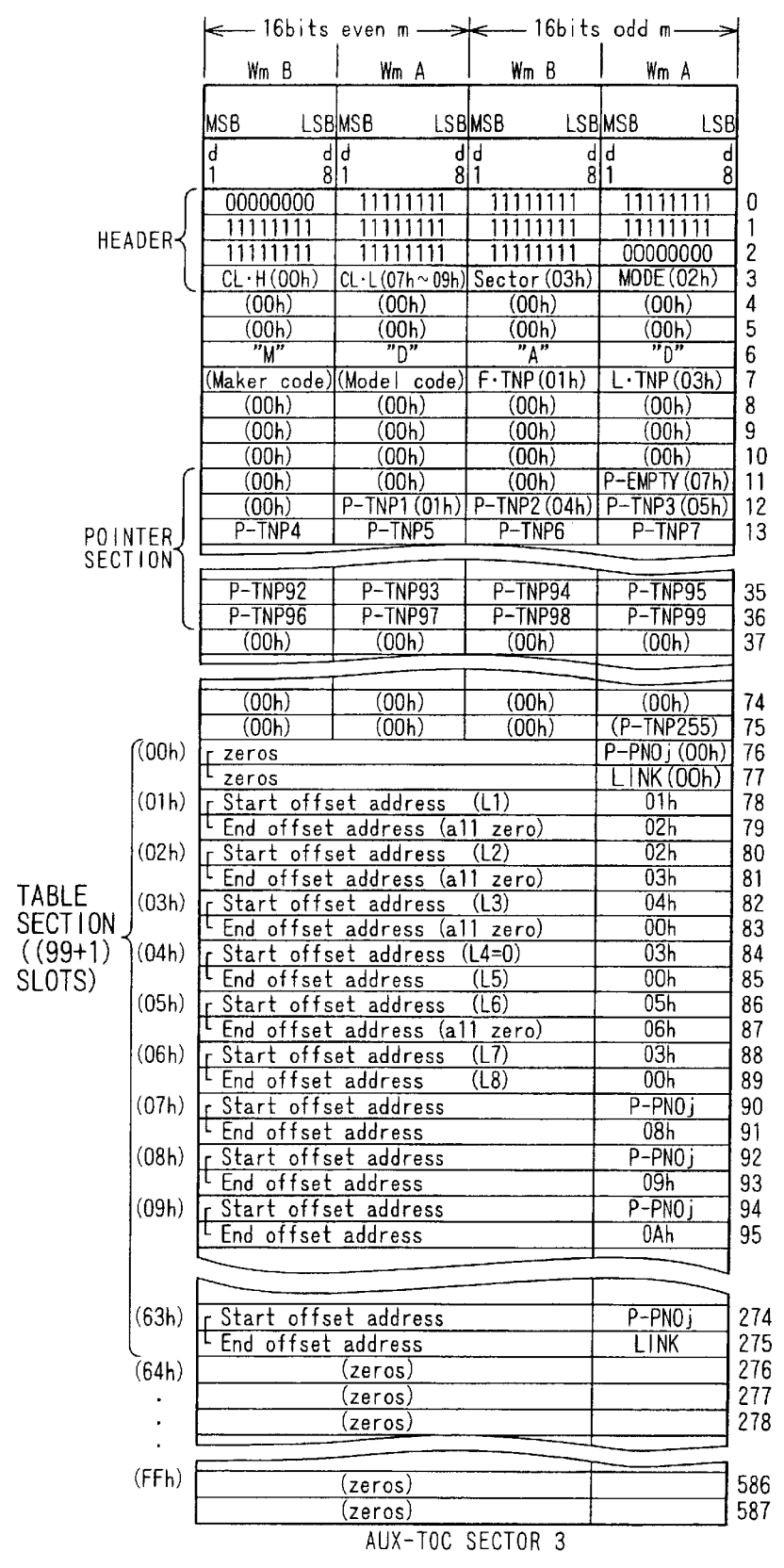

| | | 16bits even m | | 16bits odd m | | |
|---|---|---|---|---|---|---|
| | | Wm B | Wm A | Wm B | Wm A | |
| | | MSB LSB | MSB LSB | MSB LSB | MSB LSB | |
| | | d1 d8 | d1 d8 | d1 d8 | d1 d8 | |
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | CL·H(00h) | CL·L(07h~09h) | Sector(03h) | MODE(02h) | 3 |
| | | (00h) | (00h) | (00h) | (00h) | 4 |
| | | (00h) | (00h) | (00h) | (00h) | 5 |
| | | "M" | "D" | "A" | "D" | 6 |
| | | (Maker code) | (Model code) | F·TNP(01h) | L·TNP(03h) | 7 |
| | | (00h) | (00h) | (00h) | (00h) | 8 |
| | | (00h) | (00h) | (00h) | (00h) | 9 |
| | | (00h) | (00h) | (00h) | (00h) | 10 |
| POINTER SECTION | | (00h) | (00h) | (00h) | P-EMPTY(07h) | 11 |
| POINTER SECTION | | (00h) | P-TNP1(01h) | P-TNP2(04h) | P-TNP3(05h) | 12 |
| POINTER SECTION | | P-TNP4 | P-TNP5 | P-TNP6 | P-TNP7 | 13 |
| | | | | | | |
| POINTER SECTION | | P-TNP92 | P-TNP93 | P-TNP94 | P-TNP95 | 35 |
| POINTER SECTION | | P-TNP96 | P-TNP97 | P-TNP98 | P-TNP99 | 36 |
| | | (00h) | (00h) | (00h) | (00h) | 37 |
| | | | | | | |
| | | (00h) | (00h) | (00h) | (00h) | 74 |
| | | (00h) | (00h) | (00h) | (P-TNP255) | 75 |
| TABLE SECTION ((99+1) SLOTS) | (00h) | zeros | | | P-PNOj(00h) | 76 |
| | | zeros | | | LINK(00h) | 77 |
| | (01h) | Start offset address (L1) | | | 01h | 78 |
| | | End offset address (all zero) | | | 02h | 79 |
| | (02h) | Start offset address (L2) | | | 02h | 80 |
| | | End offset address (all zero) | | | 03h | 81 |
| | (03h) | Start offset address (L3) | | | 04h | 82 |
| | | End offset address (all zero) | | | 00h | 83 |
| | (04h) | Start offset address (L4=0) | | | 03h | 84 |
| | | End offset address (L5) | | | 00h | 85 |
| | (05h) | Start offset address (L6) | | | 05h | 86 |
| | | End offset address (all zero) | | | 06h | 87 |
| | (06h) | Start offset address (L7) | | | 03h | 88 |
| | | End offset address (L8) | | | 00h | 89 |
| | (07h) | Start offset address | | | P-PNOj | 90 |
| | | End offset address | | | 08h | 91 |
| | (08h) | Start offset address | | | P-PNOj | 92 |
| | | End offset address | | | 09h | 93 |
| | (09h) | Start offset address | | | P-PNOj | 94 |
| | | End offset address | | | 0Ah | 95 |
| | | | | | | |
| | (63h) | Start offset address | | | P-PNOj | 274 |
| | | End offset address | | | LINK | 275 |
| | (64h) | (zeros) | | | | 276 |
| | · | (zeros) | | | | 277 |
| | · | (zeros) | | | | 278 |
| | · | | | | | |
| | (FFh) | (zeros) | | | | 586 |
| | | (zeros) | | | | 587 |

AUX-TOC SECTOR 3

REPRODUCING APPARATUS CAPABLE OF SUPPRESSING MECHANICAL NOISE DURING ACCESS OF SUB DATA AND MAIN DATA

BACKGROUND OF THE INVENTION

The present invention relates to a playback apparatus which allows one of a variety of playback modes to be selected in a playback operation of a disc-shaped recording medium containing recorded main data and recorded sub-data.

As a recording apparatus and/or a playback apparatus for recording and/or play back data such as music respectively, there has been known a recording apparatus and/or a playback apparatus which uses a magnetic optical disc or a magnetic tape for recording an audio signal as a digital signal as recording media.

In addition, in a recording and playback system using a magnetic optical disc known as a mini disc (a trademark), the user is capable of not only recording and playing back musical data such as a song as a program but also the title of the disc (or the name of the disc), the names of a song (or the name of a track) and the name of an artist for the program or musical data recorded on the disc as character information. Thus, in a playback operation, information such as the title of a disc, the name of a song or the name of an artist can be displayed on a display unit provided on the playback apparatus.

It should be noted that the term 'program' used in this specification is a unit of typically audio data such as songs recorded on a disc as main data. Typically, audio data of a song is treated as a program. In addition, the word 'track' is used with the same meaning as the term 'program'.

As for the mini-disc system, the patent applicant earlier proposed a configuration wherein a recording area for recording sub-data associated with audio data recorded as main data is provided separately from a recording area for recording the main data, and sub-data such as still-picture data and character data can be recorded into the separately provided recording area. It should be noted that, in this specification, the term 'characters' include symbols and notations.

Also in the conventional mini-disk system, for example, character information such as the name of a disc and the name of a track can be recorded. In this case, however, these pieces of character information are recorded for each program in a U-TOC (User Table of Contents). It should be noted, however, that the size of the U-TOC itself is not that big. Thus, to the bitter end, only characters of no more than a title or the like can be recorded as described above.

In the case of the proposed configuration, on the other hand, a recording area for sub-data is provided. Thus, not only can character data be accommodated therein, but an operation to record data such as a still picture as a data file can also be implemented with ease provided that the still-picture data does not require an area with such a large storage size.

As a possible way to utilize sub-data such as a picture or character information in a mini-disc system with a configuration allowing sub-data to be recorded in addition to audio data which is recorded as main data as described above, for example, for a period of time to play back a program recorded as main data, timing to play back a data file containing a piece of sub-data or a plurality of pieces of sub-data is prescribed in advance so that the data file can be played back and output in synchronization with the operation to play back the program.

To put it concretely, let us assume for example that a piece of music with a performance length of 2 minutes is stored as main data on a disc along with still-picture files containing 2 pictures, namely, Pictures #1 and #2 respectively which are stored as sub-data associated with the piece of music. For a period of time to play back this main data, the timing to play back Pictures #1 and #2 in synchronization with the main data is prescribed in advance. According to the prescribed synchronous playback timing, during the former half of the period of time to play back the audio data of the program (that is, the piece of music), the still-picture file of Picture #1 is played back in synchronization with the operation to play back the program to output a display. During the latter half of the period of time to play back the audio data of the program, on the other hand, the still-picture file of Picture #2 is played back in synchronization with the operation to play back the program to output a display.

It should be noted that sub-data such as a still-picture file played back in synchronization with the operation to play back a program as described above is actually output to, for example, a display panel provided on the mini-disc recording and playback apparatus or an external monitor unit to be displayed thereon.

With a configuration allowing such a synchronous playback operation to be carried out, the user is capable of enjoying the playback apparatus by not only listening to main data which is played back as audio data but also watching a still picture and character information displayed along with the progress of the reproduced piece of music.

Considering the actual use of a recording and playback apparatus adopting a configuration capable of playing back and outputting not only audio data but also a character-information file and a picture file recorded as sub-data associated with the audio data as described above, it is desirable to utilize the characteristics of the configuration as effectively as possible in the user-amusement aspect and the functional aspect of the recording and playback apparatus.

Let amusement for the user be taken into consideration for example. In this case, rather than always playing back and outputting audio data recorded as main data along with a character-information file and a picture file recorded as sub-data, the following alternative configuration is desirable. In this alternative configuration, for example, the user is allowed to select the type of data to be played back.

That is to say, for instance, only audio data is played back as is the case with the conventional system, or only a character-information file and a picture file which are recorded as sub-data can be played back. This alternative configuration is desirable in that the user is allowed to select one among a variety of ways to play back and output data.

In addition, the following improvement in the functional aspect is also conceivable.

The mini-disc recording and playback apparatus is provided with a buffer memory used for temporarily holding audio data read out from a disc. The buffer memory is placed on a data playback path between the disc and a playback-output system. In this configuration, by setting the transfer speed of audio data transferred from the disc to the buffer memory at a value higher than the transfer speed of audio data transferred from the buffer memory to the playback-output system, audio data will get accumulated in the buffer memory. In actuality, when the buffer memory becomes full of audio data or when the amount of audio data accumulated in the buffer memory exceeds a predetermined value, the operation to transfer audio data from the disc to the buffer memory is temporarily halted. Thus, audio data is played back from the disc intermittently. With such a buffer memory, a continuous operation to transfer audio data from the buffer memory to the playback/output system is assured to improve a vibration-proof characteristic of the mini-disc recording and playback apparatus which is one of the natural design objectives of the apparatus.

Assuming that an intermittent playback operation cited above is an operation to read out main data and sub-data from an actual disc with the sub-data read out in synchronization with the main data as described earlier, in the present patent application, the following configuration is proposed.

During a period in which an operation to transfer audio data from the disc to the buffer memory is paused in an intermittent playback of audio data described above, an access to a sub-data area on the disc is made to read out a necessary sub-data file from the disc and play back and output sub-data contained in the file. In such a playback operation, sub-data files necessary in the synchronous playback can be obtained sequentially one file after another for example while main data is being played back. It is thus no longer necessary to read out all sub-data files required in the synchronous-playback operation from the disc and keep sub-data recorded in the files in the buffer memory for example at a stage before starting the operation to play back main data. As a result, the length of a time to wait for the operation of playing back main data to be enabled can be reduced.

It should be noted, however, that in the case of a synchronous playback operation wherein an access to a sub-data area on the disc is made to read out a necessary sub-data file from the disc during a period in which an operation to transfer audio data from the disc to the buffer memory is paused in an intermittent playback of audio data described above, the optical head is moved between the main-data area and the sub-data area on the disc frequently in order to make accesses to the areas. In actuality, since the main-data area and the sub-data area on the disc are physically separated away from each other, the optical head itself needs to be moved by an operation of the sled mechanism in most cases.

The sled mechanism has a configuration wherein a sled shaft provided in the radial direction of the disc is typically driven by a motor into a rotation to move the optical head. That is why components such as a variety of gears are also provided.

When the sled mechanism is driven, mechanical operation sounds are generated by, among other causes, the rotations of the motor and the sled shaft. In an operation to play back main data and sub data in synchronization with the main data, the optical head is moved at a relatively high frequency between the main-data and sub-data areas to make accesses to the areas as described above. As a result, the frequency at which mechanical sounds are generated by the sled mechanism to accompany the accesses also increases to a comparatively high value.

For example, users who attach importance to the sound quality are of course conceivable. Such a user is quite happy to just thoroughly listen to reproduced audio data stored on a disc as main data without particularly watching sub-data played back from a sub-data file.

For example, when such a user is listening to audio data reproduced in a synchronous playback operation described above, the user may be bothered by mechanical sounds of the sled mechanism heard rather frequently even if the volume of the sounds is not so high.

Thus, when the user wants to listen to only audio data, for example, it is desirable to reduce the frequency of generation of mechanical sounds accompanying sled movements described above as much as possible.

SUMMARY OF THE INVENTION

It is thus an object of the present invention addressing the problems described above to provide a playback apparatus having a function for playing back main data and sub-data in synchronization with the main data wherein the function is utilized as effectively as possible to result in improvements in the amusement aspect and the functional aspect.

It is another object of the present invention addressing the problems described above to provide a playback apparatus for carrying out playback operations on a disc-shaped recording medium comprising: a main-data area for recording main data; a main-data management area for recording main-data management data for controlling said main data; a sub-data area for recording sub-data associated with said main data; and a sub-data management area for recording sub-data management data for controlling said sub-data, said playback apparatus characterized by comprising: a playback means for playing back said main data from said main-data area in accordance with said main-data management data recorded in said main-data management area and for playing back said sub-data from said sub-data area in accordance with said sub-data management data recorded in said sub-data management area; a transport means for transporting said playback means in a radial direction of said disc-shaped recording medium; a memory means for storing either said main data or said sub-data played back by said playback means; a control means for controlling said transport means to transport said playback means to either said main-data for recording said main data during a period to read out said sub-data or said sub-data area for recording said sub-data during a period to read out said main-data; and an operation means for specifying a first playback mode to play back said main data and said sub-data synchronously or a second playback mode to play back either said main data or said sub-data, wherein said control means inhibits transportation of said playback means by said transport means between said main-data area and said sub-data area when said second playback mode is specified by said operations means.

It is still another object of the present invention to provide a playback apparatus for carrying out playback operations on a disc-shaped recording medium comprising: a main-data area for recording main data; a main-data management area for recording main-data management data for controlling said main data; a sub-data area for recording sub-data comprising text data and still-picture data associated with said main data; and a sub-data management area for recording sub-data management data for controlling said sub-data, said playback apparatus characterized by comprising: a playback means for playing back data from said main-data area, said main-data management data, said sub-data area and said sub-data management area; an operation means for specifying: a first playback mode to play back said main data only; a second playback mode to synchronously play back said main data and said text data associated with said main data; a third playback mode to synchronously play back said main data, said text data and said still-picture associated with said main data; or a fourth playback mode to play back said still-picture data only; and a transport control means for transporting said playback means in a radial direction of said disc-shaped recording medium in accordance with a playback mode selected by said operation means.

BRIEF DESCRIPTION OF THE DRAWINGS

FIG. 3A is a diagram showing a regular format of the address of sectors;

FIG. 3B is a diagram showing a short format of the address of sectors;

FIG. 4A is a table representing the sector address expressed in the regular and short formats;

FIG. 4B is a table representing the sector address expressed in the regular format, and the absolute address and the offset address of the sector address both expressed in the short format;

FIG. 4C is another table representing the sector address expressed in the regular format, and the absolute address and the offset address of the sector address both expressed in the short format;

FIG. 6 is a table representing the format of a U-TOC sector 0;

FIG. 8 is a table representing the format of the U-TOC sector 1;

FIG. 9 is a table representing the format of the U-TOC sector 2;

FIG. 10 is a table representing the format of the U-TOC sector 4;

FIG. 11 is a table representing the format of an AUX-TOC sector 0;

FIG. 12 is a table representing the format of the AUX-TOC sector 1;

FIG. 13 is a table representing the format of the AUX-TOC sector 2;

FIG. 14 is a table representing the format of the AUX-TOC sector 3;

FIG. 15 is a table representing the format of the AUX-TOC sector 4;

FIG. 16 is a table representing the format of the AUX-TOC sector 5;

FIG. 18 is a table representing the format of a text file sector in the AUX-data area;

FIG. 19A is a code table describing copy status of a still-picture mode;

FIG. 19B is a copy-status updating table;

FIG. 21 is a table showing definitions of a text mode set in each part table in the AUX-TOC sector 4;

FIG. 25 is a table showing actual information recorded in the U-TOC sector 0 to control the audio-data tracks shown in FIG. 24;

FIG. 26 is a table showing actual information recorded in the AUX-TOC sector 3 to control the picture files shown in FIGS. 23D and 23E;

DETAILED DESCRIPTION OF THE PREFERRED EMBODIMENTS

Some preferred embodiments of the present invention are described as follows.

An embodiment implementing a playback apparatus provided by the present invention is exemplified by a recording and playback apparatus 1 capable of carrying out recording and playback operations on a magnetic optical disc (also referred to as a mini disc) used as a disc-shaped recording medium. The recording and playback apparatus 1 is explained in the following order:

1. Configuration of the Recording and Playback Apparatus
2. Sector Format and Address Format
3. Area Structure
4. U-TOC
   4-1 U-TOC Sector 0
   4-2 U-TOC Sector 1
   4-3 U-TOC Sector 2
   4-4 U-TOC Sector 4
5. AUX-TOC
   5-1 AUX-TOC Sector 0
   5-2 AUX-TOC Sector 1
   5-3 AUX-TOC Sector 2
   5-4 AUX-TOC Sector 3
   5-5 AUX-TOC Sector 4
   5-6 AUX-TOC Sector 5
6. Data Files
   6-1 Picture-File Sector
   6-2 Text-File Sector
7. Data Read Operations in a Synchronous Playback
   7-1 Operation Examples
      7-1-1 Disc Example
      7-1-2 Structure of a Buffer Memory
      7-1-3 Operation Overview
   7-2 Processing Operations
8. IEEE1394 Format
   8-1 Overview
   8-2 Stack Model
   8-3 Packets
9. Playback Operations for Playback Modes
   9-1 System Configuration
   9-2 Playback Mode 1
   9-3 Playback Mode 2
   9-4 Playback Mode 3
   9-5 Playback Mode 4
   9-6 Playback mode 5
   9-7 Processing Operations

1. Configuration of the Recording and Playback Apparatus

Figure 1:
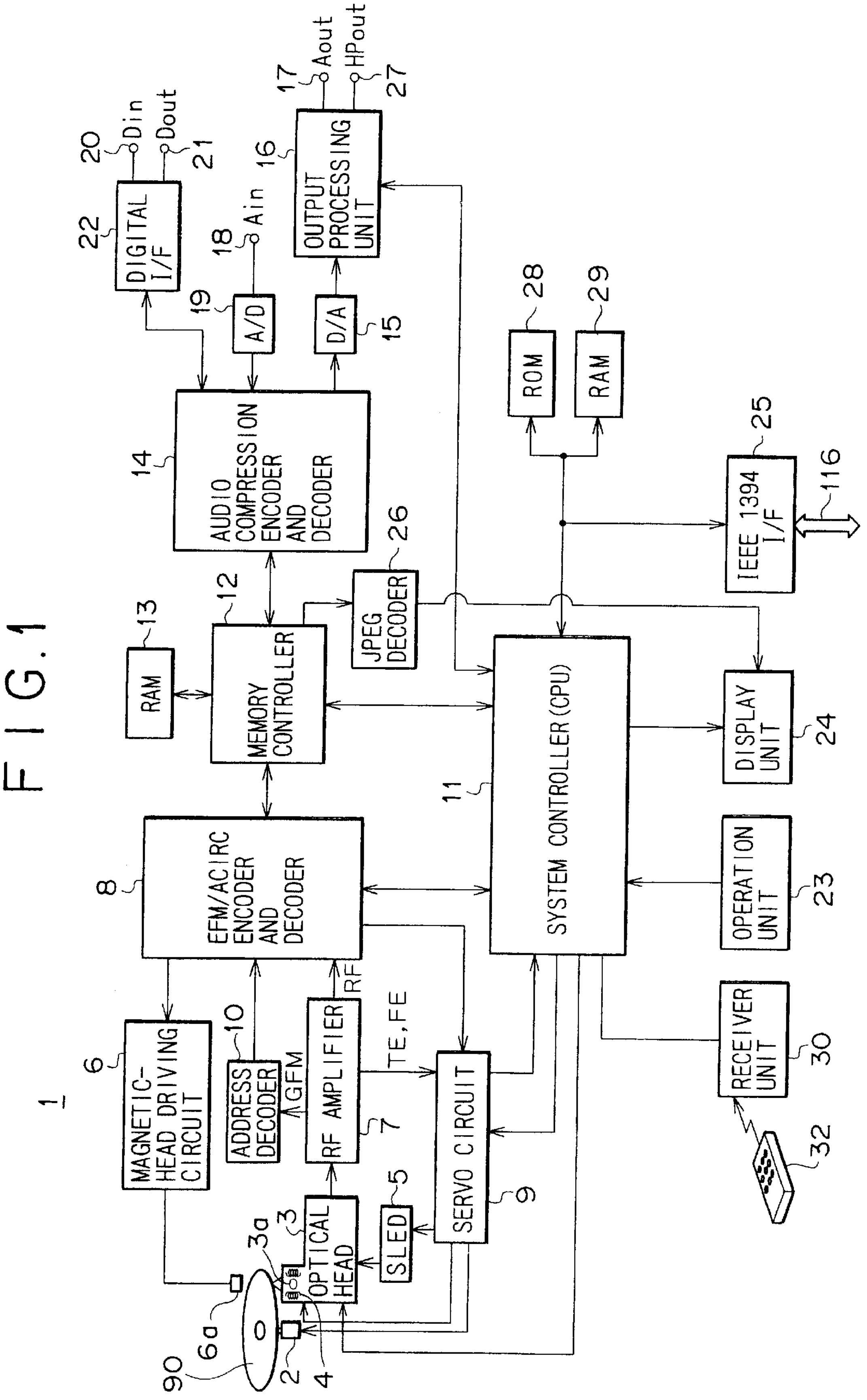
FIG. 1 is a block diagram showing a recording and playback apparatus provided by the present invention.

FIG. 1 is a block diagram showing the internal configuration of a recording and playback apparatus implemented by an embodiment of the present invention. It should be noted that, in the following description, the embodiment is also referred to as a mini-disc recorder and player 1.

A magnetic optical disc (also referred to as a mini disc) 90 for recording compressed audio data is driven by a spindle motor 2 into rotation. An optical head 3 radiates a laser beam to the magnetic optical disc 90 in recording and playback operations.

In a recording operation, the optical head 3 outputs a high-level laser beam to a recording track to heat the track to the Currie temperature. In a playback operation, on the other hand, the optical head 3 radiates a relatively-low-level laser beam to a playback track which reflects the laser beam due to a magnetic Kerr effect to represent data being read out.

Therefore, on the optical head 3, components including an optical system and a detector are mounted. The optical system includes a laser diode serving as a laser outputting means, a polarized-beam splitter and an objective lens 3*a*. The detector is used for detecting the reflected beam. The objective lens 3*a* is held in such a way that the lens 3*a* can be displaced in the radial direction and the tangential direction of the magnetic optical disc 90 by a 2-axis mechanism 4.

A magnetic head 6*a* is placed on the other side of the magnetic optical disc 90 at a counterpart position of the optical disc 3. The magnetic head 6*a* carries out an operation to apply a magnetic field to the magnetic optical disc 90 in a recording operation wherein the magnetic field is modulated by data supplied to the magnetic head 6*a*.

The whole optical head 3 and the magnetic head 6*a* can be moved in the radial direction of the magnetic optical disc 90 by a sled mechanism 5.

In a playback operation, the optical head 3 supplies information detected from the magnetic optical disc 90 to an RF amplifier 7. The RF amplifier 7 processes the information supplied thereto to extract data such as a playback RF signal, a tracking-error signal TE, a focus-error signal FE and a groove-information signal GFM. Recorded on the magnetic optical disc 90 as pre-grooves or wobbling grooves, groove information is information on absolute positions.

The extracted playback RF signal is supplied to an encoder and decoder unit 8. On the other hand, the tracking-error signal TE and the focus-error signal FE are supplied to a servo circuit 9 whereas the groove-information signal GFM is fed to an address decoder 10.

The tracking-error signal TE and the focus-error signal FE supplied to the servo circuit 9 are used for generating a variety of servo driving signals in accordance with a track-jump instruction and an access instruction issued by a system controller 11 and in accordance with detected information representing the rotational speed of the spindle motor 2. The system controller 11 is typically implemented by a microcomputer. The servo driving signals drive the 2-axis mechanism 4 and the sled mechanism 5 to execute focus and tracking control as well as to control the spindle motor 2 to rotate at a constant linear velocity (CLV).

The address decoder 10 decodes the groove-information signal GFM supplied thereto to extract information on addresses. The information on addresses is supplied to the system controller 11 for use in a variety of control operations.

In the mean time, the encoder and decoder unit 8 carries out a decoding process on the playback RF signal. The decoding process includes EFM (Eight Fourteen Modulation) demodulation and CIRC (Cross Interleave Reed Solomon Coding) decoding. At that time, addresses and sub-code data are also extracted as well and supplied to the system controller 11.

Audio data completing the decoding process including the EFM demodulation and the CIRC decoding in the encoder and decoder unit 8 is written into a buffer memory RAM 13 by a memory controller 12 to be stored therein temporarily.

It should be noted that, in a system comprising the magnetic optical disc 90, the optical head 3 and the buffer memory 13, playback data is read out from the magnetic optical disc 90 by the optical head 3 and transferred from the optical head 3 to the buffer memory 13 at a speed of 1.41 Mbit/second. In addition, the operation to transfer the playback data from the magnetic optical disc 90 to the buffer memory 13 is in general carried out intermittently.

Playback data stored in the buffer memory 13 is read out back with timing so as to result in a transfer speed of 0.3 Mbit/second, and supplied to an encoder and decoder unit 14. In the encoder and decoder unit 14, the playback data is subjected to playback-signal processing to produce a digital audio signal having a sampling frequency of 44.1 KHz and 16 quantization bits. The playback-signal processing includes an audio decompression process, that is, a decoding process carried out as a process inverse to the audio compression processing.

Subsequently, the digital audio signal is converted by a D/A converter 15 into an analog signal which is then subjected to level adjustment and impedance adjustment in an output processing unit 16 before being finally output to an external apparatus through a line output terminal 17 as an analog audio signal A out. The signal generated by the output processing unit 16 is also supplied a headphone output terminal 27 to be output to a headphone connected to the terminal 27 as a headphone output signal HPout.

In addition, the digital audio signal produced by the encoder and decoder unit 14 is also supplied to a digital interface unit 22 to be output to an external apparatus by way of a digital output terminal 21 as a digital audio signal Dout. Typically, the digital audio signal Dout is supplied to the external apparatus through transmission using an optical cable.

In a recording operation carried out to record data onto the magnetic optical disc 90, an analog audio signal Ain supplied by an external apparatus to a line input terminal 18 is converted by an A/D converter 19 into digital data which is then supplied to the encoder and decoder unit 14 to be subjected to an audio compression encoding process.

Data to be recorded onto the magnetic optical disc 90 may be a digital audio signal Din supplied by an external apparatus by way of a digital input terminal 20. In this case, the digital audio signal Din is supplied to the digital interface unit 22 which extracts data such as control codes from the signal Din. Then, audio data output by the digital interface unit 22 is supplied to the encoder and decoder unit 14 to be subjected to an audio compression encoding process.

Of course, the recording and playback apparatus 1 can be used for recording an input from a microphone connected to a microphone input terminal which is not shown in the figure.

Recording data obtained as a result of the audio compression encoding process carried out by the encoder and decoder unit 14 is written into the buffer memory 13 by the memory controller 12 to be stored therein temporarily. The recording data stored in the buffer memory 13 is then read back in data units each having a predetermined size to be supplied to the encoder and decoder unit 8. The encoder and decoder unit 8 carries out an encoding process including the CIRC (Cross Interleave Reef Solomon Coding) and the EFM (Eight Fourteen Modulation) on the data to be recorded before supplying the data to a magnetic-head driving circuit 6.

The magnetic-head driving circuit 6 provides the magnetic head 6*a* with a magnetic-head driving signal based on the data to be recorded obtained as a result of the encoding process carried out by the encoder and decoder unit 8. In turn, the magnetic head 6*a* applies N-pole or S-pole magnetic fields to the magnetic optical disc 90. In the mean time, the system controller 11 supplies a control signal to the optical head 3, requesting the head 3 to radiate a laser beam at the recording level.

Provided with a variety of operators used as operation keys and a dial, an operation unit 23 serves as a member to be operated by the user. Related to recording and playback operations, the operators are also used for selecting a play mode, used for switching the display state of a display unit 24 and used for editing a program. Specific operators related to recording and playback operations include a playback key, a recording key, a pause key, a halt key, an FF (fast feed) key, a REW (rewind) key and an AMS (Auto Music Sensor) key for detecting the beginning of a piece of music. Play modes include a normal-playback mode, a program-playback mode and a shuffle-playback mode. Operations to edit a program include division of a program, concatenation of programs, deletion of a program, entering the name of a program and entering the name of a disc.

Operation information generated by an operation key or a dial is supplied to the system controller 11 which then executes control of operations based on the operation information supplied thereto.

In addition, this embodiment also includes a receiver unit 30 for receiving and decoding a command signal transmitted by a remote controller 32 typically as an infrared ray, and for supplying a command code obtained as a result of the processing to the system controller 11. The system controller 11 also executes control of operations based on operation information represented by a command code received from the receiver unit 30.

The display operation of the display unit 24 is also controlled by the system controller 11.

To put it in detail, the system controller 11 transmits data to be displayed in a display operation to a display driver employed in the display unit 24. The display driver drives the display operation of a display screen on typically a liquid-crystal panel on the basis of the data received from the system controller 11 to display information such as necessary numbers, characters and symbols.

The display unit 24 also shows information such as the operating mode of the magnetic optical disc 90 currently being subjected to recording and/or playback operations, the number of a track, a recording time and/or a playback time and the status of an edit operation.

As described above, the magnetic optical disc 90 is also used for recording character information associated with each program which is stored on the magnetic optical disc 90 as main data. When character information is entered, input characters are displayed. In addition, character information read out from the magnetic optical disc 90 is also displayed.

Furthermore, in the case of the embodiment, the magnetic optical disc 90 also allows sub-data to be recorded thereon as a data file which is independent of data such as pieces of music stored on the magnetic optical disc 90 as programs.

AUX (auxiliary) data stored in a data file as sub-data is information such as characters and a still picture which can also be displayed on the display unit 24.

In this embodiment, a configuration for displaying AUX data such as a still picture and characters includes a JPEG (Joint Photographic Coding Experts Group) decoder 26.

That is to say, still-picture data stored in a data file as AUX data is recorded in a file format compressed in accordance with a JPEG system. The JPEG decoder 26 receives a file of still-picture data played back from the magnetic optical disc 90 and accumulated in the buffer memory 13 from the memory controller 12. The JPRG decoder 26 then carries out a decompression process according to the JPEG system on the still-picture data, outputting data obtained as a result of the decompression process to the display unit 24. In this way, still-picture data recorded on the magnetic optical disc 90 as AUX data is displayed on the display unit 24.

It should be noted, however, that in order to display character information and still-picture information recorded on the magnetic optical disc 90 as AUX data, a screen with a relatively large size is required. In addition, a full-dot display unit or a CRT display unit allowing its screen to be used freely to a certain degree is appropriate in many cases. For this reason, as a conceivable way to display and output AUX data, the data is output to an external monitor unit or the like by way of an interface unit 25.

AUX data can be recorded by the user on the magnetic optical disc 90 as a file. In this case, the user inputs the AUX data by using a means such as an image scanner, a personal computer or a keyboard. At that time, the AUX data is supplied by such a means to the recording and playback apparatus 1 to be stored on the magnetic optical disc 90 as a file by way of the interface unit 25.

It should be noted that, in this embodiment, the interface unit 25 is an IEEE (Institute of Electrical and Electronics Engineers, inc.) 1394 interface. This is why the interface 25 is also referred to hereafter as the IEEE1394 interface unit 25. The IEEE1394 interface unit 25 is connected to a variety of external apparatuses by an IEEE1394 bus 116.

Used for controlling a variety of operations described above, the system controller 11 is a microcomputer including a CPU and an internal interface unit.

A program ROM (Read Only Memory) 28 is used for storing such as a program to be executed to accomplish a variety of operations of the recording and playback apparatus 1. On the other hand, a RAM (Random Access Memory) 29 is used for properly holding a program and data required in the execution of various kinds of processing of the system controller 11.

By the way, in recording and playback operations carried out on the magnetic optical disc 90, it is necessary to read out management information from the magnetic optical disc 90. The management information is a P-TOC (Pre-mastered TOC) and a U-TOC (User TOC). The system controller 11 finds the address of an area on the magnetic optical disc 90, which data is to be recorded into or played back from, in accordance with these pieces of management information.

The management information is kept in the buffer memory 13.

The system controller 11 reads out these pieces of management information by carrying out a playback operation on the innermost circumference of the magnetic optical disc 90 when the magnetic optical disc 90 is mounted on the recording and playback apparatus 1. It should be noted that the management information is recorded on that innermost circumference. The management information read out from the magnetic optical disc 90 is stored in the buffer memory 13 so that the information can be referenced readily during an operation to record, play back and edit a program.

The U-TOC is updated in accordance with an operation to record data of a program and various kinds of program editing. Each time a recording or editing operation is carried out, the system controller 11 updates the contents of the U-TOC stored in the buffer memory 13. The updated U-TOC is then recorded into the magnetic optical disc 90 with predetermined timing after the update processing.

The magnetic optical disc 90 also includes files for storing AUX data separately from programs. An AUX-TOC is created on the magnetic optical disc 90 to be used in controlling the AUX-data files.

The system controller 11 also reads out the AUX-TOC when reading out the U-TOC. The AUX-TOC is also kept in the buffer memory 13 so that it can be referenced readily to check the management status of AUX data when necessary.

The system controller 11 reads out an AUX-data file in a n operation to read out the AUX-TOC or at predetermined timing and stores the file into the buffer memory 13. Characters and a picture stored in the file as AUX data is then output to the display unit 24 or an external apparatus by way of the IEEE1394 interface 25 with timing controlled by the AUX-TOC.

2. Sector Format and Address Format

Data units such as a sector and a cluster are explained with reference to FIGS. 2A to 2E.

Figures 2A, 2B, 2C, 2D, 2E:
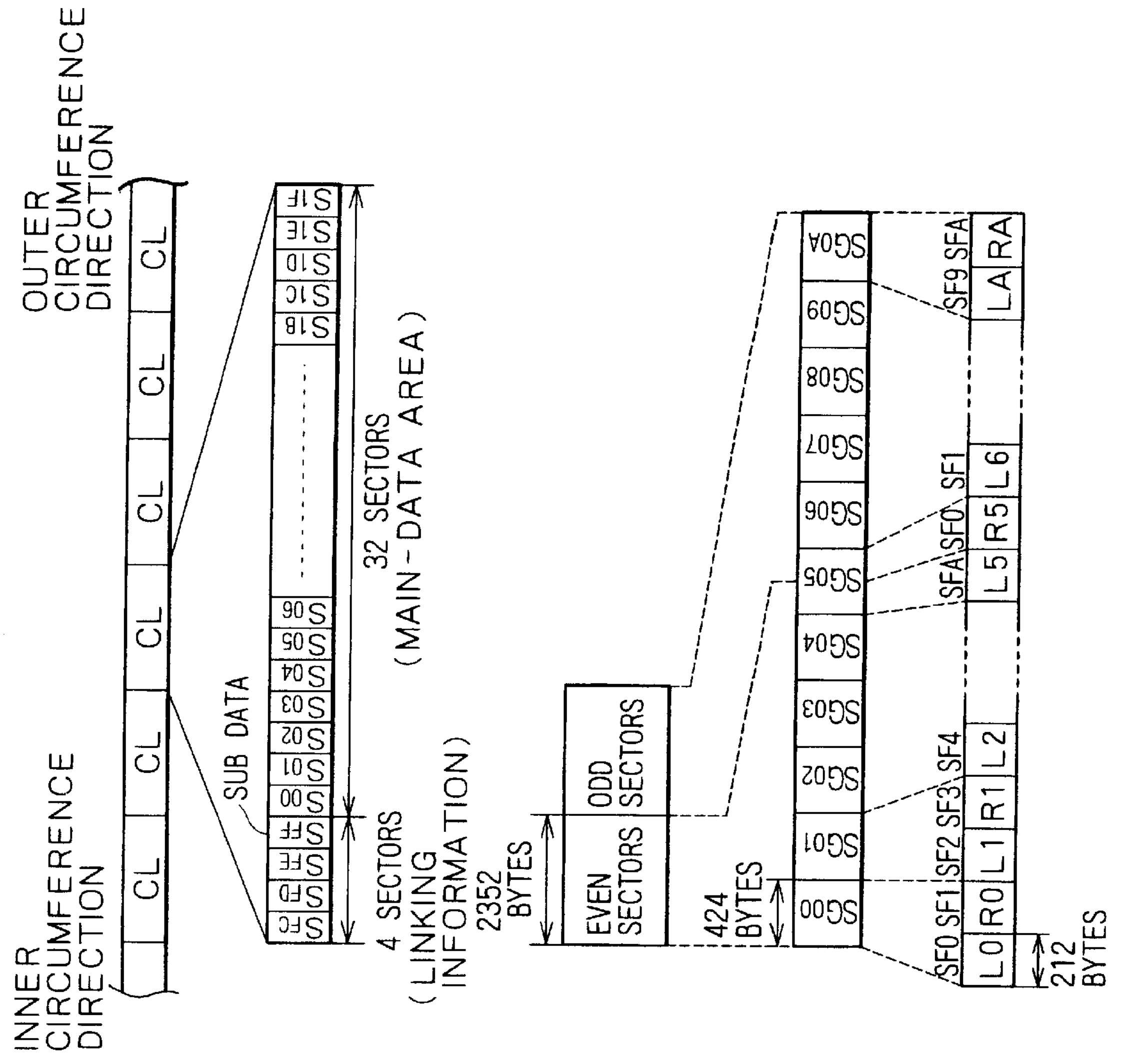
FIG. 2A is a modeling diagram showing a configuration of clusters recorded on a magnetic optical disc provided by the present invention.
FIG. 2B is a modeling diagram showing a configuration of sectors composing each of the clusters shown in FIG. 2A.
FIG. 2C is a modeling diagram showing a sound unit including a pair of odd-numbered and even-numbered sectors.
FIG. 2D is a modeling diagram showing a configuration of sound groups composing the sound unit of the pair of odd-numbered and even-numbered sectors shown in FIG. 2C.
FIG. 2E is a modeling diagram showing a configuration of pairs composing the sound groups shown in FIG. 2D with each of the pairs comprising right-channel data and left-channel data.

Recording tracks of a mini-disc system can be considered as a continuous sequence of clusters CL shown in FIG. 2A. 1 cluster CL is a smallest unit in a recording operation which corresponds to 2 to 3 circular tracks.

As shown in FIG. 2B, each cluster CL comprises a linking area and a ma in-data area. The linking area comprises 4 sectors, namely, sectors SFC to SFF. On the other hand, the main-data area comprises 32 sectors, namely, sectors S00 to S1F.

1 sector is a data unit with a size of 2,352 bytes.

The sector SFF, one of the four sectors in the linking area, can be used as a sector for storing information as sub-data. However, the remaining 3 sectors, namely, the sectors SFC to SFE, can not be used for recording data.

On the other hand, other kinds of data such as TOC data, audio data and AUX data are recorded in the main-data area which comprises 32 sectors as described above.

It should be noted that an address is stored for each sector.

Each sector is further divided into finer units each called a sound group. To put it in detail, 2 sectors are divided into 11 sound groups as shown in FIGS. 2C and 2D.

To be more specific, 2 adjacent sectors, namely, an even-numbered sector such as a sector S00 and an odd-numbered sector such as a sector S01, comprise sound groups SG00 to SG0A as shown in FIG. 2D. 1 sound group has a size of 424 bytes and contains audio data of an amount corresponding to a playback time of 11.61 msec.

In 1 sound group SG, data is recorded, being split into left and right channels. For example, in the sound group SG00, data is recorded, being split into a left channel L0 and a right channel R0 as shown in FIG. 2E. By the same token, in the sound group SG01, data is recorded, being split into a left channel L1 and a right channel R1.

It should be noted a data area of the left or right channel with a size of 212 bytes is called a sound frame Next, an address format adopted in the mini-disc system is explained with reference to FIGS. 3A and 3B.

The location of each sector is identified by a cluster address and a sector address. As shown in FIG. 3A, a cluster address is 16 bits (=2 bytes) in length and a sector address is 8 bits (=1 byte) in length.

The 3 bytes of a cluster address and a sector address are recorded at the beginning of each sector.

A sound-group address with a length of 4 bits can be used to represent the location of a sound group in a sector. Typically, management information such as the U-TOC includes details such as sound-group addresses. In this case, a play back location can be specified as a location of a sound-group unit.

By the way, in order to include a cluster address, a sector address and a sound-group address in the U-TOC or AUX-TOC as information with a length of only 3 bytes, addresses of a short format shown in FIG. 3B are used.

First of all, since 1 cluster comprises only 36 sectors, a sector address can be expressed by 6 bits. Thus, the 2 most significant bits of a sector address can be discarded. By the same token, since the cluster address of each of clusters including those on the outermost circumference of the magnetic optical disc 90 can be expressed by using only 14 bits, the 2 most significant bits of a cluster address can be discarded.

Since the sector address and the cluster address can each be shortened by 2 bits, a full address including a sound-group address can be expressed by using only 3 bytes.

In addition, in the U-TOC and AUX-TOC to be described later, an address used for con trolling information such as a playback position and playback timing is expressed in the short format described above. The address can be an absolute address or an offset address. An offset address is an offset relative to a reference. For example, the beginning of a program such as a piece of music is used as a reference address of 0. In this case, an offset address of a location in the program is a distance from the beginning of the program to the location. Examples of the offset address are shown in FIGS. 4A to 4C.

As will be described later in more detail with reference to FIGS. 5A to 5B, programs such as pieces of music are recorded on a disc starting from the 50th cluster. In hexadecimal expression, the 50th cluster is also referred to as cluster 32h where the character "h" appended to a number in this specification indicates that the number is expressed in a hexadecimal format.

Assume that the beginning of a 1st program located at cluster 0032h, sector 00h, sound group 0h. In this case, as shown in FIG. 4A, the address of the beginning of the 1st program is "00000000001100100000000000000". That is to say, the numbers 0032h, 00h and 0h of cluster 32h, sector 00h and sound group 0h respectively expressed in a short binary format are "000000001100100000000000" as shown in FIG. 4A. Expressed in a short hexadecimal format, these numbers are "00h, C8h, 00h".

Examples of absolute and offset addresses are shown in FIG. 4B. As shown in the figure, the absolute address of a location of the first program at cluster 0032h, sector 04h, sound group 0h, for example expressed in the short hexadecimal format is "00h, C8h, 40h". However, the offset address of the same location (that is, the location of the first program at sound group 0000h in sector 04h of cluster 32h) expressed in the short hexadecimal format with the address of the beginning of the first program of FIG. 4A used as a reference is "00h, 00h, 40h".

Other examples of absolute and offset addresses are shown in FIG. 4C. As shown in the figure, the absolute address of another location of the first program at sound group 9h in sector 13h of cluster 0032h for example expressed in the short hexadecimal format is "00h, C9h, 39h". However, the offset address of the same location expressed in the short hexadecimal format with the address of the beginning of the first program of FIG. 4A used as a reference is "00h, 01h, 39h".

As described above, the location in the program can be designated according to these absolute address and offset address.

3. Area Structure

An area structure of the magnetic optical disc 90 used in this embodiment is explained with reference to FIGS. 5A and 5B.

Figure 5A:
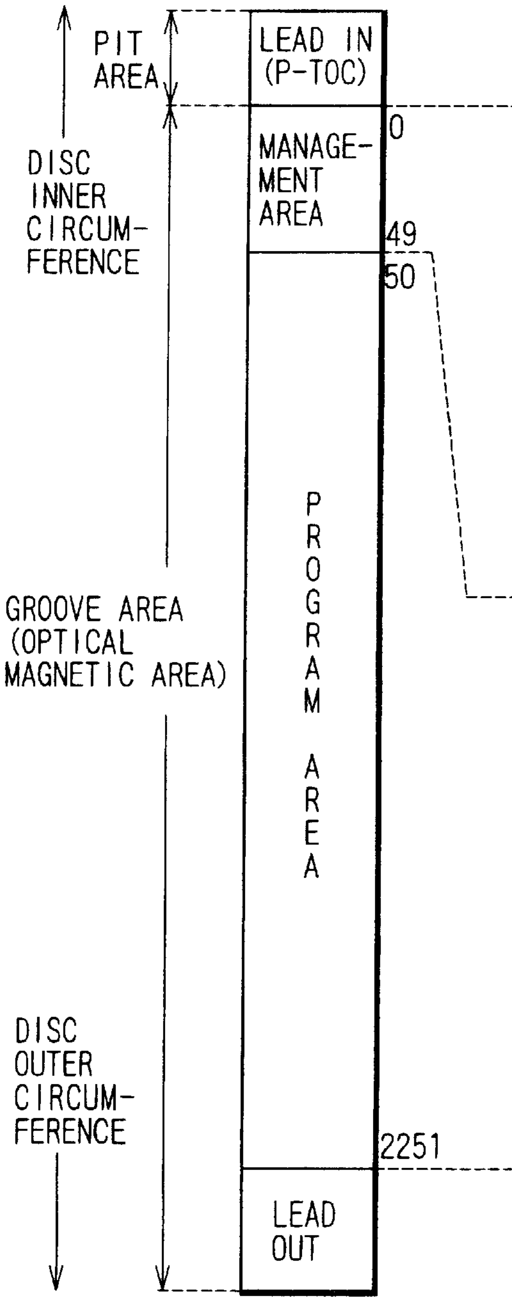
FIG. 5A is a modeling diagram showing the structure of areas composing a magnetic optical disc provided by the present invention.

FIG. 5A is a diagram showing areas starting from the innermost circumference of the magnetic optical disc 90 and ending at the outermost circumference thereof.

The innermost circumference of the magnetic optical disc 90 is a pit area in which data to be played back is created by emboss pits. In this area, the P-TOC is recorded.

Circumferences on the outer side of the pit area are used as an optical magnetic area. The optical magnetic area is an area in which grooves are created as guide trenches of recording tracks. Data can be recorded into or played back from this optical magnetic area.

A segment comprising cluster 0 to cluster 49 on the innermost circumferences of this optical magnetic area is used as a management area. Programs such as actual pieces of music are recorded in a program area comprising cluster 50 to cluster 2,251. A circumference on the outer side of the program area is used as a lead-out area. On the other hand, the pit area on the innermost circumference is used as a lead-in area.

Figure 5B:
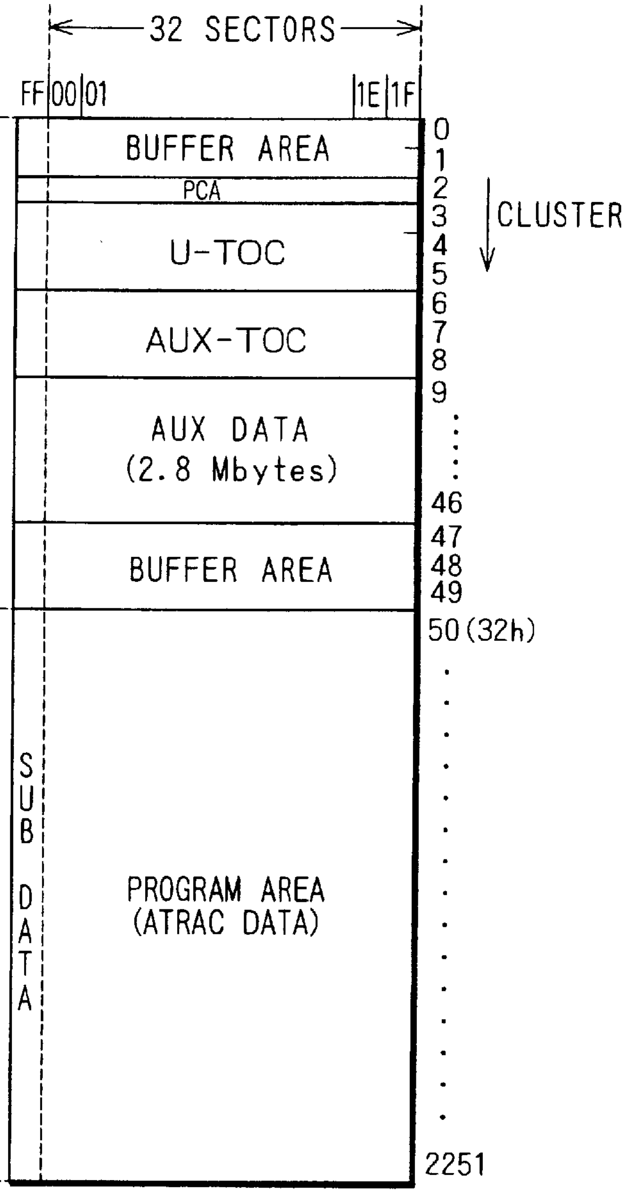
FIG. 5B is a modeling diagram showing details of a management area on the magnetic optical disc shown in FIG. 5A.

FIG. 5B is a diagram showing the management area in detail. A horizontal row in FIG. 5B represents 32 sectors composing a cluster. Thus, the figure shows a vertical array of clusters.

Clusters 0 and 1 in the control area are used as a buffer area adjacent to the pit area. Cluster 2 is used as a PCA (power calibration area) which is used for, among other purposes, adjustment of the output power of the laser beam.

Clusters 3, 4 and 5 are a region for recording the U-TOC, the contents of which will be described later. A data format of each sector in every cluster in this area is prescribed so that predetermined management information is recorded in each sector. To put it in detail, clusters 3, 4 and 5 are each a cluster having sectors for recording the U-TOC.

Clusters 6, 7 and 8 are a region for recording the AUX-TOC, the contents of which will be described later. A data format of each sector in every cluster in this area is prescribed so that predetermined management information is recorded in each sector. To put it in detail, clusters 6, 7 and 8 are each a cluster having sectors for recording the AUX-TOC data three times.

An area from cluster 9 to cluster 46 is used for recording AUX data. A data file for storing AUX data is created with the sector used as a unit. As will be described later, there are picture-file sectors used for recording a still-picture file, text-file sectors used for recording a character-information file and karaoke-text-file sectors used for recording a character-information file to be played back in synchronization with a program.

Areas for recording data files used for storing AUX data and AUX-data files in the AUX-data area are controlled by the AUX-TOC.

It should be noted that, with an error correction system mode taken into consideration, the storage size of a data file in the AUX-data area is 2.8 Mbyte.

It is also conceivable to increase the storage size of a data file by creating a second AUX-data area, for example, in the latter half of the program area or in an area on a circumference on the outer side of the program area.

Clusters 47, 48 and 49 are used as a buffer area adjacent to the program area.

The program area comprising clusters starting with cluster 50 (or cluster 32h) is used for recording audio data of 1 or a plurality of pieces of music completing a compression process conforming to a compression technique known as an ATRAC (Adaptive TRansform Acoustic Coding) system.

Areas for recording programs are controlled by the U-TOC.

It should be noted that sector "FF"h in each cluster in the program area is used for recording some information as sub-data as described earlier.

It is worth noting that, in the mini-disc system, a playback-only disc is also used. On such a disc, programs are recorded in a pit form as data for playback operations. The entire area of a playback-only disc is a pit area. Programs recorded on such a disc are controlled by the P-TOC that has about the same configuration as the U-TOC to be described later. However, there is no U-TOC created.

It should be noted that when a playback-only file is recorded as AUX data, an AUX-TOC for controlling such files is also recorded.

4. U-TOC

4-1 U-TOC Sector 0

As described earlier, in order to record and/or play back a program onto and/or from the optical magnetic disc 90, the system controller 11 reads out the P-TOC and the U-TOC recorded on the optical magnetic disc 90 as management information in advance, storing them in the buffer memory 13 and, if necessary, refers to them later.

The following description explains a U-TOC sector used for storing management information for controlling, among other things, operations to record and/or play back a program onto and/or from the optical magnetic disc 90.

It should be noted that, as described earlier by referring to FIG. 5A, the P-TOC is read-only information recorded in a pit area on the innermost-circumference side of the optical magnetic disc 90. The locations of areas for recording data, the lead-out area and the U-TOC area on the optical magnetic disc 90 are controlled by the P-TOC. It is worth noting that, in the case of a playback-only optical disc on which all data is recorded in the pit form, pieces of music recorded in the ROM form can be controlled by the P-TOC. Thus, no U-TOC is created.

No explanation of details of the P-TOC is given. The following description explains the U-TOC provided on an optical magnetic disc 90 on which data can be recorded.

FIG. 6 is a diagram showing the format of the U-TOC sector 0.

It should be noted that sector 0 to sector 32 can be allocated as sectors of the U-TOC. Sector 1 and sector 4 are used for recording character information whereas sector 2 is used as an area for recording a recording time and a recording date.

The description begins with an explanation of the U-TOC sector 0 which is absolutely required in operations to record and play back data onto and from the optical magnetic disc 90.

The U-TOC sector 0 is a data area for recording management information for controlling free areas used for recording a program obtained as a result of an operation carried out by the user to record a piece of music or for newly recording a program.

In an operation to record a piece of music onto the optical magnetic disc 90, for example, the system controller 11 searches the U-TOC sector 0 for the location of a free area and the audio data of the music is then recorded into the free area found in the search. By the same token, in a playback operation, the U-TOC sector 0 is searched for the location of an area from which a piece of music is to be played back, and an access to the area is then made to carry out the playback operation.

At the beginning of the data area of the U-TOC sector 0 which has a size of 4 bytes×588 or 2,352 bytes, 1-byte data comprising all 0s or all 1s is recorded as a synchronization pattern.

3 bytes following the synchronization pattern are used for recording an address which comprises a cluster address occupying 2 bytes and a sector address occupying the remaining 1 byte denoted by notation Sector in FIG. 6. The cluster address comprises Cluster H in the high-order byte and Cluster L in the low-order byte. The 3-byte address is followed by a byte for recording mode information denoted by notation MODE in the figure. The synchronization pattern, the 3-byte address and the 1-byte mode information constitute a header. The 3-byte address is the address of this sector itself.

In addition to the U-TOC sector 0, such a header which includes a synchronization pattern also exists in other sectors of the U-TOC, all sectors of the P-TOC, all sectors of an AUX-TOC, all sectors of the AUX-file and all sectors of each program. The description of headers in sectors described later by referring to FIG. 8 and subsequent figures is thus omitted. It is not necessary to reiterate that each sector has a header including the address of the sector itself and a synchronization pattern.

It should be noted that, as described above, the address of a sector comprises a 1-byte sector address (Sector) and a 2-byte cluster address composed of a high-order byte Cluster H and a low-order byte Cluster L. Thus, the format of the address of a sector is not the short format.

Predetermined bytes following the header are used for recording data such as a maker code, a model code, the track number of the first track (First TNO), the track number of the last track (Last TNO), a state of utilization of sectors (Used sectors), the disc serial number and the disc ID.

Following the disc ID, an area serving as a pointer section for recording a variety of pointers is further provided for the table section. The table section is used for controlling areas of tracks recorded by the user and free areas. The pointers include a P-DFA (Pointer for Defective Areas), a P-EMPTY (Pointer for Empty slots), a P-FRA (Pointer for Free Areas) and a P-TNO1 to a P-TN0255.

The pointers P-DFA to P-TNO255 are associated with 255 part tables which is also referred to as a table section. Since the table section comprises 255 part tables or the array has 255 elements; 01h to FFh. Each part table includes the start address of a part to be described below, the end address of the part and information on the mode of the part. If a part in a specific part table is continued to another part table, the specific part table includes a link to the other part table which includes the start address of the other part, the end address of the other part.

It should be noted that a part is a portion of a track in which data contiguous along the time axis is physically recorded continuously.

The start address of a part is the address of the beginning of the part and the end address of a part is the address of the end of the part. A track may comprise 1 or a plurality of parts.

The start and end addresses of a part are recorded in a part table each in the short format which specifies a cluster, a sector and a sound group at which the part is located.

In a recording and playback apparatus of this type, even if data of a piece of music is recorded physically, discontinuously, that is, recorded on a plurality of parts, since a playback operation is carried out by making accesses to the parts, there is no problem encountered during the playback operation. Thus, data such as a piece of music recorded by the user may be split into a plurality of parts so as to allow recording areas to be utilized with a high degree of efficiency.

For this reason, a link cited earlier is used. As described above, 01h to FFh are assigned to the part tables. A link included in a part table describing a specific part table is a subscript assigned to another part table as a continuation of the specific part table.

Assume that a recorded piece of music is split into 3 parts each described by a part table in the U-TOC sector 0. In a playback operation, the piece of music is reproduced by concatenating pieces of data recorded in the 3 parts by using links.

It should be noted that actually the link is indicated by a value representing a byte position in the U-TOC sector 0 by predetermined calculation process. In particular, a part table is designated as 304+(link)×8 (-th byte).

The pointers P-DFA, P-EMPTY, P-FRA and P-TNO1 to P-TNO255 are associated with the part tables 01h to FFh of table section of the U-TOC sector 0 to indicate the contents of parts described by the part tables as follows.

The pointer P-DFA is provided for a defective area or a plurality of defective areas on the optical magnetic disc 90. The defective area or the defective areas caused typically by injuries may comprise a part (that is, a portion of a track) or a plurality of parts each described by a part table. The pointer P-DFA is thus associated with a part table which describes the part or the first one of the plural parts. To put it concretely, the pointer P-DFA is set at a value equal the subscript of the part table which is in the range 01h to FFh. The part table with which the pointer P-DFA is associated contains the start and end addresses of the part. If a plurality of defective parts exist, the part table describes the first part and includes a link to another part table describing a next defective part. A part table describing the last defective part has its link set at "00h" to indicate that this part table is the last part table for the defective areas and is thus not linked to another part table.

The pointer P-EMPTY is provided for indicating an unused part table or a plurality of unused part table in the management table section. The pointer P-EMPTY is thus associated with an available part table or the first available part table. To put it concretely, the pointer P-EMPTY is set at a value equal the subscript of the available part table which is in the range 01h to FFh. The part table with which the pointer P-EMPTY is associated is available for use.

If a plurality of unused part tables exist, the part table associated with the P-EMPTY includes a link to another unused part table. By the same token, the other unused part table includes a link to still unused another part table and so on. All unused part tables are linked on the management table section.

The pointer P-FRA is provided for a free area or a plurality of free areas on the optical magnetic disc 90 into which data can be written. The free area or the free areas which include areas with data thereof deleted may comprise a part (that is, a portion of a track) or the first part table of plural part tables. The pointer P-FRA is thus associated with a part table which describes the part or the first one of the parts. To put it concretely, the pointer P-FRA is set at a value equal to the subscript of the part tables which is in the range 01h to FFh. The part table with which the pointer P-FRA is associated contains the start and end addresses of the part. If a plurality of free parts exist, the part table describes the first part and includes a link to another part table describing a next free part. By the same token, the other part table describes the next free part and includes a link to still another part table describing still another free part and so on. A part table describing the last free part has its link set at "00h" to indicate that this part table is the last part table for the free areas and is thus not linked to another part table.

Figure 7:
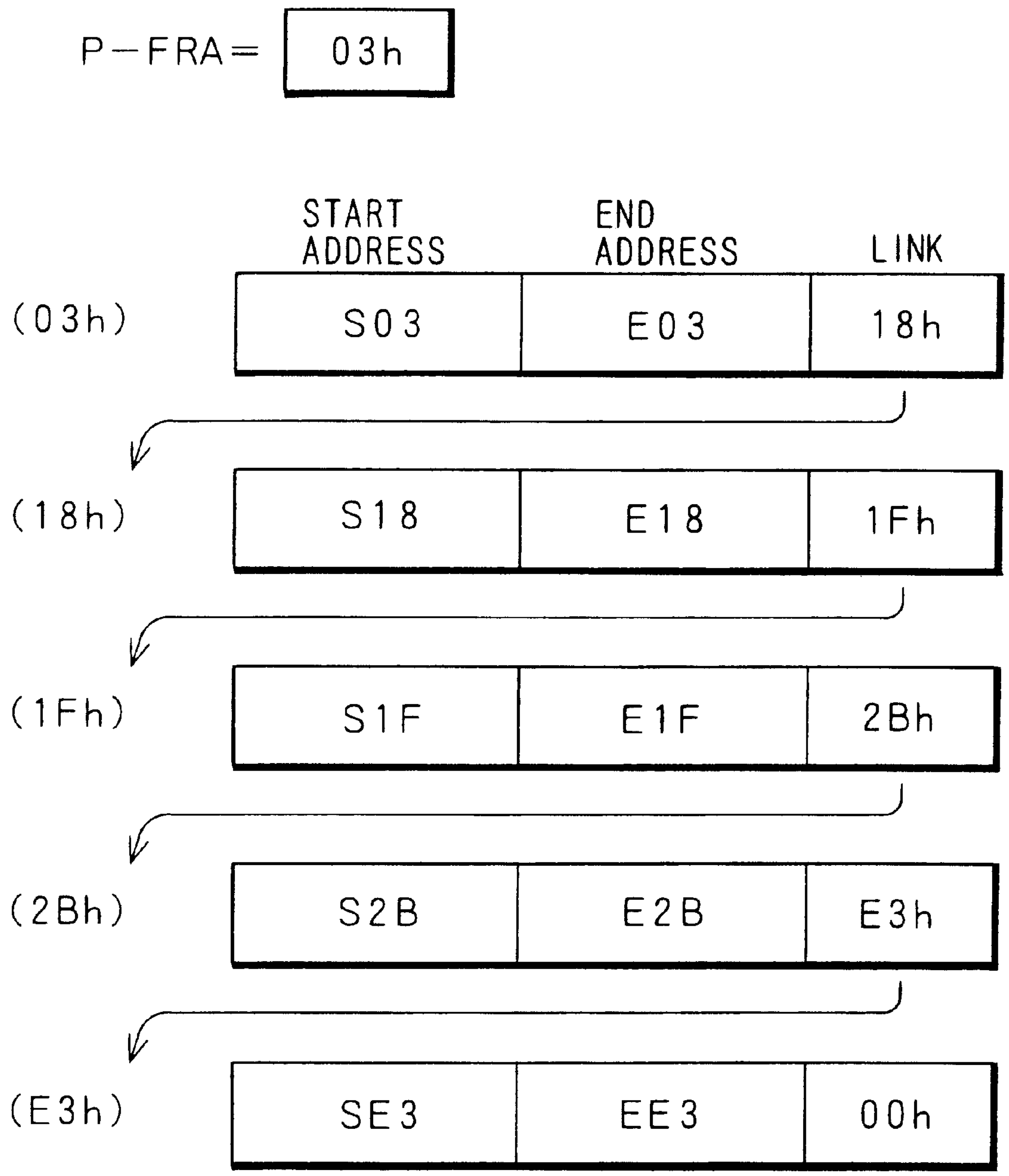
FIG. 7 is a modeling diagram showing a linked list of part tables in the U-TOC sector 0 shown in FIG. 6.

FIG. 7 is a diagram showing a model as to how parts composing free areas are described by part tables in the table section. As shown in the figure, the parts which are now free areas are described by part tables with subscripts (03h), (18h), (1Fh), (2Bh) and (E3h). The pointer P-FRA is set at a value equal to the subscript 03h of the first part table. The link of the first part table is set at a value equal to the subscript 18h of the second part table. The link of the second part table is set at a value equal to the subscript 1Fh of the third part table. The link of the third part table is set at a value equal to the subscript 2Bh of the fourth part table. The link of the fourth part table is set at a value equal to the subscript E3h of the last part table. Finally, the link of the last part table is set at 00h to indicate that this part table is the last part table for the free areas and is thus not linked to another part table. It should be noted that defective areas and unused part tables described above are described by part tables in the table section in the same way.

The pointers P-TNO1 to P-TNO255 are associated with part tables each describing a part on the optical magnetic disc 90 used by the user for recording a track such as piece of music. For example, the pointer P-TNO1 is associated with a part table describing a part or the time-wise first one of a plurality of parts in which data of a first track has been recorded.

Assume for an example that the musical data of this first track can be accommodated in a part on the optical magnetic disc 90 without splitting the data into a plurality of parts. In this case, the start and end addresses of the recording area of the only one part accommodating this track are described in a part table associated with the pointer P-TNO1.

As another example, assume that the musical data of a second track is recorded discretely into a plurality of parts on the optical magnetic disc 90. In this case, the parts are described by a plurality of linked part tables. The start and end addresses of the recording area of the first part in the time-axis sequence are described in a part table associated with the pointer P-TNO2. Since a plurality of free parts are used, the part table describing the first part includes a link to another part table describing the next part in the sequence along the time axis. By the same token, the other part table describes the next part and includes a link to still another part table describing still another part in the sequence along the time axis and so on. A part table describing the last free part has its link set at "00h" to indicate that this part table is the last part table for the recording areas and is thus not linked to another part table.

By sequentially linking part tables to describe parts for recording the musical data of the second track in this way, data of the U-TOC sector 0 can be used in an operation to play back or to record the second track. To put it in detail, the optical head 3 and/or the magnetic head 6*a* are moved in accesses to discrete parts described by start and end addresses in the data of the U-TOC sector 0 in order to reproduce continuous musical information or utilize recording areas with a high degree of efficiency.

As described above, the P-TOC is used for controlling the whole area of the writable optical magnetic disc 90 and the U-TOC is used for controlling recordable user areas including areas already used for recording musical data and free areas.

4-2 U-TOC Sector 1

FIG. 8 is a diagram showing the format of the U-TOC sector 1. Sector 1 is a recording area used for recording names of recorded tracks and the name of the magnetic optical disc 90 itself. Such names are typically entered by the user and recorded in sector 1 as character information.

The U-TOC sector 1 also includes a pointer section comprising pointers P-TNA1 to P-TNA255 which are associated with tracks as follows. The pointers P-TNA1 to P-TNA255 are each set at a value equal to the subscript of an 8-byte slot in a slot section following the pointer section. The slot section is an array of 255 slots each having a length of 8 bytes. The positions of the slots in the slot section are indicated by subscripts in the range 01h to FFh. In addition, the slot section includes an 8-byte slot with a subscript of 00h. In the U-TOC, the slot section in sector 1 has the same format as the part table in sector 0 with the slots of the former corresponding to the part tables of the latter and there manages the character information.

Each of slots 01h to FFh is used for recording character information representing the title of the disc or the name of a track in the ASCII (American Standard Code for Information Interchange)-code format.

The pointers are associated with tracks as follows. For example, assume that the pointer P-TNA1 is associated with a first track. In this case, the characters entered by the user to represent the name of the track are recorded in a slot indicated by the pointer P-TNA1 which is set at a value equal to the subscript of the slot. If the name of the track can not be accommodated in a slot, a plurality of slots are required. In this case the slot denoted by the pointer P-TNA1 includes a link linked to another slot for recording the remaining part of the track name. By the same token, the other slot may include a link linked to still another slot for describing the still remaining part of the track name and so on. In this way, the name of a track can comprise more than 7 characters or 7 bytes.

It should be noted that, as described above, slot 00h also having a size of 8 bytes is provided as a slot dedicated to the name of the disc only. This slot is not pointed to by any pointer P-TNA (x).

The pointer P-EMPTY in the U-TOC sector 1 is used to indicate empty slots in the slot section as the pointer P-empty in the U-TOC sector 0 is used to indicate empty part table in the table section.

4-3 U-TOC Sector 2

FIG. 9 is a diagram showing the format of the U-TOC sector 2 which is provided mainly as a data area used for recording times and recording dates at and on which the user records pieces of music.

The U-TOC sector 2 includes a pointer section comprising pointers P-TRD1 to P-TRD255 which are each associated with a recorded track, and a slot section comprising 255 8-byte slots 01h to FFh pointed to by the pointers P-TRD1 to P-TRD255. The slot section of the UTOC sector 2 has all but the same format as the slot section of the U-TOC sector 1 described above.

The recording time and the recording date of a track are recorded in 6 bytes of any of the slots 001h to FFh. To be more specific, the 6 bytes are used for recording 6 pieces of numerical information respectively, one byte for each piece, namely, the year, month and the day parts of the recording date and the hour, minute and second parts of the recording day. The remaining 2 bytes are allocated to a maker code and a model code respectively. A maker code is a code indicating a maker of a recording apparatus used for recording this piece of music and a model code is a code indicating the type of the recording apparatus.

Assume for example that a track is recorded on the magnetic optical disc 90 as a first piece of music. In this case, in a slot pointed to by the pointer P-TRD1, the recording date and the recording time of the first piece of music as well as the maker code and the model code of the recording apparatus are recorded. The recording date and the recording time are obtained and recorded automatically by the system controller 11 with reference to an internal clock.

The slot section also includes slot 00h also having a size of 8 bytes which is provided as a slot dedicated to the recording time and the recording data of the disc. This slot is not pointed to by any pointer P-TRD (x).

It should be noted that the pointer P-EMPTY in the U-TOC sector 2 is used to indicate empty slots in the slot section as the pointer P-EMPTY in the U-TOC sector 1 is used to indicate empty slots in the slot table of sector 1. To be more specific, the P-EMPTY is set at a value equal to the subscript of the first empty slot. In each of the empty slots except the last one, the byte for recording a model code is used for storing a link.

4-4 UTOC Sector 4

FIG. 10 is a diagram showing the format of the U-TOC sector 4. Much like sector 1 of the U-TOC, sector 4 is used for recording names of recorded tracks and the name of the magnetic optical disc 90 itself. Such names are typically entered by the user and recorded in sector 4 as character information. Comparison of FIG. 10 to FIG. 8 indicates that sector 4 has all but the same format as sector 1.

It should be noted, however, that sector 4 can be used for storing 2-byte codes such as code data of kanji and European characters like German and French. In addition to data stored in sector 1 shown in FIG. 8, sector 4 shown in FIG. 10 also includes a character-code attribute at a predetermined byte location.

Much like the U-TOC sector 1, character information recorded in the U-TOC sector 4 is controlled by pointers P-TNA1 to P-TNA255 and 255 slots 01h to FFh pointed to by the pointers P-TNA1 to P-TNA255.

It should be noted that the recording and playback apparatus 1 implemented by this embodiment can also be applied to a playback-only disc with no U-TOC recorded thereon. In the case of a playback-only disc, character information can be recorded in the P-TOC as the name of the disc and names of tracks.

That is to say, P-TOC sectors can be used as sectors 1 and 4 of the U-TOC in about the same way. In this case, the maker code is typically included in the name of the disc or the name of a track recorded in a sector of the P-TOC.

5. AUX-TOC 5-1 AUX-TOC Sector 0

The magnetic optical disc 90 used in this embodiment includes an area set for recordin g AUX-data files and the AUX-TOC described earlier with reference to FIG. 5B. An AUX-data file can be used for recording characters or pictures independently of a track such as a piece of music.

AUX-data files are controlled by the AUX-TOC which is recorded in 3 consecutive clusters. Much like the U-TOC, the clusters used for recording the AUX-TOC each comprise 32 sectors.

In this embodiment, sectors 0 to 5 are set in the AUX-TOC for controlling AUX-data files as described below.

First of all, sector 0 of the AUX-TOC is explained with reference to FIG. 11.

The AUX-TOC sector 0 is an area allocation table for mainly controlling free areas in the entire AUX-data area.

As shown in FIG. 11, at predetermined byte locations after the header in sector 0, 4 characters, namely, ‘M’, ‘D’, ‘A’ and ‘D’, are recorded in an area with a length of 4 bytes as ASCII codes. The header itself includes a sector address (Sector) of “00”h and mode information (Mode) of “02”h. The 4 characters ‘M’, ‘D’, ‘A’ and ‘D’ indicate a format ID which is recorded at the same byte positions in sectors of the AUX-TOC to be described later.

At predetermined byte positions after the format ID, a maker code and a model code are recorded. At predetermined byte positions after the model code, information on used sectors is recorded.

The information on used sectors shows the state of utilization of sectors in the AUX-TOC.

To put it in detail, 8 bits d8 to d1 composing Used sector 0 correspond to sectors 0 to 7. By the same token, 8 bits d8 to d1 composing Used sector 1 correspond to sectors 8 to 15. Likewise, 8 bits d8 to d1 composing Used sector 2 correspond to sectors 16 to 23. Similarly, 8 bits d8 to d1 composing Used sector 3 correspond to sectors 24 to 31.

The AUX-TOC sector 0 of includes a pointer section comprising pointers P-EMPTY and P-BLANK.

The sector also includes a table comprising 99 of 8-byte part table each used for recording start and end addresses of a part and a link to another part table in the same format as sector 0 of the U-TOC described above. In the case of the AUX-TOC, however, only part table 01h to 63h are used as the table section. The remaining part tables 64h to FFh are not used and the contents thereof are set at all 0s (zeros).

It should be noted, however, that the remaining part tables 64h to FFh can also be used but, in actuality, 99 part tables 01h to 63h are sufficient for controlling the AUX-data areas. Part tables 01h to 63h are determined as an effective table large enough for the size of the buffer memory 13 described earlier.

The pointer P-EMPTY points to the unused part table on a linked list of available part tables of the AUX-TOC sector 0.

The pointer P-BLANK points to the unused part table on a linked list of part tables describing a free part in the AUX-data area in which AUX data can be recorded as the pointer P-FRA in the U-TOC sector 0 does.

In general, start and end addresses are each expressed in the short format allowing a location down to the sound-group level to be specified. It should be noted, however that in the AUX-TOC sector 0 provided by this embodiment, an address is prescribed to be specified down to only the cluster level. Thus, the address of a sector and the address of a sound group are set at all 0s in the start and end addresses.

In table section or slot sections of sectors 1 to 5 of the AUX-TOC described below, start and end addresses are each expressed in the short format with a length of 3 bytes. The level to which a start or end address is to be specified in a sector is prescribed in dependence on the contents of the sector. Some explanation is given appropriately in the following description.

By the way, when an AUX-TOC is created on a playback-only disc, no link in a part table is used.

5-2 AUX-TOC Sector 1

Sectors 1 to 3 of the AUX-TOC are used for controlling picture files each for storing still-picture information.

The AUX-TOC sector 1 of shown FIG. 12 is a management sector serving as a picture allocation table for controlling data files each serving as a picture file in the AUX-data area.

The AUX-TOC sector 1 of is used for controlling picture files in the same way as sector 0 of the U-TOC.

In this embodiment, the length of a picture file for storing a still picture in the AUX-data area is not prescribed in particular. As will be described later, however, the embodiment has a configuration wherein only up to 100 picture files including a cover picture can be controlled. Thus, the number of recordable picture files is virtually 100.

It should be noted that an example of a cover picture is a picture appearing on the jacket of a disc which can be stored in a picture file.

In the case of the AUX-TOC sector 1, the sector address (Sector) is set at 01h and the mode information (MODE) are set at 02h.

Pointers P-PNO1 to P-PNO99 in the AUX-TOC sector 1 each serve as a pointer P-PNO (x) used for controlling the 99 picture files other than the picture file for storing a cover picture. Each byte location in an area between the pointer P-PNO99 and the table is set at 00h.

It should be noted, however, that in order to satisfy a requirement to record AUX data in more picture files due to future expansions of the AUX-data area or changes in file size, pointers P-PN100 to P-PN255 are set at bytes following the pointers P-PNO1 to P-PNO99 in the pointer section as shown in FIG. 12.

Area of 2 bytes following the maker code and the model code are used for storing a pointer First PNO and a pointer Last PNO respectively. The pointer First PNO is the number x of a first used pointer P-PNO (x) among the pointers P-PNO1 to P-PNO99. On the other hand, the pointer Last PNO is the number x of a last used pointer P-PNO (x) among the pointers P-PNO1 to P-PNO99. For example, assume that the pointers P-PNO1 to P-PNO5 of the pointers P-PNO1 to P-PNO99 are used. In this case the pointer First PNO is 01h whereas the pointer Last PNO is 05h.

In addition, the pointer section also includes the pointers P-PFRA and P-EMPTY. The table section is an array of 8-byte part tables each associated with one of the pointers described above. There are 99 part tables in the array which are identified by subscripts 01h to 63h. Each of the part tables is used for storing start and end addresses of a part and the mode of a picture (S. Pict. mode) recorded in the part. Like the AUX-TOC sector 0, the remaining part tables 64h to FFh in the array ate not used and their contents are all set at 0s (zeros).

By the way, a part table 00h is not pointed to by a pointer. Part table 00h describes the start and end addresses of a part for recording the cover picture. Part table 00h for describing the location of the cover picture also includes a picture mode (S. Pict. mode).

The pointers P-PNO1 to P-PNO99 each point to a part table describing the attributes of a part used as an area for recording a picture file. For example, the pointer P-PNO1 points to a part table describing the start and end addresses as well as the picture mode (S. Pict. mode) of a part used as an area for recording data of a picture.

It should be noted that, in sector 1 of the AUX-TOC, links (Link-P) are not used to form a linked list of part tables. This is because a picture is not split into parts (segments) physically separated from each other.

However, unused part tables in the sector 1 are controlled as a linked list starting with the pointer P-EMPTY. To put it in detail, the unused part tables on the list are linked by using the eighth byte of each of the part tables.

A pointer P-PFRA in the AUX-TOC sector 1 points to a pointer associated with free areas in a cluster of the AUX-data area. Data can be recorded into the free areas where picture data does not fill up the entire area of the cluster, leaving the free areas with no data recorded therein. To be more specific, the pointer pointed to by the pointer P-PFRA in sector 1 serves as a part table comprising the start and end addresses of a part (segment) in the free areas.

The picture mode (S. Pict. mode) included in each part table in the AUX-TOC sector 1 is information on a mode including copy status of a picture file recorded in a part with the start and end addresses thereof described in the part table.

The picture mode (S. Pict. mode) is defined as shown in FIG. 19A.

As shown in the figure, the picture mode included in a part table comprises 8 bits d1 to d8. The first 2 bits d1 and d2 are copy status. The copy status is information indicating whether an operation to copy the picture file described by the part table is permitted or not.

To be more specific, copy status of 0h indicates that the picture file can be copied unlimited number of times. Copy status of 1h indicates that the picture file can be copied only once more. Copy status of 2h indicates that the picture file can be copied only once through an authenticated data bus. Conversely speaking, a copy operation through an unauthenticated data bus is not permitted.

Copy status of 3h indicates that an operation to copy the picture file is not permitted.

The remaining bits d3 to d8 are not defined.

If a picture file is copied, the copy status of the file should be updated as shown in FIG. 19B. As shown in the figure, a pre-copy status given to a picture file before a copy operation is updated to a post-copy status given to the file after the copy operation in accordance with the contents of pre-copy status.

For example, in the case of a picture file with pre-copy status of 0h, the post-copy status of the picture file is 0h. That is to say, such a picture file can be copied an unlimited number of times.

In the case of a picture file with pre-copy status of 1h or 2h, on the other hand, the post-copy status is 3h to indicate that an operation to copy the picture file is no longer permitted.

5-3 AUX-TOC Sector 2

FIG. 13 is a diagram showing the format of the AUX-TOC sector 2 which is used as a picture-information table. To be more specific, sector 2 is a data area used for recording various kinds of information on pictures as character information. Information on a picture includes the name of a recorded picture file, a recording time, a recording date and a URL (Uniform Resource Locators) in the Internet. Hereinafter these information are called picture information.

Before describing sector 2 of the AUX-TOC, the structure of a picture-information file recorded in the table in sector 2 of the AUX-TOC is explained with reference to FIG. 20. A picture-information file is a file for storing information on a picture stored in a picture file.

Figure 20:
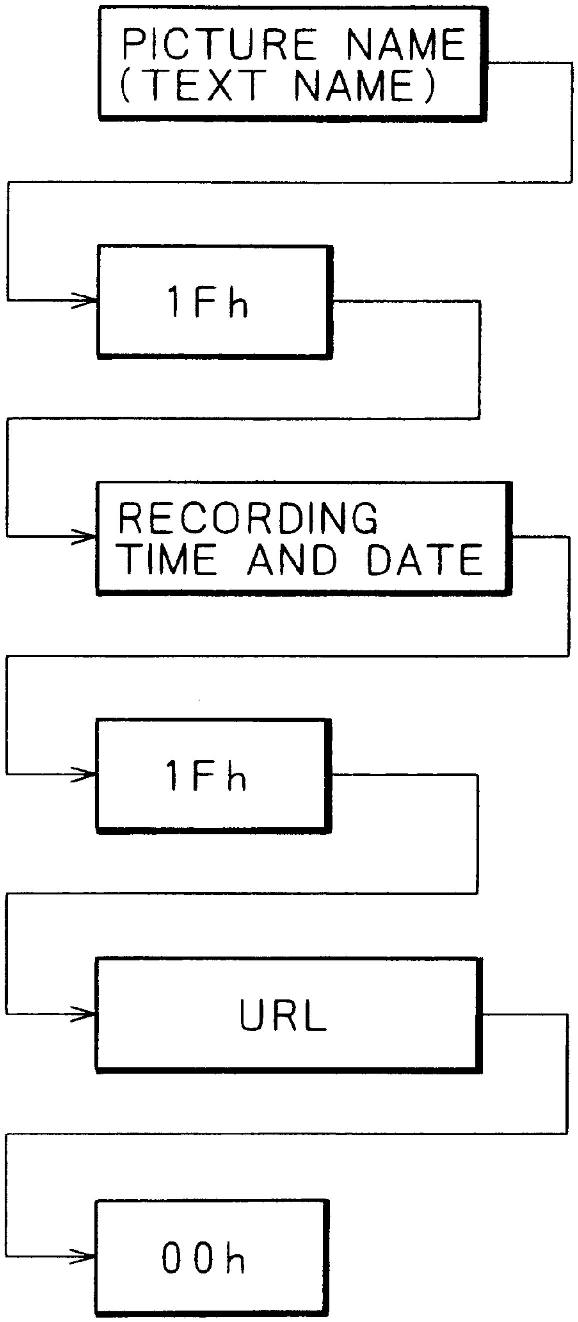
FIG. 20 is a modeling diagram showing the data structure of a picture/text information file.

As shown in FIG. 20, the information on a picture starts with a name of a picture which is a data unit expressed by ASCII (American Standard Code for Information Interchange) codes or other character codes. The name of a picture conforms to the format of character information recorded in a slot in the U-TOC sector 4 shown in FIG. 10.

The picture-name data unit is followed by a delimiter "1F"h for delimiting a data unit from another. The delimiter is followed by a data unit comprising a recording time and a recording day. This data unit conforms to the format of a recording date and a recording time recorded in a slot in the U-TOC sector 2 shown in FIG. 9. As described earlier, this format comprises 6 bytes.

The data unit comprising a recording time and a recording day is followed by a delimiter "1F"h which is followed by a character information representing a URL. A URL can be recorded as ASCII codes starting with the MSB (cost Significant Bit) without resorting to character codes to be described later. The information on a picture ends with an end of file "00"h.

It should be noted that a data unit representing a name of a picture, a recording time and a recording data or a URL may be set at "00"h to indicate that the data unit has no meaningful substance.

In the case of a picture file to be down-loaded from a home page on the Internet, for example, the URL included in the information on the picture is used to specify the home page for the picture file.

The AUX-TOC sector 2 is explained by referring back to FIG. 13.

To begin with, in the header of the AUX-TOC sector 2, the sector address (Sector) is set at "02"h and the mode information (MODE) is set also at "02"h.

In addition, the AUX-TOC sector 2 also includes a pointer section including pointers P-PIF1 to P-PIF99 to be associated with picture files. It should be noted that the pointer section can be extended to a pointer P-PIF255. The AUX-TOC sector 2 also includes a slot section comprising 255 slots 01h to FFh each having a length of 8 bytes and a slot 00h also having a length of 8 bytes. The slots 01h to FFh can be pointed to by the pointers P-PIF1 to P-PIF99.

Furthermore, an area following the maker code and the model code comprises 2 bytes for recording pointers First PIF and Last PIF respectively. The pointer First PIF is the number of a first used pointer P-PIF among the pointers P-PIF1 to P-PIF99. On the other hand, the pointer Last PIF is the number of a last used pointer P-PIF among the pointers P-PIF1 to P-PIF99.

In slots 00h to FFh, pieces of character information each representing a picture-information file is recorded as ASCII codes or codes of another type. The type of codes is indicated by a character code recorded at a predetermined byte location in sector 2 of the AUX-TOC. In the figure, this byte location is denoted by notation "char. code".

To put it concretely, a character code of "00"h indicates the ASCII code and a character code of "01"h indicates modified ISO (International Standard Organization) 8859-1. A character code of "02"h indicates a music shifted JIS (Japan Industrial Standard) and a character code of "03"h indicates KSC 5601-1989 (Korean). A character code of "04"h indicates GB2312-80 (Chinese).

The pointers P-PIF1 to P-PIF99 each point to a part table which is used for recording a picture-information file with a file number corresponding to the number of the pointer. For example, the pointer P-PIF1 with a number of 1 points to a slot for recording character information for a picture stored in the first picture file. It should be noted that slot 00h with a length of 8 bytes is used as a dedicated only start area for recording a picture-information file for a cover picture and not pointed by a pointer P-PIF (x).

Any of these slots 00h to 0FFh can be linked by links to form a linked list which can accommodate a picture-information file of 1 picture file exceeding 7 bytes.

The pointer P-EMPTY is the head of a linked list of available slots in the slot section.

It should be noted that, as an alternative, an AUX-TOC sector can also be allocated to each of names of pictures, recording times & recording dates and URLs separately so that names of pictures, recording times & recording dates and URLs can be controlled individually. By putting character information such as a name of a picture, a recording time & a recording date and a URL for a picture file in a single picture-information file as shown in FIG. 20 and storing all picture-information files in the AUX-TOC sector 2 as shown in FIG. 13, however, the amount of data used as management information is small, allowing the recording area of the magnetic optical disc 90 to be utilized with a high degree of efficiency in comparison with the alternative case wherein a AUX-TOC sector is allocated to each of names of pictures, recording times & recording dates and URLs separately.

5-4 AUX-TOC Sector 3

FIG. 14 is a diagram showing the format of sector 3 of the AUX-TOC which serves as a picture-playback-sequence table.

This table contains management information used for outputting picture files in synchronization with an operation to play back a program such as a piece of music.

The header of the AUX-TOC sector 3 includes a sector address (Sector) of "03"h and mode information (MODE) of "02"h.

In addition, sector 3 also includes a pointer section comprising pointers P-TNP1 to P-TNP99 associated with recorded picture files. The pointer section can be extended to a pointer P-TNP255. These pointers P-TNP1 to P-TNP99 are each associated with a track with the same number for recording audio data in the program area. That is to say, the pointers P-TNP1 to P-TNP99 are associated with the 1st to 99th tracks respectively.

The AUX-TOC sector 3 also includes a table section comprising 99 part tables 01h to 63h each having a length of 8 bytes and a part table 00h also having a length of 8 bytes. The part tables 01h to 63h can be pointed to by the pointers P-TNP1 to P-TNP99. In actuality, the table also includes unused part tables 64h to FFh which are each set at all 0s. Furthermore, an area following the maker code and the model code comprises 2 bytes for recording pointers First TNP and Last TNP respectively. The pointer First P-TNP is the number of a first used pointer P-TNP among the pointers P-TNP1 to P-TNP99. On the other hand, the pointer Last P-TNP is the number of a last used pointer P-TNP among the pointers P-TNP1 to P-TNP99.

In each of the part tables pointed to by the pointers P-TNP1 to P-TNP99 in the AUX-TOC sector 3, start and end offset addresses relative to the beginning of a track are recorded in the short format which specifies an address down to the sound-group level.

The fourth byte of each part table is a pointer P-PNOj indicating a specific picture file. The pointer P-PNOj is one of the picture files P-PNO1 to P-PN99 recorded in the AUX-TOC sector 1. The eighth byte is a link to another part table is used to form a linked list. In this way, a plurality of picture files indicated by the same plurality of pointers PNOj recorded in the same plurality of part tables on a linked list can be displayed for the same track.

Assume for example that it is desired to display a picture stored in a first picture file with specific timing during a playback operation to reproduce a piece of music recorded as a first track. In this case, the pointer P-TNP1 assigned to the first track is set at a value pointing to a part table and, in the part table, start and end addresses corresponding to the specific timing in the playback operation as well as a pointer P-PNOj indicating the first picture file containing the picture to be displayed are recorded. Assume that it is desired to display the picture during a period of time between a point of time lagging behind the playback start of the first track by 1 minute and a point of time lagging behind the playback start of the first track by 1 minute and 30 seconds. In this case, the start and end offset addresses recorded in the part table pointed to by the pointer P-TNP1 correspond to the point of time lagging behind the playback start of the first track by 1 minute and the point of time lagging behind the playback start of the first track by 1 minute and 30 seconds respectively. The pointer P-PNOj is set at the value of P-PNO1 indicating the first picture file containing the picture to be displayed.

If it is desired to display a plurality of pictures during a playback operation to reproduce a track, the pictures are specified in the same plurality of part tables each in the same way as the picture stored in the first picture file described above. Each part table is link to a next part table specifying a picture to be displayed next by a link to form a linked list. Each of the part tables contain a pointer specifying the picture associated with the part table and a period of time to output the picture.

It should be noted that the part table 00h is used naturally for specifying the cover picture. Since the cover picture is basically not displayed in synchronization with a playback operation to reproduce audio track, the start and end offset addresses recorded in the part table 00h are each set at all 0s.

The link recorded in the part table 00h may be set at a value pointing to another part table which includes a pointer P-PNOj. In this case, a picture file specified by the pointer P-PNOj is also controlled as another cover picture. That is to say, there can be a plurality of cover pictures.

By the way, in a part table associated with a track, the start and end offset addresses may be both set at all 0s. In this case, the picture stored in a picture file specified by the part table, that is, a picture file indicated by a pointer P-PNOj included in the part table, is output during the entire playback operation to reproduce the track.

In addition, in a part table associated with a track, only the end offset address may be both set at all 0s. In this case, a picture file indicated by a pointer P-PNOj included in the part table, is output during a playback operation to reproduce the track starting at a point of time corresponding to the start offset address recorded in the part table till the start offset address of a picture file to be displayed next.

Furthermore, in a part table associated with a track, the start and end offset addresses may be both set at the same value other than all 0s. In this case, an operation to play back a picture file indicated by a pointer P-PNOj included in the part table, is prohibited.

Also in the case of the AUX-TOC sector 3, unused part tables are controlled by using a linked list pointed to by the pointer P-EMPTY.

5-5 AUX-TOC Sector 4

Sectors 4 and 5 of the AUX-TOC are used for controlling text files.

The AUX-TOC sector 4 shown in FIG. 15 is a management sector which serves as a text allocation table. To put it in detail, the sector is used for controlling data files each recorded in the AUX-data area as a text file.

In the AUX-TOC sector 4, text files are controlled by using the same format as the U-TOC sector 0.

If the AUX-data file is all used for recording text files, text data of 38 clusters (×32 sectors×2,324 bytes) can be recorded. By using the AUX-TOC sector 4, however, the text data can be controlled as up to 255 files. It should be noted that, as will be described later, only 100 files including a cover text are controlled.

It is also worth noting that the length of a text file is 1 sector.

A specific text file is used for storing a cover text associated with the so-called cover picture of the magnetic optical disc 90.

The header of the AUX-TOC sector 4 includes a sector address (Sector) of "04"h and mode information (MODE) of "02"h.

In addition, sector 4 of the AUX-TOC also includes a pointer section comprising pointers P-TXN0(x) where x=1 to 99, that is, pointers P-TXN01 to P-TXN099 associated with recorded text files. The pointer section can be extended to a pointer P-TXN0255. These pointers P-TXN01 to P-TXN099 are each associated with an audio track with the same number. Thus, up to 99 text files associated with the 1st to 99th audio tracks can be controlled. The 99 text files exclude the cover text.

The pointer section also includes the pointers P-PFRA and P-EMPTY.

The pointers in the pointer section each point to a part table with a length of 8 bytes in a table sesction. The table section contains 99 active part tables 01h to 63h and inactive part tables 64h to FFh which are each set at all 0s. Each of the active part table 01h to 63h comprises a start address, an end address and a text mode.

It should be noted that the definition of the text mode will be described later.

Pointed to by none of the pointers, part table 00h is used as a part table dedicated to a cover text. To put it in detail, part table 00h comprises start and end addresses of the text file of the cover text as well as the text mode of the cover text.

The pointers P-TXN01 to P-TXN099 each point to a part table for describing an area for recording a text file and the text mode of the file. For example, the pointer P-TXN01 points to a part table comprising the start address, the end address and the text mode of a text file having a file number of 1.

It should be noted that, since the size of a text file is expressed in sector units as described above, the start and end addresses of a text file are each represented in a format down to the sector level only. The portion of the format showing the address at the group-sound level is set at "0"h.

In the AUX-TOC sector 4, links are not used for controlling files. That is to say, a text file is never recorded in segments or parts physically separated from each other.

It should be noted that, in the AUX-TOC sector 4, unused part tables are controlled by using a linked list pointed to by the pointer P-EMPTY. In the case of an unused part table, a link to a next unused part table is recorded in the eighth byte.

A pointer P-PFRA in the AUX-TOC sector 4 points to a part table associated with free areas in a cluster of the AUX-data area. Data can be recorded into the free areas where data of a text file does not fill up the entire area of the cluster, leaving the free areas with no data recorded therein. To be more specific, a part table pointed to by the pointer P-PFRA in sector 4 comprising the start and end addresses of a part (segment) in the free areas. Free areas can be controlled by using a linked list comprising part tables each including a link in the eighth byte thereof. That is to say, the free areas are a plurality segments separated from each other.

The definition of the text mode included in each part table of sector 4 of the AUX-TOC is described with reference to FIG. 21.

Located in the fourth byte of a part table, the text mode is a byte comprising 8 bits d1 to d8 as shown in the figure. The first 2 bits d1 and d2 are copy status which is the same as the copy status (S. Pict. mode) of a picture file explained earlier with reference to FIG. 19A. It is thus unnecessary to repeat its explanation.

The 2 bits d3 and d4 indicate what the contents of the text file are. To be more specific, d3 and d4 bits set at "0"h indicate that the contents of the text file are a sung text. That is to say, the contents of the text file are a libretto text of a piece of music recorded as an audio track with which the text file is associated. d3 and d4 bits set at "1"h indicate that the contents of the text file are information on an artist performing a piece of music recorded as an audio track such as the name of the artist.

d3 and d4 bits set at "2"h indicate that the contents of the text file are the so-called liner note such as an explanation appended to the album. d3 and d4 bits set at "3"h indicate that the contents of the text file are a text describing information other than a libretto, information on an artist and a liner note.

The bit d5 indicates whether or not a time stamp has been inserted into the text file. To be more specific, a d5 bit set at "0" indicates that no time stamp has been inserted. On the other hand, a d5 bit set at "1" indicates that a time stamp has been inserted. It should be noted that a time stamp will be described later with reference to FIG. 22.

The 3 bits d6, d7 and d8 indicate a character code. To be more specific, d6, d7 and d8 bits set at "0"h indicate the ASCII code. d6, d7 and d8 bits set at "1"h indicate modified ISO (International Standard Organization) 8859-1. d6, d7 and d8 bits set at "2"h indicate a music shifted JIS (Japan Industrial Standard). d6, d7 and d8 bits set at "3"h indicate KSC 5601-1989(Korean). d6, d7 and d8 bits set at "4"h indicate GB2312-80 (Chinese). The values "5"h and "6"h are reserved. d6, d7 and d8 bits set at "7"h indicate a plain text. By defining a text file as a plain text, it is possible to provide expandability to it as a character code.

5-6 AUX-TOC Sector 5

FIG. 16 is a diagram showing the format of the AUX-TOC sector 5. Sector 5 is used as a text-information table. To put it in detail, sector 5 is a data area used for recording various kinds of text information as character information. In this embodiment, text information is the name of a text, a recording time & a recording data and a URL of the Internet appended to a text file.

It should be noted that the structure of each text-information file recorded in the table of the AUX-TOC sector 5 conforms to the picture-information file shown in FIG. 20. In the case of a text-information file, however, the picture-name data unit shown in FIG. 20 is the name of a text.

As shown in FIG. 16, the format of the header of sector 4 of the AUX-TOC includes a sector address (Sector) of "05"h and mode information (MODE) of "02"h.

In addition, the AUX-TOC sector 5 also includes a pointer section including pointers P-TXIF1 to P-TXIF99 to be associated with recorded text files. It should be noted that the pointer section can be extended to a pointer P-TXIF255. The AUX-TOC sector 5 also includes a slot section comprising 255 slots 01h to FFh each having a length of 8 bytes and a slot "00"h also having a length of 8 bytes. The slots 01h to FFh can be pointed to by the pointers P-TXIF1 to P-TXIF99.

Furthermore, an area following the maker code and the model code comprises 2 bytes for recording pointers First TXIF and Last TXIF respectively. The pointer First TXIF is the number of a first used pointer P-TXIF among the pointers P-TXIF1 to P-TXIF99. On the other hand, the pointer Last TXIF is the number of a last used pointer P-TXIF among the pointers P-TXIF1 to P-TXIF99.

In slots "00"h to FFh, pieces of character information each representing a text information file is recorded as ASCII codes or codes of another type. The type of codes is indicated by a character code recorded at a predetermined byte location in the AUX-TOC sector 5. In the figure, this byte location is denoted by notation 'char. code'.

Much like the AUX-TOC sector 2, a character code of "00"h indicates the ASCII code and a character code of "01"h indicates modified ISO (International Standard organization) 8859-1. A character code of "02"h indicates a music shifted JIS (Japan Industrial Standard) and a character code of "03"h indicates KSC 5601-1989 (Korean). A character code of "04"h indicates GB2312-80 (Chinese).

The pointers P-TXIF1 to P-TXIF99 each point to a slot in the slot section which is used for recording a text-information file with a number corresponding to the number of the pointer. For example, the pointer P-TXIF1 with a number of 1 points to a slot for recording character information for a text stored in the first text file. It should be noted that slot "00"h with a length of 8 bytes is used as a dedicated start area for recording a text-information file for a cover text and not pointed by a pointer P-TXIF (x).

Any of these slots "00"h to "0FF"h can be linked by links to form a linked list which can accommodate a text-information file of 1 text file exceeding 7 bytes.

The pointer P-EMPTY is the head of a linked list of available slots in the slot section.

It should be noted that, as an alternative, a AUX-TOC sector can also be allocated to each of names of texts, recording times & recording dates and URLs separately so that the names of texts, recording times & recording dates and URLs can be controlled individually. However, by putting character information such as the name of a text, a recording time & a recording date and a URL for a text file in a single text-information file as shown in FIG. 20 and storing all text-information files in sector 5 of the AUX-TOC as shown in FIG. 16, the amount of data used as management information is small, allowing the recording area of the magnetic optical disc 90 to be utilized with a high degree of efficiency in comparison with the alternative case wherein a AUX-TOC sector is allocated to each of names of texts, recording times & recording dates and URLs separately.

6. Data Files

6-1 Text-File Sector

The following description explains 2 types of data file, namely, the picture file and the text file, which contain AUX data controlled by their respective sectors of the AUX-TOC having the formats described above.

To begin with, a picture file for storing a still picture has an arbitrary length.

A still picture has an image size of 640×480 dots and is a JPEG (Joint Photographic Experts Group) format base line. For controlling by the AUX-TOC, the bit stream stored in a picture file starts with an SOI (Start of Image) marker and ends with an EOI (End of Image) marker which conform to JPEG specifications.

In addition, since the sector format includes a mode of 2 and does not include a 3rd-layer ECC, the number of effective bytes of picture data stored in 1 sector is 2,324. In general, a JPEG picture file is recorded in 1 cluster which comprises 32 sectors. Thus, the actual data size has a value in the range 72,045 (=2,324×31+1) bytes to 74,368 (=2,324×32) bytes.

Figure 17:
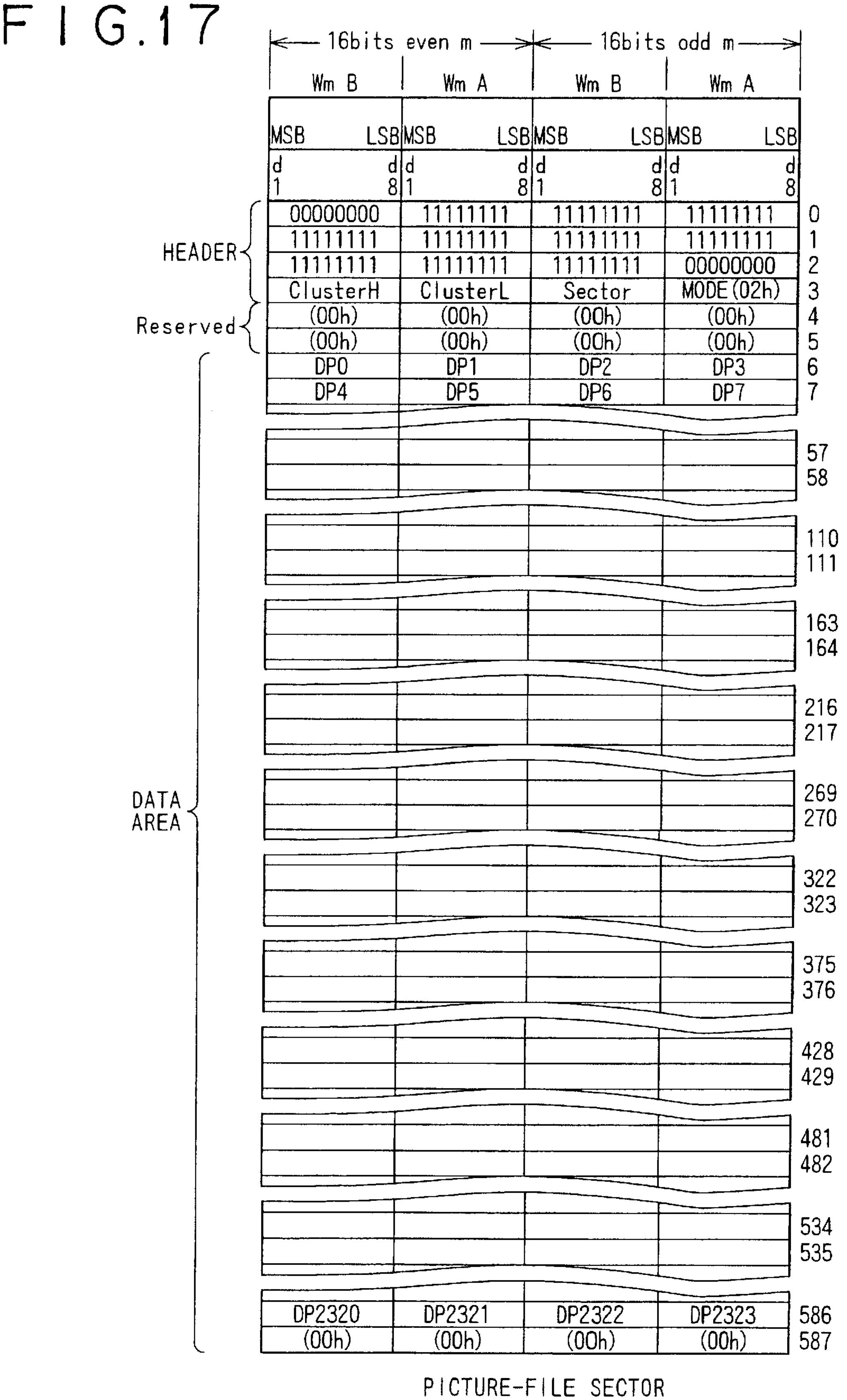
FIG. 17 is a table representing the format of a picture file sector in an AUX-data area on the magnetic optical disc.

A typical format of a sector for storing a picture file is shown in FIG. 17.

As shown in the figure, at the beginning of a sector, there is provided a 16-byte header which comprises a synchronization pattern, a cluster address (Cluster H and Cluster L), a sector address (Sector) and mode information of "02"h. The header is followed by 8 undefined or reserved bytes.

The reserved bytes are followed by a data area for recording 2,324-bytes of picture data which are denoted by data DP0 to DP2323.

4 bytes at the end of the sector are each set at "00"h. The 4 bytes may also be used as error detection parity bytes.

6-2 Text-File Sector

Text data stored in a text file may conform to the ASCII, Modified ISO 8859-1, Music Shifted JIS or other specifications indicated by the text mode recorded in the AUX-TOC sector 4.

A typical format of a sector for storing a text file is shown in FIG. 18. Much like the sector for recording a picture file, a sector for storing a text file comprises a 16-byte header, 8 undefined (reserved) bytes and a 2324-byte text file for storing data DT0 to DT2323 which are laid out sequentially starting from the beginning of the sector.

4 bytes at the end of the sector are each set at "00"h. The 4 bytes may also be used for recording error detection parity.

Figure 22:
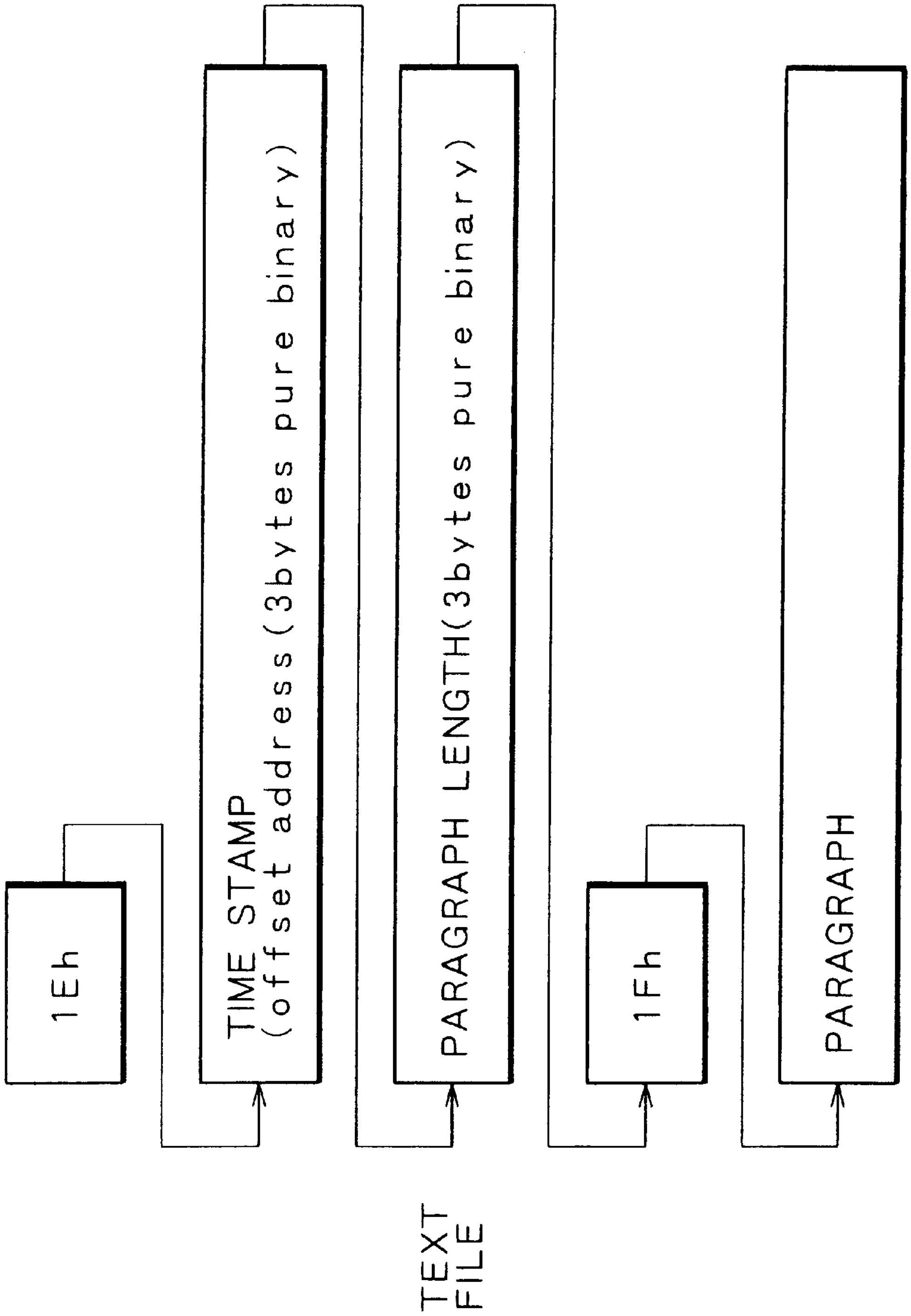
FIG. 22 is a modeling diagram showing the structure of data recorded in the text file sector shown in FIG. 18.

The data structure of a text file recorded in a text-file sector is shown in FIG. 22. It should be noted that the data structure shown in this figure is the data structure of a text file recorded in the AUX-TOC sector 4 having a text mode with a d5 bit set at '1' to indicate that a time stamp exists.

As shown in the figure, the data structure begins with a code of "1E" serving as a delimiter provided for each text file. The delimiter is followed by a data unit showing a time stamp.

A time stamp prescribes timing to output and display a text file in synchronization with an audio track with which the text file is associated. The time stamp expresses an offset address relative to the beginning of the audio track.

The time stamp is followed by a data unit representing a paragraph length or a data length. The paragraph length is followed by a code of "1F"h which is followed by a paragraph data unit.

7. Data Read Operations in a Synchronous Playback

7-1 Operation Examples

In the recording and playback apparatus 1 implemented by the embodiment with the configuration described above, it is possible to carry out an audio playback operation based on U-TOC information to reproduce a program recorded in the program area of the magnetic optical disc 90 as audio data. If the audio data has been compressed in accordance with the ATRAC system, the audio data is also called ATRAC data. In addition, it is also possible to carry out a playback operation based on AUX-TOC information to reproduce AUX-data files which can be picture files or text files in synchronization with the playback time of a program. A playback operation based on AUX-TOC information to reproduce AUX-data files in synchronization with the playback time of a program is referred to hereafter as a synchronous playback operation. In this embodiment, in a synchronous playback operation, all AUX-data files required in the synchronous playback operation are not read out from the magnetic optical disc 90 and accumulated in the buffer memory 13 in advance. Instead, as will be described later, an AUX-data file is read out from the magnetic optical disc 90 and accumulated in the buffer memory 13 during a period of time when the operation to read out program data from the magnetic optical disc 90 is temporarily paused as the amount of program data accumulated in the buffer memory 13 exceeds a predetermined value.

Here, before explaining processing to read out data in a synchronous playback operation in this embodiment, an overview of synchronous playback is exemplified by the magnetic optical disc 90 containing recorded data.

FIG. 23 is a diagram showing an example of a relation between programs recorded on the magnetic optical disc 90 and picture files played back in synchronization with these programs.

Figures 23A, 23B, 23C, 23D, 23E:
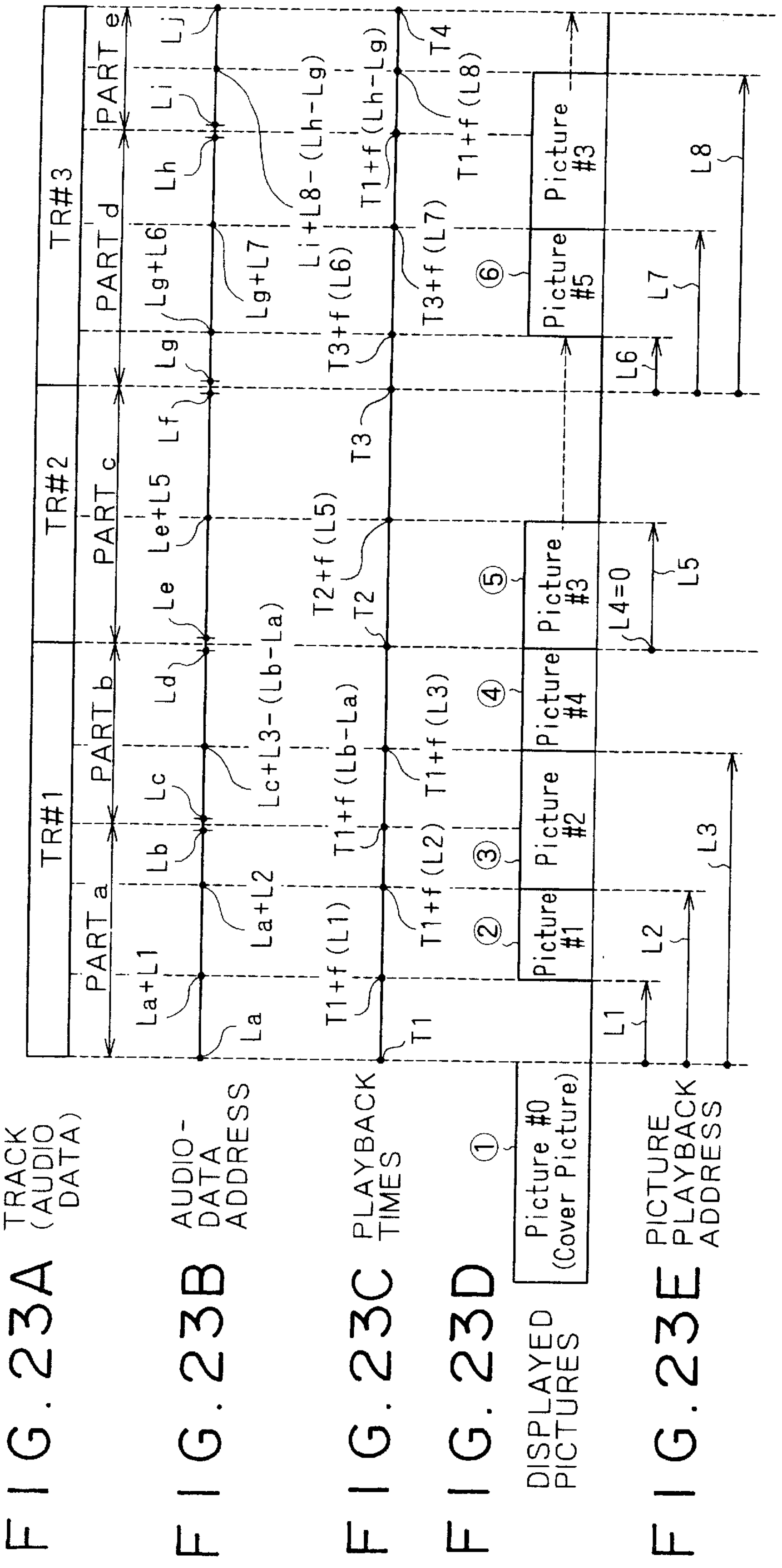
FIG. 23A shows a timing chart of audio data played back from a disc.
FIG. 23B shows a timing chart of audio-data addresses each showing a location at which the audio data shown in FIG. 23A is recorded.
FIG. 23C shows a timing chart of playback times of the audio data shown in FIG. 23A.
FIG. 23D shows a timing chart of display picture data played back from an AUX-data area on the disc.
FIG. 23E shows a timing chart of playback addresses showing playback timing of the display picture data shown in FIG. 23D.

To put it in detail, FIG. 23A shows the programs recorded on the magnetic optical disc 90 along the playback time axis. FIG. 23B shows addresses on the magnetic optical disc 90 at which the programs are recorded. FIG. 23C shows playback times of the programs. FIG. 23D shows the picture files played back in synchronization with the programs in accordance with the playback times of the picture files. FIG. 23E shows playback addresses of the picture files shown in FIG. 23D. The play back addresses are prescribed as contents of the AUX-TOC sector 3 explained earlier with reference to FIG. 14.

As shown in FIG. 23A, recorded on the magnetic optical disc 90 are 3 tracks representing audio data, namely, tracks TR#1, TR#2 and TR#3. The track numbers #n, where n=1, 2 and 3 in this example, basically indicate a playback order.

Figure 24:
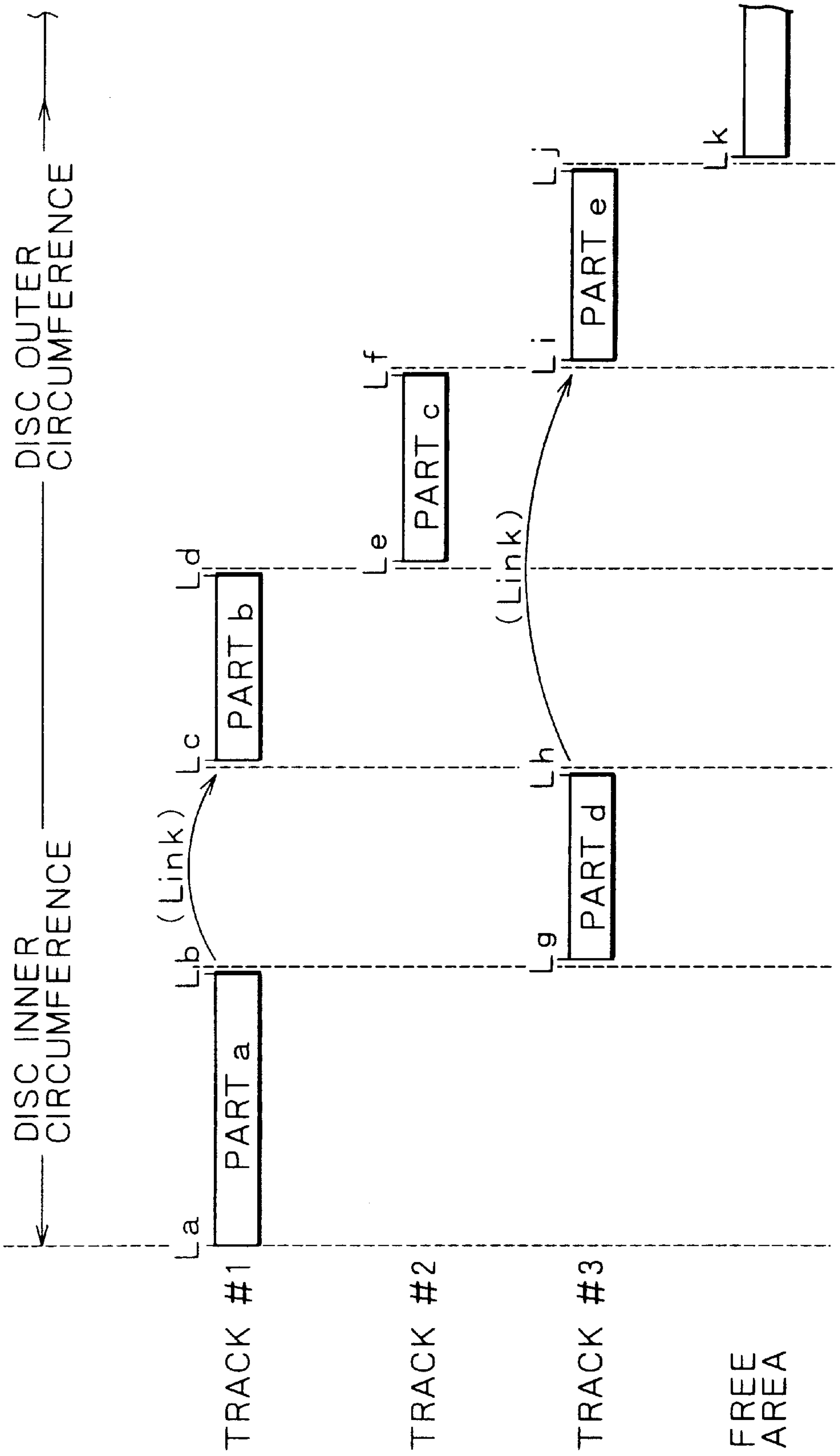
FIG. 24 is a modeling diagram showing audio-data tracks recorded on a disc.

FIG. 24 is a diagram showing parts a, b, c, d and e on the magnetic optical disc 90 used for recording tracks TR#1, TR#2 and TR#3. FIG. 23B shows a playback order along the time axis of tracks TR#1, TR#2 and TR#3.

Track TR#1 comprises part a between addresses La and Lb, and part b between addresses Lc and Ld. The parts a and b are described by 2 part tables which are linked by a link in the U-TOC sector 0. The address La represents a location on an innermost circumference. Without using the short format, the address La is expressed by "0032"h, "00"h, "0"h where the code "0032"h is the cluster address, the code "00"h is the sector address and the code "0"h is the sound-group address.

Track TR#2 comprises only 1 part, namely, part c between addresses Le and Lf.

Track TR#3 also comprises 2 parts, namely, part d between addresses Lg and Lh, and part e between addresses Li and Lj. The parts d and e are linked by a link in the U-TOC sector 0.

As shown in FIG. 24, in an area on an outer circumference of the magnetic optical disc 90 after the end address Lk of the part e on the latter side of track TR#3, no real data is recorded. Thus, an area between the end address Lk and the end address of the program area is prescribed as a free area. For example, if the free area corresponds to a 74-minute playback time, the end address of the program area approximately corresponds to a cluster address of "08CA"h.

The tracks shown in FIG. 23A are each associated with a playback period of time shown in FIG. 23C. To be more specific, an operation to play back track TR#1 is started at a reference point of time T1 and an operation to play back track TR#2 is started at a reference point of time T2. An operation to play back track TR#3 is started at a reference point of time T3.

It should be noted that playback points of time shown in FIG. 23C are each represented as a function of offset address with a start address taken as a reference. Assume track TR#1 as an example. In this case, the reference is the start address La which corresponds to the reference point of time T1. A playback point of time in the playback period of time of track TR#1 corresponding to an address (La+L1) is expressed by T1+f (L1) where notation L1 is an offset address relative to the start address La. A point of time at the delimiter between the parts a and b of track TR#1 corresponds to an offset address (Lb−La). Thus, a point of time at the delimiter is expressed by T1+f (Lb−La). By the same token, a point of time at the delimiter between the parts d and e of track TR#3 corresponds to an offset address (Lh−Lg) relative to the start address Lg corresponding to the point of time T3, and is thus expressed by T3+f (Lh−Lg).

6 AUX-data files recorded on the magnetic optical disc 90 are picture files called Picture #0, Picture #1, Picture #2, Picture #3, Picture #4, Picture #5 and Picture #6 respectively. Timing to synchronously play back these picture files with respect to the tracks is prescribed as shown in FIGS. 23D and 23E.

First of all, Picture #0 is a cover picture. As described earlier, a cover picture is a picture appearing on the cover jacket of the magnetic optical disc 90. As shown in FIG. 23D, Picture #0 representing the cover picture is displayed at a stage before the operation to play back the tracks. When the operation to play back the tracks is started, the display of the cover picture is discontinued. It should be noted, however, that the display of the cover picture can also be continued even after the operation to play back the tracks is started. In this case, the cover picture is displayed along with picture files which are output in synchronization with the operation to play back the tracks.

According to the timing to synchronously play back these picture files after the start of the playback operation of the tracks, Pictures #1, #2 and #4 are played back in synchronization with track TR#1. To be more specific, an operation to play back Picture #1 is started at the offset address L1 corresponding to a point of time expressed by T1+f (L1) and ended at the offset address L2 corresponding to a point of time expressed by T1+f (L2) at which an operation to play back Picture #2 is started.

The operation to play back Picture #2 is started at the offset address L2 corresponding to a point of time expressed by T1+f (L2) and ended at the offset address L3 corresponding to a point of time expressed by T1+f (L3) at which an operation to play back Picture #4 is started. Picture #2 is played back from parts a to b.

The operation to play back Picture #4 is started at the offset address L3 corresponding to a point of time expressed by T1+f (L3) and ended at the end of the operation to play back track TR#1.

The offset address L3 relative to the start of part a of track TR#1 represents a location in part b which starts at the address Lc (=Lb−La). With the address Lc taken as a reference, the offset address L3 can be expressed by an offset address L3=Lc+L3−(Lb−La) as shown in FIG. 23B.

The operation to play back Picture #3 in synchronization with track TR#2 starting at the playback point of time T2 corresponding to the address Le is commenced at an offset address L4 of 0 relative to the address Le and ended at an offset address L5 (corresponding to a point of time expressed by T2+f (L5)) relative to the address Le.

Pictures #5 and #3 are played back in synchronization with track TR#3. As described above, Picture #3 is also played back in synchronization with track TR#1. It is thus obvious that the format provided by this embodiment allows a prescription to play back a picture file in synchronization with a plurality of tracks.

An operation to play back Picture #5 is started at the offset address L6 relative to the start point T3 of an operation to play back the track TR#3 at the address Lg and ended at the offset address L7 corresponding to a point of time expressed by T3+f (L7) at which an operation to play back Picture #3 is started.

The operation to play back Picture #3 is started at the offset address L7 corresponding to a point of time expressed by T3+f (L7) and ended at the offset address L8 corresponding to a point of time expressed by T3+f (L8).

The offset address L8 relative to the start of part d of track TR#3 formed by part d and e can be expressed by an offset address L8=Li+L8−(Lh−Lg) as shown in FIG. 23B.

In order to play back programs recorded on the magnetic optical disc 90 as tracks TR#1, TR#2 and TR#3 and AUX-data files recorded thereon as Pictures #3, #4 and #5 as shown in FIGS. 23A to 23E, the programs and the AUX-data files are controlled by using the U-TOC and the AUX-TOC. Management information related to data shown in FIGS. 23A to 23E is shown in FIGS. 25 and 26.

FIG. 25 is a diagram showing contents of the U-TOC sector 0 for controlling audio data played back as shown in FIGS. 23A and 23B. To be more specific, the U-TOC sector 0 prescribes an operation to play back tracks TR#1, TR#2 and TR#3 as shown in FIGS. 23A and 23B.

In this case, the header includes a cluster address comprising Cluster H of "00"h and Cluster L in the range "03"h to "05"h, and a sector address (Sector) of "00"h. The mode information (MODE) is set at "02"h.

Since tracks TR#1 to TR#3 are each recorded as a program, First TNO of "01"h and Last TNO of "03"h are recorded at predetermined byte locations following the header. In FIG. 25, First TNO and Last TNO are denoted by notations F.TNO and L.TNO respectively. At a byte location denoted by notation US (Used Sectors) indicating a utilization state of the sector, a value of "01"h is recorded.

The pointer P-TNO1 assigned to track TR#1 is set at "01"h pointing to the part table "01"h which includes the start address La and the end address Lb of the part a besides a link of "02"h pointing to the part table "02"h. In this example, the start address La comprises a cluster address of "32"h and a sector address of "00"h.

The part table "02"h pointed to by the link "02"h includes the start address Lc and the end address Ld of the part b besides a link of "00"h indicating that this part table is the last one for track TR#1. Thus, track TR#1 comprises the parts a and b as shown in FIGS. 23A and 24.

By the same token, the pointer P-TNO2 assigned to track TR#2 is set at "03"h pointing to the part table "03"h which includes the start address Le and the end address Lf of the part c.

Likewise, the pointer P-TNO3 assigned to track TR#3 is set at "04"h pointing to the part table "04"h which includes the start address Lg and the end address Lh of the part d besides a link of "05"h pointing to the part table "05"h. The part table "05"h pointed to by the link "05"h includes the start address Li and the end address Lj of the part e besides a link of "00"h indicating that this part table is the last one for track TR#3. Thus, track TR#3 comprises the parts d and e as shown in FIGS. 23A and 24.

In each of the part tables "01"h to "05"h describing the start and end addresses of the parts a to e, the track mode is set at "C6"h (=11000110) which indicates that there is actually no protection of the copy right of the audio data and indicates audio information such as stereo and existence of an emphasis.

The pointers P-TNO4 to P-TNO255 are each set at "00"h to indicate that these pointers are not used.

It is obvious from the above description that the used region in the program area ends with the part e, leaving the rest of the program area as a free area. In this case, the pointer P-FRA is set at "06"h to point to a part table "06"h describing a start address Lk of the free area and an end address thereof comprising a cluster address of "8Ch" and a sector address of "00"h. The cluster address of "8Ch" and a sector address of "00"h are the end address of the program area. Since the free area in the program area is contiguous, the link in the part table "06"h is set at "00"h.

As for the table section itself, all part tables following the part table "06"h are not used. In this case the pointer P-EMPTY is set at "07"h. The unused part tables "07"h to "FF"h are linked by links.

Assume that there is no defect area. In this case, the pointer P-DFA is set at "00"h to indicate that there is no defect area.

FIG. 26 is a diagram showing the contents of the AUX-TOC sector 3 on the magnetic optical disc 90 shown in FIGS. 23D and 23E. The AUX-TOC Sector 3 prescribes timing to output picture files Pictures #1 to #5 synchronized with operations to play back tracks TR#1, TR#2 and TR#3 shown in FIGS. 23A and 23B. It should be noted that, in actuality, the recording locations (that is, the start and end addresses) of the picture files Pictures #1 to #5 in the AUX-data area are controlled by the AUX-TOC sector 1 but neither explanation nor drawing is given.

In the case of the AUX-TOC sector 3 shown in FIG. 26, the header includes a cluster address comprising Cluster H of "00"h and Cluster L in the range "07"h to "09"h, and a sector address (Sector) of "03"h. The mode information (MODE) is set at "02"h.

In this case, the 3 tracks, namely, tracks TR#1, TR#2 and TR#3, are prescribed as tracks to be played back in synchronization with picture files. First TNP and Last TNP at predetermined byte locations following the header are set at "01"h and "03"h which are the numbers of tracks TR#1 (the first track) and TR#3 (the last track) respectively. In FIG. 26, First TNP and Last TNP are denoted by notations F.TNP and L.TNP respectively. These values indicate that the pointers P-TNP1 to P-TNP3 in the pointer section are used.

The pointer P-TNP1 assigned to track TR#1 is set at "01"h pointing to the slot "01"h which includes a start offset address L1 relative to the start address of track TR#1 and an end offset address of all zeros. The pointer P-PNOj of the slot "01"h is set at "01"h pointing to the picture file Picture #1. The offset addresses and the pointer recorded in the slot "01"h prescribe that the picture file Picture #1 be displayed in synchronization with track TR#1 during a period of time between a point of time corresponding to the start offset address L1 and a point of time at which the display of the next picture file is started. In addition, the link in the slot "01"h is set at "02"h pointing to the slot "02"h.

The slot "02"h includes a start offset address L2 relative to the start address of track TR#1 and an end offset address of all zeros. The pointer P-PNOj is set at "02"h pointing to the picture file Picture #2 to be played back after Picture #1. In addition, the link in the slot "02"h is set at "03"h pointing to the slot "03"h.

The slot "03"h includes a start offset address L3 relative to the start address of track TR#1 and an end offset address of all zeros. The pointer P-PNOj is set at "04"h pointing to the picture file Picture #4 to be played back after Picture #2. In addition, the link is set at "00"h indicating that the picture file Picture #4 is the last one to be displayed in synchronization with the operation to play back track TR#1.

The data explained so far prescribes that the picture files Pictures #1, #2 and #4 be displayed in synchronization with the operation to play back track TR#1 as shown in FIGS. 23D and 23E.

The pointer P-TNP2 assigned to track TR#2 is set at "04"h pointing to the slot "04"h which includes a start offset address L4 relative to the start address of track TR#2 and an end offset address L5. The start offset address L4 comprises a cluster address of "00"h and a sector address of "00"h. The pointer P-PNOj of the slot "04"h is set at "03"h pointing to the picture file Picture #3. The offset addresses and the pointer recorded in the slot "04"h prescribe that the picture file Picture #3 be displayed in synchronization with track TR#2 during a period of time between a point of time corresponding to the start offset address L4 and a point of time corresponding to the end offset address L5 as shown in FIG. 23D. In addition, the link in the slot "04"h is set at "00"h indicating that the picture file Picture #3 is the only one to be displayed in synchronization with the operation to play back track TR#2.

The pointer P-TNP3 assigned to track TR#3 is set at "05"h pointing to the slot "05"h which includes a start offset address L6 relative to the start address of track TR#3 and an end offset address of all zeros. The pointer P-PNOj of the slot "05"h is set at "05"h pointing to the picture file Picture #5 to be displayed in synchronization with the operation to play back track TR#3 as a first picture. In addition, the link in the slot "05"h is set at "06"h pointing to the slot "06"h.

The slot "06"h includes a start offset address L7 relative to the start address of track TR#3 and an end offset address L8. The pointer P-PNOj of the slot "06"h is set at "03"h pointing to the picture file Picture #3 to be displayed after Picture #5 in synchronization with the operation to play back track TR#3. In addition, the link in the slot "06"h is set at "00"h indicating that the picture file Picture #5 is the last one to be displayed in synchronization with the operation to play back track TR#3.

The data explained a bove p rescr ibes that the picture files Pictures #5 and #3 be displayed in synchronization with the operation to play back track TR#3 as shown in FIGS. 23D.

The pointer P-PNOj of the slot "00"h allocated to the cover picture is set at "00"h indicating the picture file Picture #0. The slot "00"h includes a start offset address and an end offset address each set at all zeros. In addition, the link is set at "00"h indicating that there is no other picture files prescribed as a cover picture.

All slots following the slot "06"h are not used. In this case the pointer P-EMPTY is set at "07"h. The unused part tables "07"h to "FF"h are linked by links.

As described above, the management information shown in FIGS. 25 and 26 prescribes an operation to play back tracks recorded on the magnetic optical disc 90 and operations to display picture files as shown in FIGS. 23A to 23E in synchronization with the operation to play back the tracks.

The following description explains operations to read out data from the magnetic optical disc 90, which includes management information prescribing synchronous operations shown in FIGS. 23A to 23E, during the synchronous operations carried out in th is embodiment.

As described above, this embodiment is provided with a buffer memory 13 for temporarily storing audio data read out from the magnetic optical disc 90 to be output as a reproduced sound. In addition, the buffer memory 13 is also used for temporarily holding AUX-data files read out from the magnetic optical disc 90 to be output in synchronous playback operations. That is to say, the AUX-data files are read out back from the buffer memory 13 t o be played back and output. Also in this embodiment, the AUX-data files to be output in synchronous playback operations are read out from the magnetic optical disc 90 during a pause period of time which is determined on the basis of the amount of audio data accumulated in the buffer memory 13 as will be described later.

Figure 27:
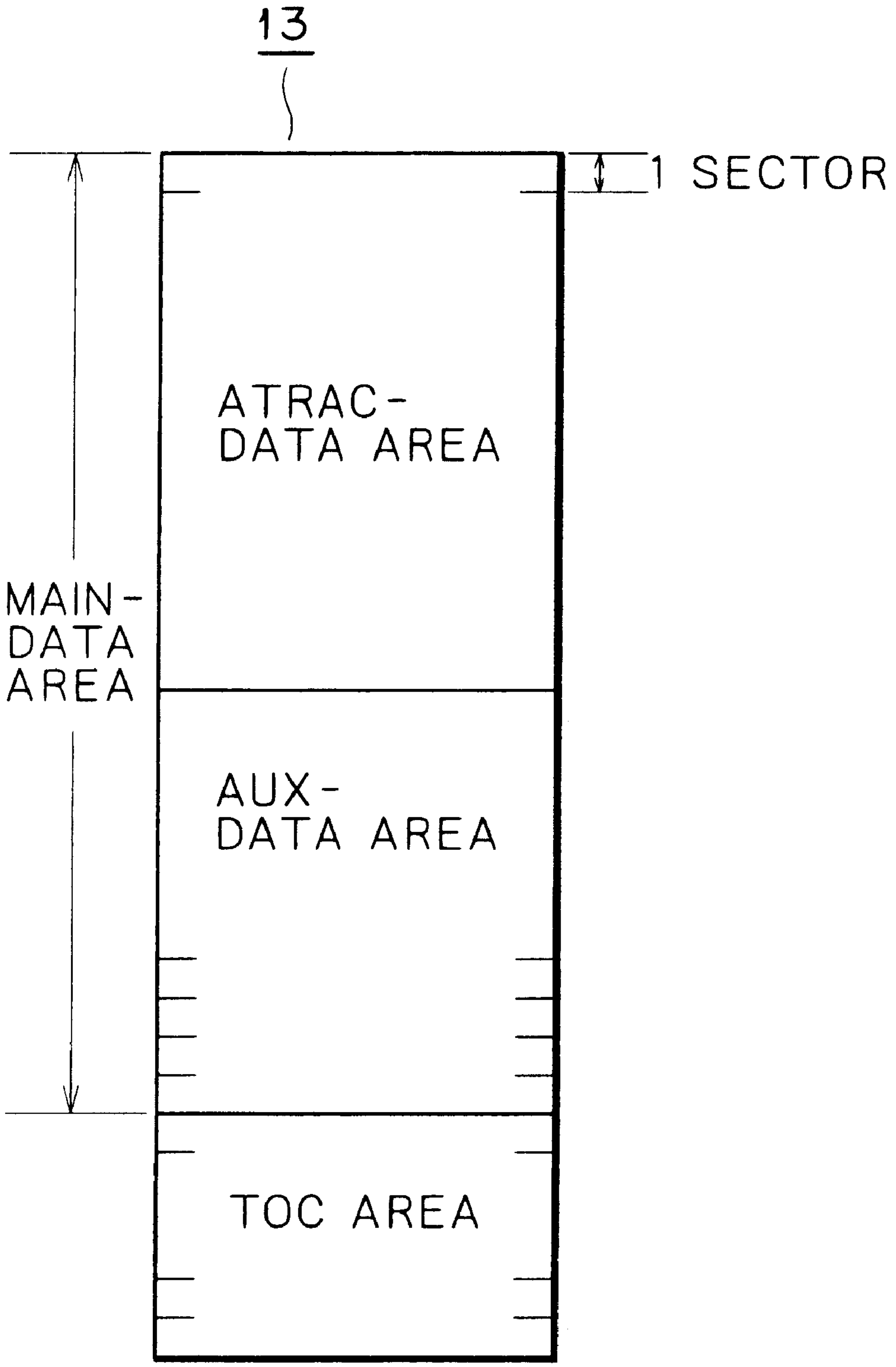
FIG. 27 is a diagram showing an area allocation structure in a buffer memory.

First of all, an area allocation structure of the buffer memory 13 employed in the embodiment is explained with reference to FIG. 27.

As shown in the figure, the storage area of the buffer memory 13 is divided into a TOC area and a main-data area. The TOC area is used for storing a P-TOC, a U-TOC and an AUX-TOC read out from the magnetic optical disc 90 currently mounted on the recording and playback apparatus 1.

On the other hand, the main-data area is divided into an ATRAC-data area used for storing ATRAC data to be recorded or played back and an AUX-data area used for storing AUX-data files.

The size of the buffer memory 13 is not specially prescribed. In the case of a buffer memory 13 with a size of 16 Mbits which can be used to accommodate data of up to 2,097,152 bytes, it is possible to store 885 sectors (from the expression; 2,097,152/2,368≈885.6) where the number 2,368 is the number of bytes in a sector.

As a breakdown of the 885 sectors, 16 sectors are allocated to the TOC area and the remaining 869 sectors are allocated to the main-data area. The main-data area may be divided into the ATRAC-data area and the AUX-data area at a fixed ratio which is determined arbitrarily in advance and fixed for all discs. As an alternative, the ratio can also be set at a value proper for a disc currently mounted on the recording and playback apparatus 1. In this case, the ratio is based on the size of the AUX-data area required for holding a data file which can be determined typically with reference to the contents of the AUX-TOC.

Standing on the explanation given so far, the following description explains operations to read out data from the magnetic optical disc 90 during the synchronous playback of the magnetic optical disc 90 shown in FIGS. 23A to 23E. It should be noted that audio data is read out from the magnetic optical disc 90 on the assumption that the playback operations are carried out in the following order: track TR#1, track TR#2 and then track TR#3.

When the magnetic optical disc 90 subjected to the synchronous playback operations shown in FIGS. 23A to 23E is mounted on the recording and playback apparatus 1 implemented by this embodiment, first of all, U-TOC information and AUX-TOC information are read out from the management area of the magnetic optical disc 90 and stored in the TOC area of the buffer memory 13. Thereafter, the recording and playback apparatus 1 carries out playback and recording operations based on the management information stored in the TOC area of the buffer memory 13.

With reference to the contents of the AUX-TOC stored in the TOC area of the buffer memory 13, the recording and playback apparatus 1 is capable of obtaining information indicating whether or not a cover picture exists as well as information on an order and timing to play back and output AUX-data files each used as a picture file during a track playback operation carried out in this example in the following order: track TR#1, track TR#2 and then track TR#3.

In addition, the recording and playback apparatus 1 implemented by this embodiment is also capable of setting a priority order in which the AUX-data files are to be stored in the buffer memory 13 from the information on an order to play back and output the AUX-data files obtained from the contents of the AUX-TOC. In this example, the priority order in which the AUX-data files are to be stored in the buffer memory 13 is determined as indicated by numbers (1) to (6) assigned to the picture files as shown in FIG. 23D. As shown in the figure, no priority level is assigned to the picture file Picture #3 displayed in synchronization with an operation to play back track TR#3. This is because a 5th priority level has already been assigned to the picture file Picture #3 due to the fact that an operation to display Picture #3 in synchronization with an operation to play back track TR#2 preceding track TR#3 is prescribed. That is to say, when the picture file Picture #3 is displayed in synchronization with an operation to play back track TR#3, Picture #3 has already been stored in the buffer memory 13 for use in the operation to play back track TR#2 so that data of picture

#3 stored in the buffer memory 13 can be used again in the operation to play back track TR#3. It is thus not necessary to again read out the picture file Picture #3 from the magnetic optical disc 90 for use in the operation to play back track TR#3.

In the case of a magnetic optical disc 90 including a cover picture as shown in FIG. 23D, the picture file Picture #0 is prescribed to be a cover picture as described above. Thus, in the recording and playback apparatus 1, at a stage prior to the start of the playback operation, at least data of Picture #0 is read out from the AUX-data area of the magnetic optical disc 90 and temporarily stored in the AUX-data area of the buffer memory 13. Then, the data stored in the buffer memory 13 is used to output and display the cover picture as shown in FIG. 23D.

With the cover picture output to a display unit as described above, for example, assume that the user makes a request for a playback operation. In this case, the recording and playback apparatus 1 reads out ATRAC data from the magnetic optical disc 90 and stores the data into the buffer memory 13 by way of the decoder 8. The ATRAC data accumulated in the buffer memory 13 is read back and supplied to the audio compression decoder 14 which carries out a decompression process on the data and outputs the decompressed data as a playback sound.

Figure 28:
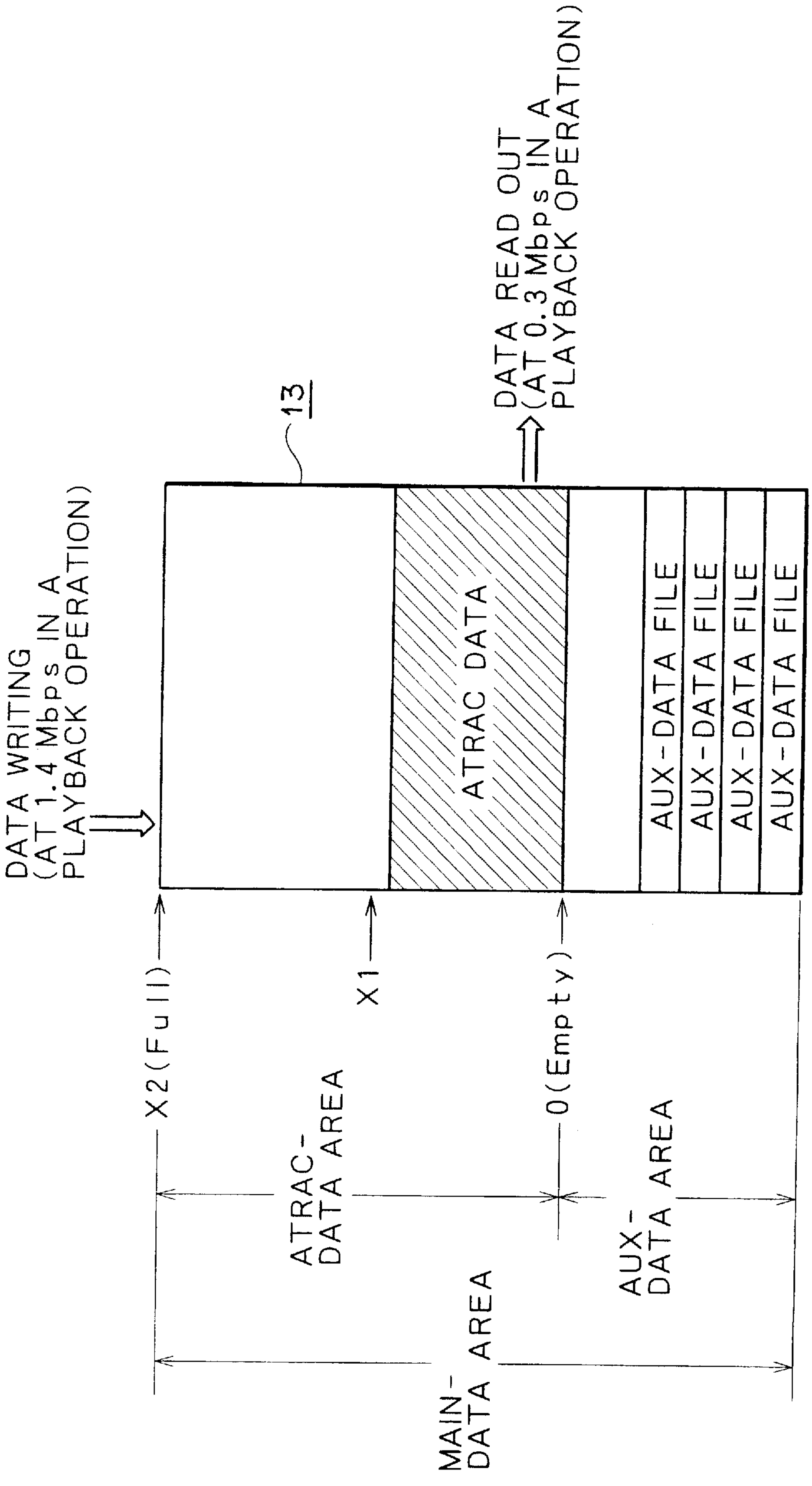
FIG. 28 is a diagram showing contents of the area allocation structure shown in FIG. 27 to be read out from the buffer memory.

FIG. 28 is a diagram showing an area allocation structure of the main-data area of the buffer memory 13 in which the ATRAC data is accumulated.

As described previously, in a playback operation, ATRAC data is written into the buffer memory 13 at a transfer rate of 1.4 Mbps and read out from the memory 13 at a low transfer rate of 0.3 Mbps. This difference in transfer rate causes the amount of ATRAC data accumulated in the buffer memory 13 to tend to increase unless errors are generated frequently during the operation to read out the data from the magnetic optical disc 90. As a result, the ATRAC-data area in the buffer memory 13 becomes full or the amount of ATRAC data accumulated in the ATRAC-data area reaches X2 shown in FIG. 28. In this full state, the operation to read out ATRAC data from the magnetic optical disc 90 is temporarily suspended while the operation to read out ATRAC data from the buffer memory 13 is continued. As a result, the amount of ATRAC data accumulated in the ATRAC-data area of the buffer memory 13 decreases. As the amount of ATRAC data accumulated in the ATRAC-data area of the buffer memory 13 reaches X1 shown in FIG. 28, the operation to read out ATRAC data from the magnetic optical disc 90 is resumed. That is to say, ATRAC data is read out from the magnetic optical disc 90 intermittently in accordance with the amount of ATRAC data accumulated in the buffer memory 13. It should be noted that X1 is a predetermined typical amount of ATRAC data accumulated in the ATRAC-data area.

In this embodiment, during the intermittent playback operation or, to be more specific, during the suspension period of the operation to read out ATRAC data from the magnetic optical disc 90, AUX-data files not transferred yet to the buffer memory 13 are read out from the magnetic optical disc 90 in the priority order described earlier and stored in the AUX-data area of the buffer memory 13. As described above, the suspension period starts when the amount of ATRAC data accumulated in the ATRAC-data area reaches X2 shown in FIG. 28 and ends when the amount of ATRAC data accumulated in the ATRAC-data area reaches X1 shown in FIG. 28.

According to the explanation given so far, for example, Picture #0 which is the cover picture having a priority level of 1 has been stored in the buffer memory 13 at a stage prior to the operation to play back ATRAC data. Thus, during the suspension period of the operation to read out ATRAC data from the magnetic optical disc 90 after the start of the operation to play back ATRAC data, the recording and playback apparatus 1 reads out picture files from the magnetic optical disc 90 sequentially one file after another in the following order: Picture #1 having a priority level of 2 followed by Picture #2 having a priority level of 3 followed by Picture #4 having a priority level of 4 followed Picture #3 having a priority level of 5 followed Picture #5 having a priority level of 6. As the operations to store all AUX-data files including Picture #5 having a priority level of 6 in the buffer memory 13 are completed at a point of time during the track playback operation, no more AUX-data files are read out from the magnetic optical disc 90 even during the suspension period of the operation to read out ATRAC data.

As described above, during the suspension period of the operation to read out ATRAC data from the magnetic optical disc 90, the recording and playback apparatus 1 reads out AUX-data files from the magnetic optical disc 90 sequentially one file after another and temporarily stores them into the buffer memory 13. Thus, if the operation to store an AUX-data file in the buffer memory 13 is completed before the operation to play back the file is started, the AUX-data file can be displayed with proper timing in accordance with the progress of the execution of an operation to play back a track with which the file is associated.

To put it concretely, during a period of time between the playback point of time T1 (that is the start of the operation to play back track TR#1) and the playback point of time T1+f (L1) shown in FIG. 23C, for example, if the operation to read out at least the picture file Picture #1 from the magnetic optical disc 90 and store it into the buffer memory 13 is completed, the operation to display Picture #1 in synchronization with the operation to play back the track can be started properly at the playback point of time T1+f (L1).

By reading out picture files from the magnetic optical disc 90 sequentially one file after another during the suspension period of the operation to read out ATRAC data from the magnetic optical disc 90, it is no longer necessary to read out all the picture files before the start of an operation to play back tracks. As a result, it is possible to shorten the time to wait for the track playback operation to be started after the magnetic optical disc 90 is mounted on the recording and playback apparatus 1.

It should be noted that, in the case of an AUX-data file prescribed to be played back and displayed at the same time as the start of an operation to play back a track or an AUX-data file prescribed to be played back and displayed at an early time after the start of an operation to play back a track, an operation to store such an AUX-data file into the buffer memory 13 may not be completed before the start of the operation to play back a track if the AUX-data file is read out from the magnetic optical disc 90 only during the suspension period of the operation to read out ATRAC data from the magnetic optical disc 90. As a result, it is quite within the bounds of possibility that the AUX-data file can not be displayed and output properly at a due playback time thereof.

In order to avoid the problem described above, in the case of an AUX-data file prescribed to be played back and displayed during a predetermined period between the start of an operation to play back a track and a certain playback point of time, the recording and playback apparatus 1 typically reads out the file from the magnetic optical disc 90 and stores it into the buffer memory 13 at a stage after the magnetic optical disc 90 is mounted on the apparatus 1 but before a playback operation is started. An AUX-data file prescribed to be played back in synchronization with track TR#1 and displayed during a predetermined period between the start of an operation to play back track TR#1 and a certain playback point of time is Picture #1 as shown in FIG. 23D. In such a case, at a stage after the magnetic optical disc 90 is mounted on the apparatus 1 but before a playback operation to reproduce track TR#1 is started, the AUX-data file Picture #1 is read out from the magnetic optical disc 90 and stored into the buffer memory 13 along with Picture #0 which is the cover picture.

As described above, it is quite within the bounds of possibility that an operation to read out all the AUX data of the file Picture #1 from the magnetic optical disc 90 and store it into the buffer memory 13 is not completed before the start time T1+f (LI) of the operation to play back Picture #1 if the AUX-data file Picture #1 is read out from the magnetic optical disc 90 only during normal suspension periods of the operation to read out ATRAC data of track TR#1 from the magnetic optical disc 90 between the playback start time T1 of track TR#1 and the start time T1+f (L1) which corresponds to the offset start address L1. By reading out the AUX-data file Picture #1 from the magnetic optical disc 90 and storing it into the buffer memory 13 at a stage after the magnetic optical disc 90 is mounted on the apparatus 1 but before a playback operation to reproduce track TR#1 is started as described above, however, it is certainly possible to play back and output Picture #1 at the playback start time T1+f (L1).

In this case, however, the amount of AUX data, which is read out from the magnetic optical disc 90 and stored into the buffer memory 13 before an operation to play back a track is started, may increase slightly. Nevertheless, data to be read out from the magnetic optical disc 90 is limited to an AUX-data file absolutely required as a minimum at the early stage of the operation to play back the track as described above. Thus, the time to wait for the playback operation of the first track to be started becomes longer only slightly. Since the user may not be aware of such a small increase in waiting time, no problem is raised in particular.

In addition, depending on the size of the AUX-data area set in the buffer memory 13 and the total size of all AUX-data files to be played back in synchronization with tracks, the AUX-data area may possibly run out after a certain number of AUX data files have been stored in the buffer memory 13 but before all AUX data files are stored in the buffer memory 13. In such a state, it is no longer possible to store remaining AUX-data files in the buffer memory 13.

It is possible to think of a configuration to keep up with such a case wherein the operation to store the remaining AUX-data files is halted and synchronous playback operations are carried out as far as possible using the AUX-data files already held in the buffer memory 13. In this configuration, however, it is impossible to play back and output AUX-data files which have not been stored in the buffer memory 13. It is thus desirable to provide a configuration wherein a message or the like is displayed to the user during such a synchronous playback period to inform the user that the buffer memory 13 is full so that no more data can be read out from the magnetic optical disc 90.

As a conceivable alternative, a picture file which has been played back in synchronization with a reproduced track and is no longer used is deleted from the buffer memory 13 to generate a free area in the memory 13 so that a picture file not stored yet in the buffer memory 13 can be read out from the magnetic optical disc 90 and stored into the free area. Assume that, in the example shown in FIG. 23, the AUX-data area of the buffer memory 13 becomes full when the picture file Picture #3 with a priority level of 5 is stored in the buffer memory 13. In this case, all or some of the picture files Pictures #1, #2 and #4 displayed in synchronization with track TR#1 can be deleted from the buffer memory 13 to create a free area so that the picture file Picture #5 can be read out from the magnetic optical disc 90 and stored in the free area. If the recording and playback apparatus 1 has a configuration wherein only some of the no longer used picture files Pictures #1, #2 and #4 are deleted, it is then desirable to delete the them one file after another typically in the following order: Picture #4→#2→#1 till a free area with a sufficiently large size is resulted in. This is because an operation to detect the head of track TR#1 may be carried out. In this case, it is advantageous to leave an AUX-data file as close to the beginning of the playback time of the track TR#1 as possible in the buffer memory 13. That is to say, it is advantageous to leave the AUX-data file Picture #1 in the buffer memory 13 since Picture #1 is played back in synchronization with the head of the track TR#1.

7-2 Processing Operations

The following description explains processing operations to read out data from the magnetic optical disc 90 during the synchronous operations described above with reference to a flowchart shown in FIGS. 29 and 30. The processing represented by the flowchart shown in the figures is carried out by the system controller 11.

Figure 29:
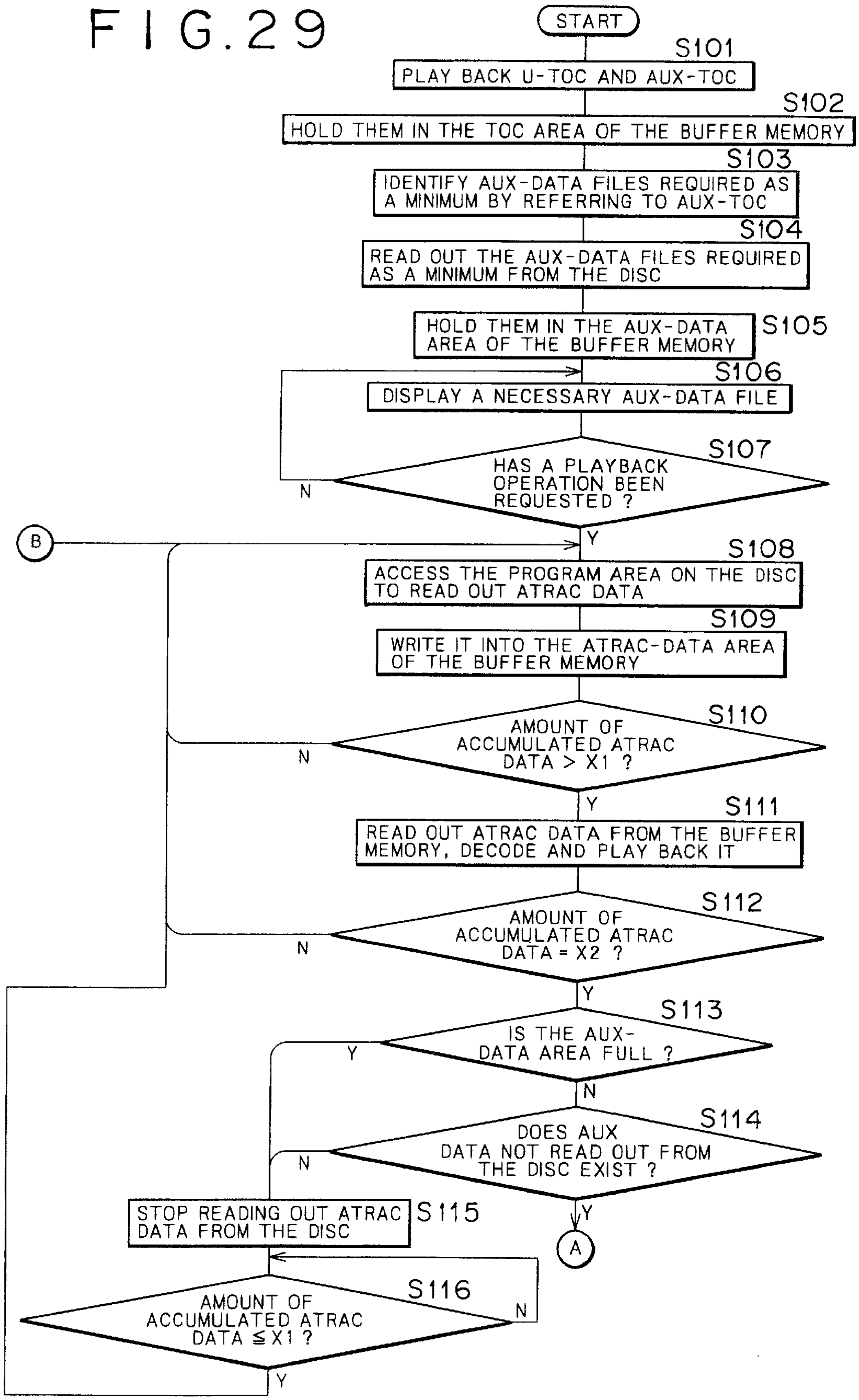
FIG. 29 shows a flowchart representing a procedure for playing back data from a disc in a synchronous playback operation.

For example, when the magnetic optical disc 90 is mounted on the recording and playback apparatus 1 or when the power supply is turned on after the magnetic optical disc 90 has been mounted, the system controller 11 carries out the processing represented by the flowchart shown in FIG. 29. As shown in the figure, the flowchart starts with a step S101 at which the system controller 11 makes an access to the management area of the magnetic optical disc 90 to read out the U-TOC and the AUX-TOC. The flow of the processing then goes on to a step S102 at which the U-TOC and th e AUX-TOC read out from the magnetic optical disc 90 are stored in the TOC area of the buffer memory 13. Thereafter, the system controller 11 is thus capable of executing various kinds of control of recording operations, playback operations and a variety of editing operations with reference to the U-TOC and the AUX-TOC stored in the TOC area of the buffer memory 13.

The flow of the processing then goes on to a step S103 to identify AUX-data files absolutely required as a minimum to be stored in the buffer memory 13 prior to an operation to play back a first track typically with reference to the contents of the AUX-TOC sector 3. As described above, a cover picture is an AUX-data file absolutely required as a minimum to be stored in the buffer memory 13 prior to an operation to play back a first track. If such an AUX-data file exists, the file is made as the first candidate to be stored in the buffer memory 13. A further candidate is an AUX-data file, the playback/output operation of which is to be started within an early predetermined period of time after the beginning of an operation to play back track TR#1.

The flow of the processing then goes on to a step S104 to read out the AUX-data files identified at the step S103 from the magnetic optical disc 90. The flow of the processing then goes on to a step S105 to store the AUX-data files read out from the magnetic optical disc 90 at the step S104 into the AUX-data area of the buffer memory 13.

The flow of the processing then goes on to a step S106 to play back an AUX-data file such as the cover picture to be displayed prior to the beginning of an operation to play back track TR#1. The flow of the processing then goes on to a step S107 to wait for an operation of playing back the track to be carried out by the user while the operation to playback and display AUX-data file is being carried out.

As the system controller 11 determines that an operation to play back the track has been carried out by the user at the step S107, the flow of the processing proceeds to a step S108 at which the system controller 11 makes an access to a proper address in the program area on the magnetic optical disc 90 identified typically with reference to the U-TOC sector 1 to read out ATRAC data of the track. The flow of the processing then goes on to a step S109 to store the ATRAC data read out from the magnetic optical disc 90 at the step S108 into the ATRAC-data area of the buffer memory 13. As described earlier with reference to FIG. 28, the ATRAC data is written into the ATRAC-data area of the buffer memory 13 at a transfer speed of 1.4 Mbps. It should be noted that, at this playback early stage, an operation to read out the ATRAC data back from the buffer memory 13 has not been started yet. Thus, the operation to store the ATRAC data read out from the magnetic optical disc 90 at the step S108 into the ATRAC-data area of the buffer memory 13 causes the amount of ATRAC data stored in the ATRAC-data area of the buffer memory 13 to keep increasing.

The flow of the processing then goes on to a step S110 to form a judgment as to whether or not the amount of ATRAC data stored in the ATRAC-data area of the buffer memory 13 is greater than a predetermined accumulation value X1. The accumulation value X1 is an amount of ATRAC data stored in the ATRAC-data area of the buffer memory 13 which is large enough to provide the so-called vibration-proof feature, even if an operation is sustained to continuously output reproduced audio data read out from the buffer memory 13 for a predetermined period of time by writing the ATRAC data read out from the magnetic optical disc 90 into the ATRAC-data area of the buffer memory 13 to continuously output reproduced audio data read out from the buffer memory 13 for a predetermined period of time. If the outcome of the judgment formed at the step S110 indicates that the amount of ATRAC data stored in the ATRAC-data area of the buffer memory 13 is not greater than the predetermined accumulation value X1, the flow of the processing goes back to the step S108 and then to the step S109 to repeat the pieces of processing thereof. In this way, the operation to store the ATRAC data read out from the magnetic optical disc 90 into the ATRAC-data area of the buffer memory 13 is continued.

As the outcome of the judgment formed at the step S110 indicates that the amount of ATRAC data stored in the ATRAC-data area of the buffer memory 13 is greater than the predetermined accumulation value X1, the flow of the processing goes on to a step S111 at which the system controller 11 starts an operation to read out ATRAC data from the buffer memory 13 at a transfer rate of 0.3 Mbps, carries out a decoding process which is mainly an ATRAC decompression process on the ATRAC data read out from the buffer memory 13 and outputs the data as a playback audio signal.

At the step S111 and the subsequent steps, ATRAC data is written into and read out from the buffer memory 13. Since the write operation is carried out at a transfer rate of 1.4 Mbps which is higher than the transfer rate 0.3 Mbps of the read operation, however, during the period of an operation to properly play back data from the magnetic optical disc 90, the amount of ATRAC data accumulated in the buffer memory 13 is gradually increasing at a rate of about 1.1 Mbps, for example.

In order to solve the problem of the increasing amount of accumulated ATRAC data, at a step S112 following the step S111, the system controller 11 forms a judgment as to whether or not the amount of ATRAC data accumulated in the ATRAC-data area of the buffer memory 13 has already reached X2 shown in FIG. 28, that is, whether or not the ATRAC-data area has become full. The pieces of processing of the steps S108 to S111 are carried out repeatedly till the outcome of the judgment indicates that the amount of ATRAC data accumulated in the ATRAC-data area of the buffer memory 13 has already reached X2. That is to say, ATRAC data is read out from the magnetic optical disc 90 and written into the buffer memory 13 while ATRAC data is being read out from the buffer memory 13 and output as an audio playback signal. Both the operation to transfer ATRAC data from the magnetic optical disc 90 to the buffer memory 13 and the operation to generate the audio playback signal from ATRAC data stored in the buffer memory 13 are carried out concurrently.

As the outcome of the judgment formed at the step S112 indicates that the amount of ATRAC data accumulated in the ATRAC-data area of the buffer memory 13 has already reached X2, the flow of the processing goes on to a step S113 at which the system controller 11 forms a judgment as to whether or not the AUX-data area of the buffer memory 13 is full. If the outcome of the judgment indicates that the AUX-data area of the buffer memory 13 is already full, the flow of the processing goes on to a step S115. If the outcome of the judgment indicates that the AUX-data area of the buffer memory 13 is not full yet, on the other hand, the flow of the processing goes on to a step S114 to form a judgment as to whether an AUX-data file required for synchronous playback operations has not been read out from the magnetic optical disc 90. If the outcome of the judgment indicates that such AUX-data files have not all been read out from the magnetic optical disc 90, the flow of the processing goes on to a step S117 of a continuation flowchart shown in FIG. 30. If the outcome of the judgment indicates that such AUX-data files have all been read out from the magnetic optical disc 90, on the other hand, the flow of the processing goes on to the step S115.

When the flow of the processing goes on to the step S115, the ATRAC-data area of the buffer memory 13 is already full. For this reason, at the step S115, the operation to read out ATRAC data from the magnetic optical disc 90 is halted. The flow of the processing then goes on to a step S116 to enter a state of waiting for the amount of ATRAC data accumulated in the buffer memory 13 to become X1 or smaller. It should be noted that if an almost full state of the ATRAC-data area of the buffer memory 13 is considered to be a desirable state, however, the criterion used in the formation of a judgment at the step S116 can be a value greater than X1 and close to the full-state value X2.

As the amount of ATRAC data accumulated in the buffer memory 13 becomes X1 or smaller at the step S116, the flow of the processing goes back to the step S108.

The flow of the processing from the step S113 or S114 to the step S108 through the steps S115 and S116 means that the operation to store an AUX-data file read out from the magnetic optical disc 90 into the buffer memory 13 is not carried out and only the ordinary track playback operation to read out ATRAC data from the magnetic optical disc 90 is performed.

Figure 30:
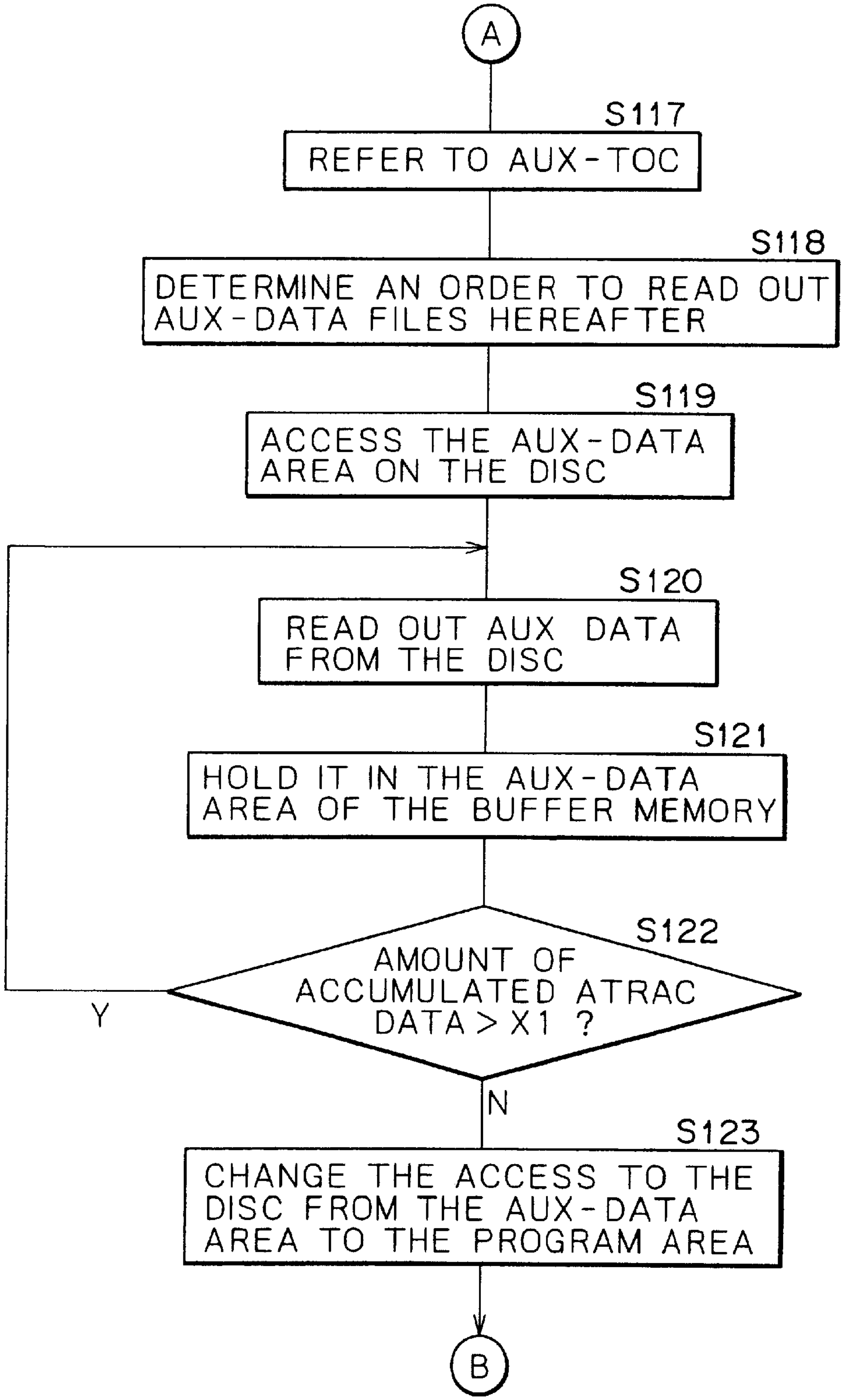
FIG. 30 shows a continuation of the flowchart shown in FIG. 29.

As described above, if the outcome of the judgment formed at the step S114 indicates that such AUX-data files have not all been read out from the magnetic optical disc 90, on the other hand, the flow of the processing goes on to the step S117 of the continuation flowchart shown in FIG. 30. At the step S117, the contents of the AUX-TOC sector 3 are referred to. Then, the flow of the processing proceeds to a step S118 to determine the priority order of AUX-data files to be read out from the magnetic optical disc 90 on the basis of the contents of the AUX-TOC sector 3 referred to at the step S117. The AUX-data files subjected to the priority ordering are required for synchronous playback operations but have not been stored in the buffer memory 13 yet.

The flow of the processing then continues to a step S119 at which an access to the AUX-data area on the magnetic optical disc 90 is made. In consequence, the operation to read out ATRAC data from the program area on the magnetic optical disc 90 carried out so far is suspended temporarily.

The flow of the processing then continues to a step S120 at which an AUX-data file is read out from the magnetic optical disc 90 in accordance with the priority order set at the step S118. The flow of the processing then continues to a step S121 at which the AUX-data file read out at the step S120 is stored into the AUX-data area of the buffer memory 13. The flow of the processing then continues to a step S122 to form a judgment as to whether or not the amount of ATRAC data stored in the ATRAC-data area of the buffer memory 13 is greater than a predetermined accumulation value X1. If the outcome of the judgment formed at the step S122 indicates that the amount of ATRAC data stored in the ATRAC-data area of the buffer memory 13 is greater than the predetermined accumulation value X1, the flow of the processing goes back to the step S120 and then to the step S121 to repeat the pieces of processing thereof. As the outcome of the judgment formed at the step S122 indicates that the amount of ATRAC data stored in the ATRAC-data area of the buffer memory 13 is not greater than the predetermined accumulation value X1, the flow of the processing goes on to a step S123 at which the system controller 11 halts the operation to read out AUX-data files from the AUX-data area on the magnetic optical disc 90 and makes an access to the program area on the magnetic optical disc 90. The flow of the processing then goes back to the step S108.

As described above, each time the ATRAC-data area in the buffer memory 13 becomes full, the processing of the steps S117 to S121 is repeated. Finally, all AUX-data files required in the synchronous playback operations are read out from the magnetic optical disc 90 and stored into the buffer memory 13.

It should be noted that the processing routine shown in FIGS. 29 and 30 is terminated when the operation to play back all tracks has been completed or a command to end the playback operation is issued. In addition, while the processing shown in these figures is being carried out, the system controller 11 executes control to perform operations to play back AUX-data files in synchronization with the tracks concurrently with the processing. It is worth noting that the execution of the control itself is not included in the flowchart shown in the figures.

It is to be noted that, in this embodiment, 2 types of AUX-data files, namely, picture and text files, are prescribed as described above. In the case of the format of a text file, a time stamp serving as information on the synchronous playback operation thereof is embedded in the structure of the text file itself. Thus, in order to carry out an operation to synchronously play back a text file, basically, all text files must be read out from the magnetic optical disc 90 and stored into the buffer memory 13 prior to the start of the track playback operation. Then, the text files stored in the buffer memory 13 must be scanned to read out time stamps in order to obtain information on the synchronous playback operations. Thus, in this embodiment, the processing represented by the flowchart shown in FIGS. 29 and 30 is carried out on data of picture files from the magnetic optical disc 90. It is therefore difficult to apply this processing to text files. It should be noted, however, that the processing represented by the flowchart shown in FIGS. 29 and 30 can also be applied to text files in a configuration wherein text files are transferred to the buffer memory 13 in the order of typically text-file numbers by ignoring the priority order to read out files determined on the basis of synchronous-playback timing or a configuration wherein control of operations to synchronously play back text files is executed in accordance with sector 3 of the AUX-TOC.

8. IEEE1394 Format

8-1 Overview

As has been described earlier with reference to FIG. 1, the mini-disc recorder and player 1 implemented by this embodiment has a configuration that is capable of communicating data with other external equipment through the IEEE1394 data interface unit 25. Thus, the mini-disc recorder and player 1 implemented by this embodiment is capable of transmitting reproduced ATRAC data and a reproduced AUX-data file to the other external AV equipment such as a personal computer through the IEEE1394 bus and have the equipment output an audio signal representing the ATRAC data and display the AUX-data file. Reversely, the mini-disc recorder and player 1 implemented by this embodiment is also capable of recording ATRAC data and an AUX-data file received through the IEEE1394 bus. In addition, other external equipment such as a personal computer is also capable of controlling necessary operations related to recording, playback and edit processing of the mini-disc recorder and player 1.

As IEEE1394 data transmission systems, there are an isochronous communication system for carrying out communications periodically and an asynchronous communication system for carrying out communication asynchronously without regard to periods. In general, the isochronous communication system is adopted for transmitting and receiving data. In addition, by using 1 cable, data can be transmitted and received by using these 2 kinds of communication system.

ATRAC data is time-axis serial data which should be output as an audio signal along the time axis in a playback operation. To be more specific, the operation to play back ATRAC data is required to exhibit a real-time characteristic. In addition, the amount of ATRAC data is large in comparison with AUX data. On the other hand, the amount of AUX data is not so large as AUX data. Even though AUX data may be played back in synchronization with an operation to reproduce ATRAC data, the real-time characteristic of AUX data is not required as strictly as the that of ATRAC data.

As a general way of transmitting data using the IEEE1394 interface in this embodiment, ATRAC data and AUX data are exchanged through the IEEE1394 bus by adopting the isochronous and asynchronous transmission systems respectively.

In this embodiment, by using the IEEE1394 interface, ATRAC data and AUX data can be transmitted individually at times different from each other. In addition, as will be described later, by using isochronous cycles, ATRAC data and AUX data can be transmitted on a time-division basis which makes them appear to be transmitted at the same time.

The following description briefly explains an IEEE1394 format related to the embodiment on the assumption that the transmission is based on the IEEE1394 data interface provid ed by the embodiment.

8-2 Stack Model

Figure 31:
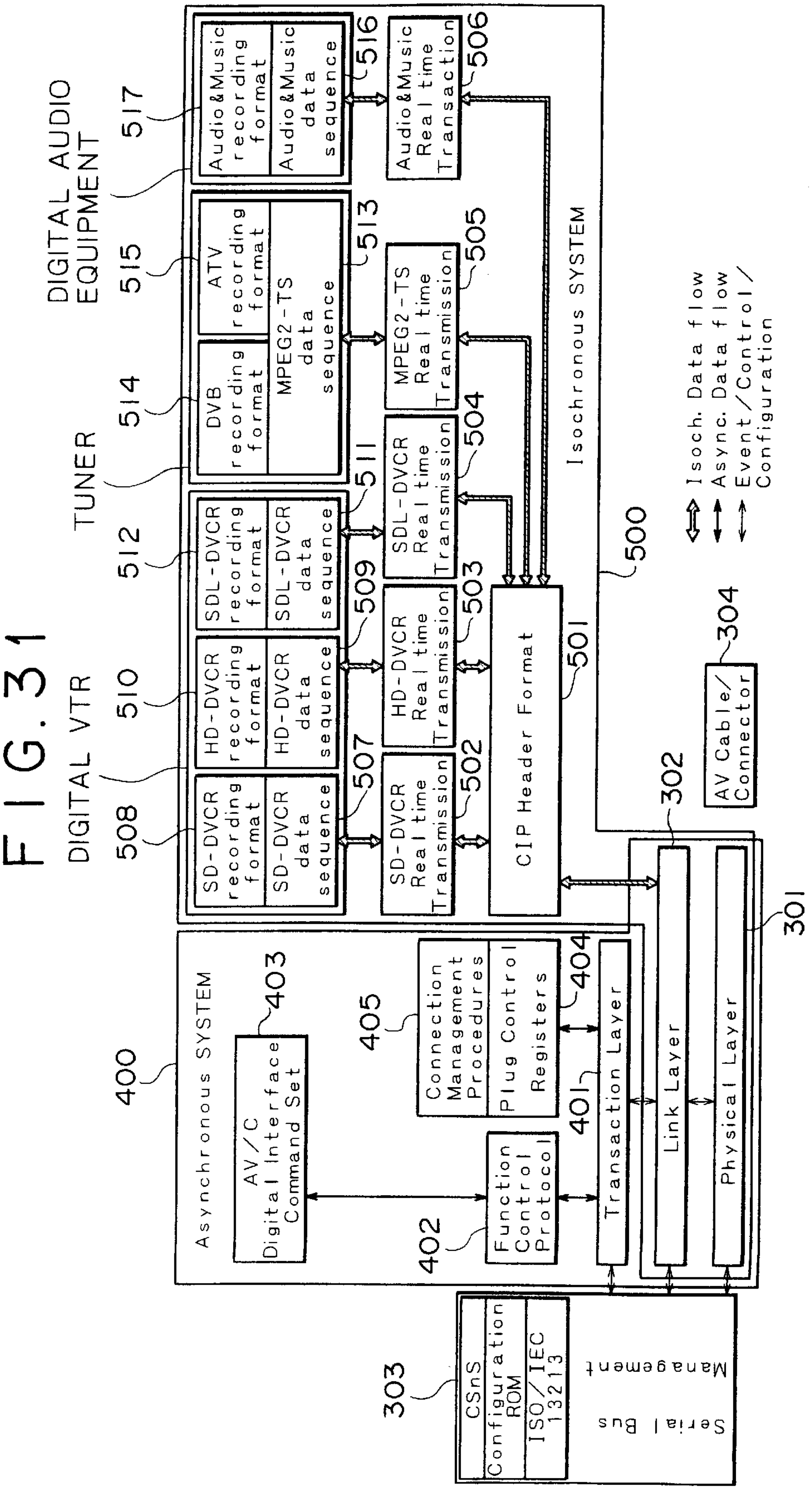
FIG. 31 is a block diagram showing a stack model according to the IEEE1394 specifications.

FIG. 31 is a diagram showing an IEEE1394 stack model for the embodiment.

In the IEEE1394 format, there are 2 large systems, namely, an asynchronous system (400) and an isochronous system (500).

As a layer common to the asynchronous system (400) and the isochronous system (500), a physical layer (301) is provided at the bottom of the stack model. A link layer (302) is provided on the physical layer (301). The physical layer (301) is a hardware layer for implementing transmissions of signals. On the other hand, the link layer (302) is a layer having a function for transforming the IEEE1394 bus into typically an internal bus which is prescribed differently from equipment to equipment.

The physical layer (301), the link layer (302) and a transaction layer (401) to be described next are linked to a serial bus management (303) by an event/control/configuration line.

An AV cable/connector (304) denotes a physical connector and a physical cable for transmission of AV data.

In the asynchronous system (400), the transaction layer (401) is provided on the link layer (302). The transaction layer (401) is a layer for prescribing a data transmission protocol of the IEEE1394. As basic asynchronous transactions, a write transaction, a read transaction and a lock transaction are prescribed.

An FCP (Function Control Protocol) (402) is prescribed for an upper layer of the transaction layer (401). By utilizing control commands prescribed as AV/C commands of an AV/C digital interface command set (403), the FCP (402) allows control of commands for various kinds of AV equipment to be executed.

In addition, for an upper layer of the transaction layer (401), connection management procedures (505) are used to prescribe plug control registers (404) for setting a plug showing logical equipment connection relations in the IEEE1394 as will be described later.

A CIP (Common Isochronous Packet) header format (501) is prescribed above the link layer (302) in the isochronous system (500). Controlled by this CIP header format (501), transmission protocols such as an SD (Standard Density)-DVCR real-time transmission (502), an HD (Hi-Density)-DVCR real-time transmission (503), an SDL (Standard Density Long) -DVCR real-time transmission (504), an MPEG2-TS (Transport System) real-time transmission (505) and an audio and music real-time transmission (506) are prescribed.

The SD-DVCR real-time transmission (502), the HD-DVCR real-time transmission (503) and the SDL-DVCR real-time transmission (504) are data transmission protocols for their respective digital VTRs (Video Tape Recorders).

Data handled by the SD-DVCR real-time transmission (502) is an SD-DVCR data sequence (507) which is obtained in accordance with prescriptions of an SD-DVCR recording format (508).

Data handled by the HD-DVCR real-time transmission (503) is an HD-DVCR data sequence (509) which is obtained in accordance with prescriptions of an HD-DVCR recording format (510).

Data handled by the SDL-DVCR real-time transmission (504) is an SDL-DVCR data sequence (511) which is obtained in accordance with prescriptions of an SD-DVCR recording format (512).

The MPEG2-TS real-time transmission (505) is a transmission protocol for typically a tuner dedicated to digital satellite broadcasting for example. Data handled by the MPEG2-TS real-time transmission (505) is an MPEG2-TS data sequence (513) which is obtained in accordance with prescriptions of a DVB (Digital Video Broadcast) recording format (514) or an ATV recording format (515).

The audio and music real-time transmission (506) is a transmission protocol for general digital audio equipment including the MD system provided by this embodiment. Data handled by the audio and music real-time transmission (506) is an audio and music data sequence (516) which is obtained in accordance with prescriptions of an audio and music recording format (517).

8-3 Packets

Figure 32:
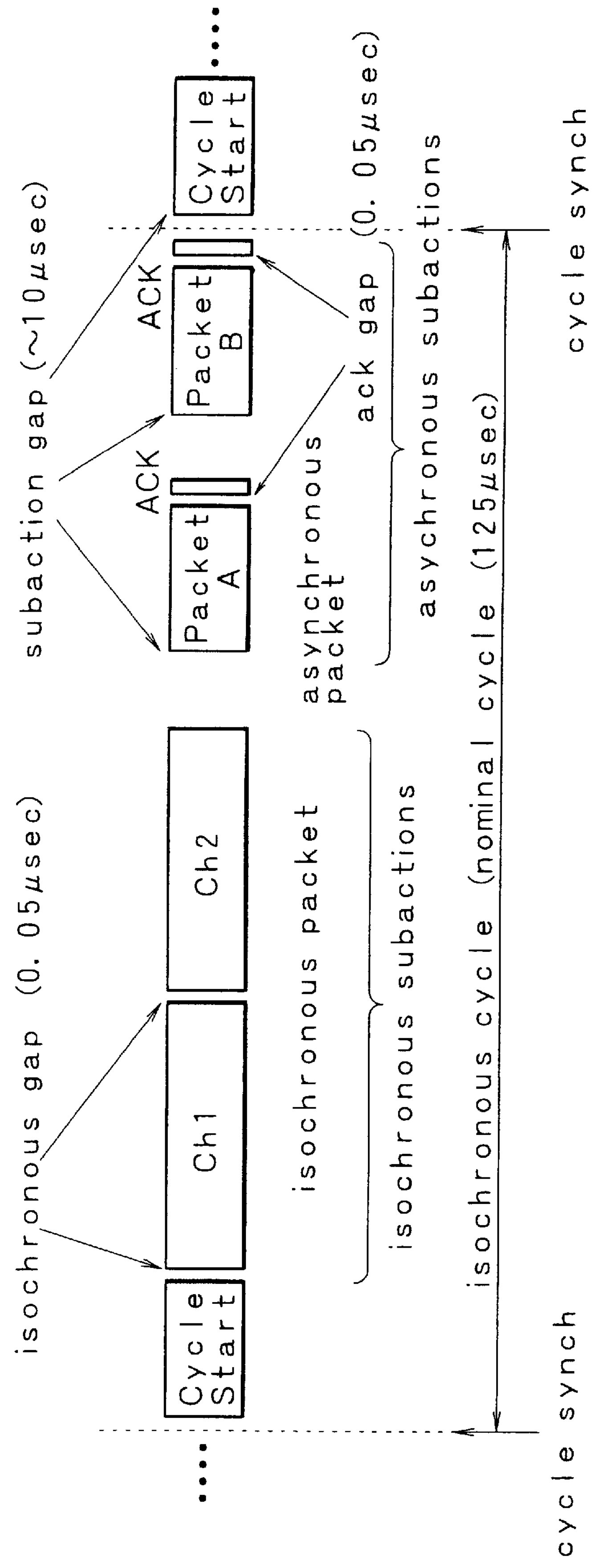
FIG. 32 is a diagram showing a transmission format according to the IEEE1394 specifications.

According to the IEEE1394 format, data is transmitted by repeating the period of an isochronous cycle (nominal cycle) as shown in FIG. 32. In this case, 1 isochronous cycle is 125 microseconds which as a band correspond to 100 MHz. It should be noted that the period of an isochronous cycle can be prescribed as a value other than 125 microseconds. In each isochronous cycle, data is transmitted as packets.

As shown in FIG. 32, an isochronous cycle begins with a cycle start packet for indicating the start of the isochronous cycle.

A detailed explanation of the cycle start packet is omitted. Its generation timing is indicated by a specific apparatus in an IEEE1394 system defined as a cycle master.

The cycle start packet is followed by isochronous packets which are arranged on a priority basis. As shown in the figure, the isochronous packets are transmitted for channels on a time-division basis. Isochronous packets transmitted in this way are called isochronous subactions. A delimiter between 2 consecutive packets in the isochronous subactions is called an isochronous gap which is a pause period of typically 0.05 microseconds.

As such, in the IEEE1394 system, multichannel isochronous data can be transmitted and received by 1 transmission apparatus.

Consider, as an example, transmission of ATRAC data for a mini-disc recorder and player 1 implemented by this embodiment by using the isochronous system. Assume that the normal transfer rate of the ATRAC data is 1.4 Mbps. In this case, for each isochronous cycle of 125 microseconds, if ATRAC data of an amount of at least between 20 and 30 Mbytes is transmitted as isochronous packets, continuity along the time axis is assured.

For instance, when a certain apparatus transmits ATRAC data, a size of the isochronous packet assuring real-time transmission of the ATRAC data is demanded for an IRM (Isochronous Resource Manager) in the IEEE1394 system. It should be noted that a detailed explanation is omitted. In the IRM, the current state of data transmission is monitored to determine whether or not a transmission of data is permitted. If a transmission is permitted, ATRAC data can be transmitted as an isochronous packet by using a specified channel. This is called a band reservation in the IEEE1394 interface.

By using a remaining band in the isochronous cycle in which there are no isochronous subactions, asynchronous subactions or transmissions of asynchronous packets are under way.

FIG. 32 is a diagram showing an example of transmissions of 2 asynchronous packets, namely, packets A and B. Following each of the asynchronous packets, a pause period of 0.05 microseconds is provided. Such a pause period is referred to as an ack gap. During a pause period, a signal called ACK (Acknowledge) is transmitted. As will be described later, the ACK signal is output by hardware on the receiver side (target) to inform a controller on the transmitter side that some asynchronous data has been received during the process of an asynchronous transaction.

Pause periods each referred to as a subaction gap are provided respectively before and after a unit comprising an asynchronous packet and an ACK signal following the asynchronous packet. A subaction gap has a length of about 10 microseconds.

By transmitting ATRAC data as isochronous packets and AUX-data files associated with the ATRAC data as asynchronous packets, the ATRAC data and the AUX-data files appear to be transmitted at the same time.

Assume that ATRAC data and AUX-data files read out from the magnetic optical disc 90 as described earlier with reference to FIGS. 23 to 30 are transmitted by the mini-disc recorder and player 1 to an external apparatus having a function to play back the data and the files. The external apparatus is thus capable of playing back the ATRAC data as an audio signal and displaying the AUX-data files in synchronization with the operation to play back the ATRAC data.

9. Playback Operations for Playback Modes 9-1 System Configuration

As described earlier with reference to FIGS. 23 to 30, the embodiment has a configuration wherein ATRAC data and AUX-data files are read out from the magnetic optical disc 90 to be played back synchronously. As will be described later, the embodiment further has a plurality of playback modes, one of which can be selected in accordance with the type of data to be played back. The mode in which ATRAC data and AUX-data files are played back synchronously is referred to as a basic playback mode.

Before explaining the playback modes of the mini-disc recorder and player 1 implemented by the embodiment, first of all, a typical system configuration of the embodiment is described.

Figure 33:
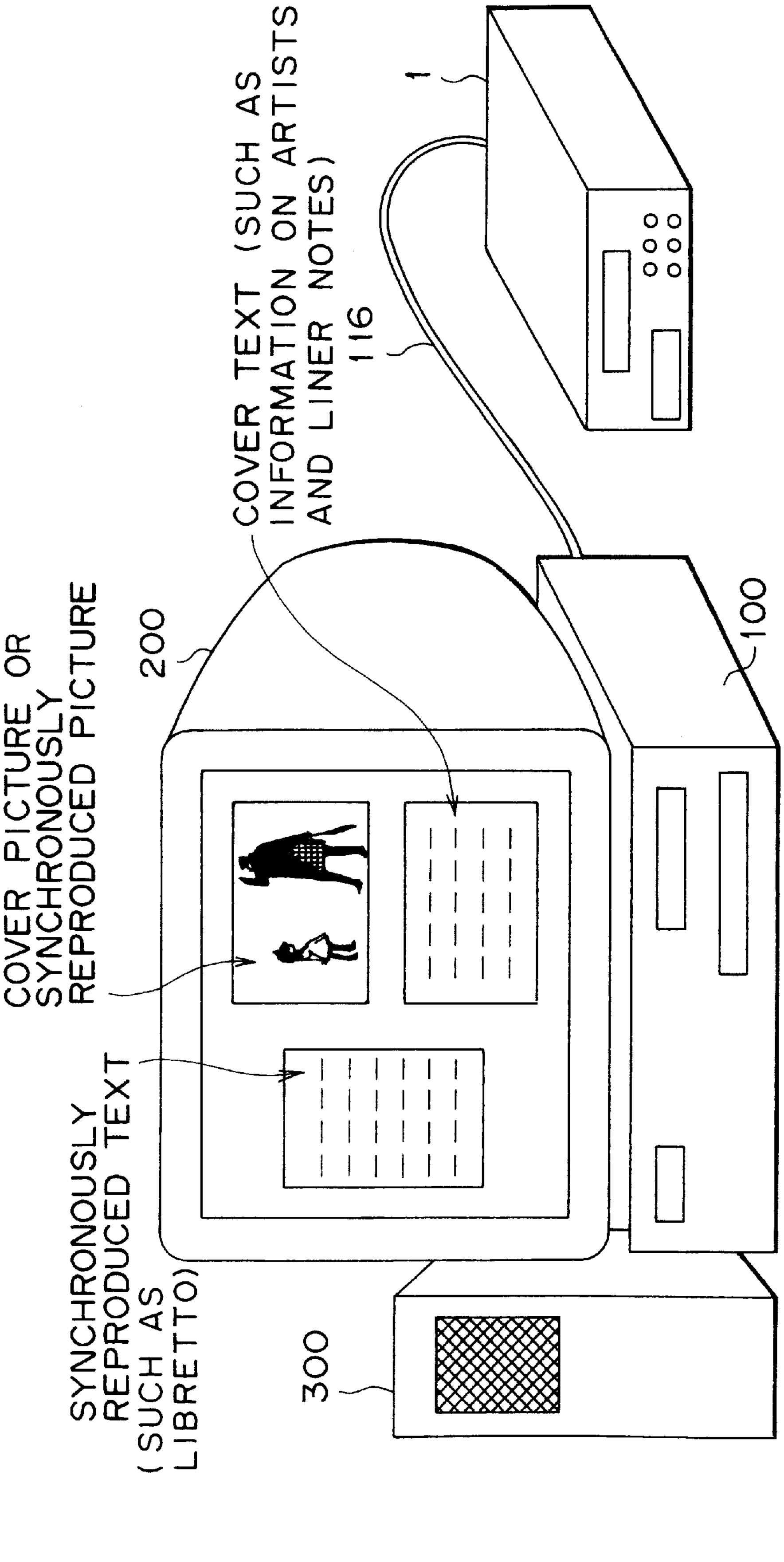
FIG. 33 is a diagram showing an external view of a first embodiment of the present invention.

FIG. 33 is a diagram showing the typical system configuration wherein the mini-disc recorder and player 1 is capable of communicating with an external apparatus through the IEEE1394 interface described earlier. To be more specific, a personal computer 100 serving as the external apparatus is connected to the mini-disc recorder and player 1 by the IEEE1394 bus. The personal computer 100 has a display unit 200 and a speaker 300.

The personal computer 100 receives ATRAC data and AUX-data files which have been played back synchronously by the mini-disc recorder and player 1. The ATRAC data is subjected to a decompression process to be converted into an analog audio signal which is eventually output as a sound by the speaker 300. As for the AUX-data files, in the case of a picture file, a JPEG decoding process is carried out thereon whereas, in the case of a text file, display picture data for its character information is generated and output to the display unit 200 in synchronization with the audio output of the ATRAC data. The functions to receive and play back data reproduced by the mini-disc recorder and player 1 are implemented by typically application software installed in the personal computer.

A display of an AUX-data file played back in synchronization with the ATRAC data appears on the display unit 200. When a synchronous playback operation is carried out by the mini-disc recorder and player 1 in a normal playback mode, for instance, a picture is displayed on the display unit 200 as follows.

Assume for example that a track is specified in the mini-disc recorder and player 1. In this case, if a picture file used for storing a cover picture and a text file used for storing a cover text exist on the magnetic optical disc 90, the cover picture and the cover text are displayed at a stage prior to an operation to play back the ATRAC data.

Then, when the ATRAC data of the specified track is played back as an audio output, AUX-data files are played back in synchronization with the time to play back the track. An example of the AUX-data file is a text file used for storing the libretto of the track. In this case, the libretto is displayed with proper and correct timing. Another example of the AUX-data file played back in synchronization with the time to play back the track is a picture file. In this case, the picture file is displayed with prescribed synchronization-playback timing.

In the case of the system configuration shown in this figure, the way text and picture files are displayed can be changed arbitrarily by typically configuring the application software installed in the personal computer. In addition, the displays of the cover text and the cover picture can be either sustained or ended after the operation to play back the audio data of the track is started.

The system configuration shown in FIG. 33 is suitable for an application wherein the mini-disc recorder and player 1 has a display unit 23 with a small size and has neither speaker nor other peripheral components. In such an application, the operation to output playback ATRAC data to the outside world resorts to a means such as a digital interface or an analog audio output terminal.

Figure 34:
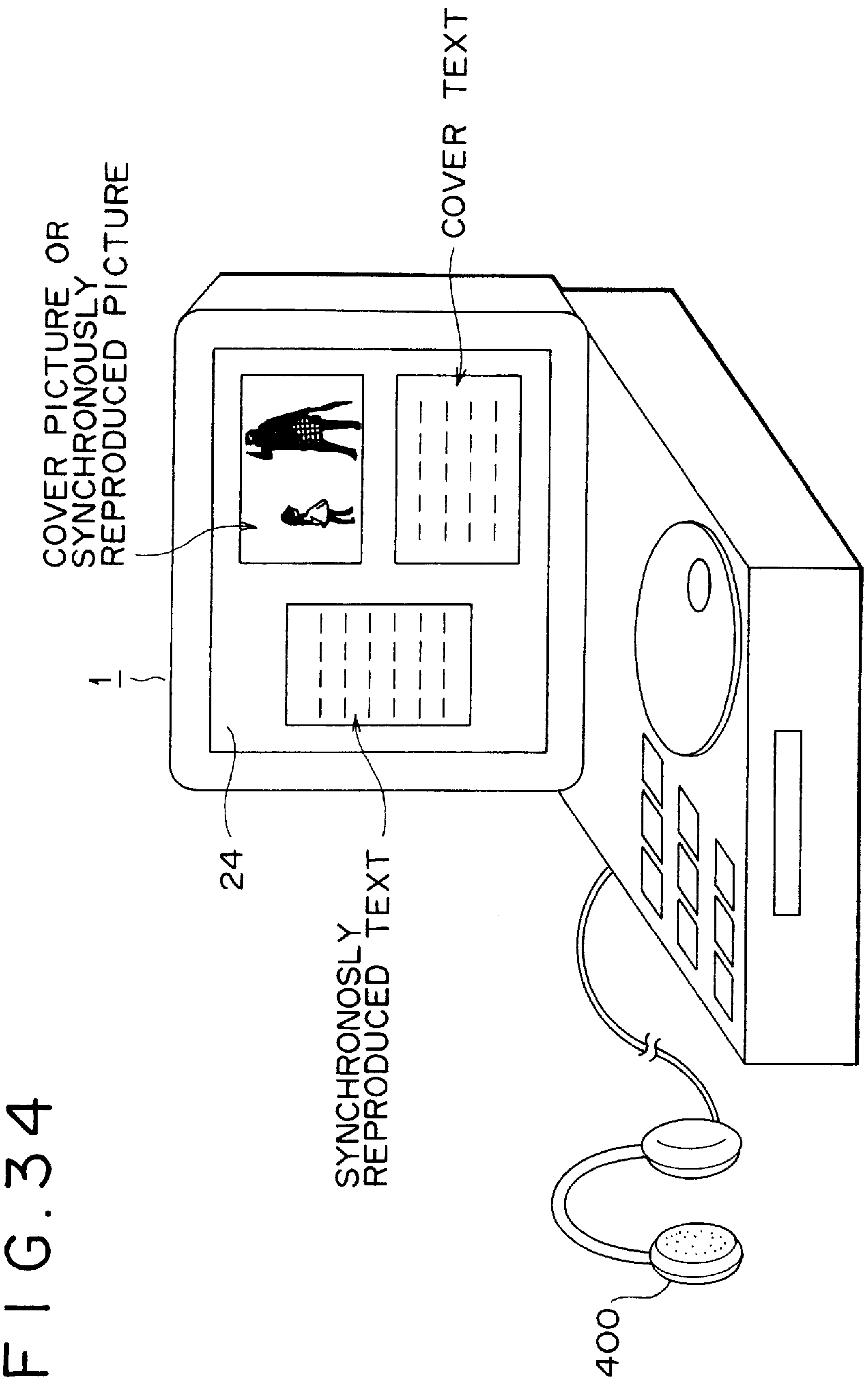
FIG. 34 is a diagram showing an external view of a second embodiment of the present invention.

FIG. 34 is a diagram showing a system configuration of another embodiment comprising the mini-disc recorder and player 1 and the external apparatus built into a single unit.

In such a system configuration, a display unit 24 with a relatively large size is provided for the main unit which includes an operation unit 23 having a variety of operation keys and a disc inserting/discharging unit. An AUX-data file played back from the magnetic optical disc 90 is displayed on the display unit 24. ATRAC data played back from the magnetic optical disc 90 can be heard through a headphone connected to a headphone output terminal provided on the main unit.

The screen of the display unit 24 shown in FIG. 34 also includes AUX-data files which are displayed in the same way as those described earlier with reference to FIG. 33.

It should be noted that a system configuration including the mini-disc recorder and player 1 implemented by the embodiment is not limited to those shown in FIGS. 33 and 34. For example, it is also possible to provide a configuration wherein the mini-disc recorder and player 1 and a monitor unit or an audio apparatus can be connected to each other through an analog audio input/output terminal or an analog video input/output terminal.

9-2 Playback Mode 1

As will be described below, in this embodiment, one of five playback modes, namely, playback mode 1 to playback mode 5, can be selected in dependence on a selection combination of playback objects comprising ATRAC data and AUX-data files which can be text files and picture files. The mini-disc recorder and player 1 then carries out a playback operation in accordance with the selected playback mode. It should be noted that the playback modes are described below by explaining the relevant operations of the system shown in FIG. 33. That is to say, the playback modes are explained on the assumption that ATRAC data and AUX-data files played back from the magnetic optical disc 90 are transmitted through an IEEE1394 bus to the external apparatus.

In addition, the playback modes 1 to 5 are each requested by the user by operating the operation unit 23 or a remote controller 32. That is to say, the operation unit 23 or the remote controller 32 employed in this embodiment has operation keys for selecting one of playback modes 1 to 5 described above.

First of all, playback mode 1 is explained.

Playback mode 1 is a mode for playing back audio data only. When the user desires to listen to audio data only without the need to display AUX data in particular, for example, playback mode 1 is selected.

Figure 35:
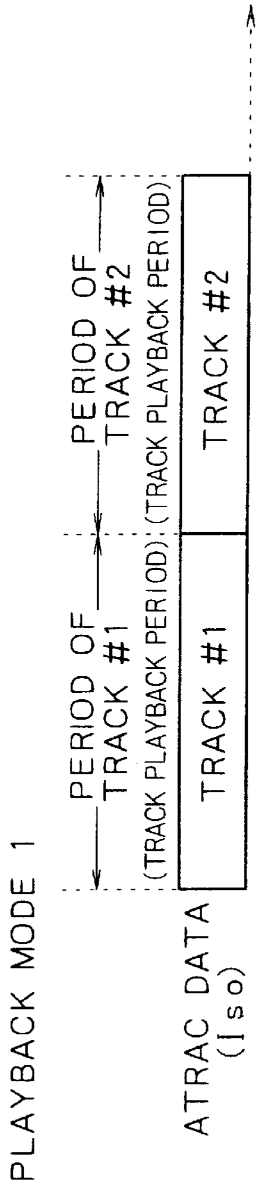
FIG. 35 is a modeling diagram showing an operation to play back only audio data in a first playback mode provided by the present invention.

FIG. 35 is a diagram conceptually showing a playback operation carried out by the mini-disc recorder and player 1 in playback model. The playback operation shown in FIG. 35 almost corresponds to transmission timing to transmit playback data from the IEEE1394 interface to the outside world by way of the IEEE1394 data bus.

The magnetic optical disc 90 serving as a playback object contains 2 recorded tracks, namely, track TR#1 and track TR#2 as ATRAC data. For each of tracks #1 and #2, necessary text files and necessary picture files are prescribed as files to be played back in synchronization with the tracks as seen in the playback modes to be described later. In addition, a cover text and a cover picture are also prescribed. The playback operations described below hold true in the explanation of figures showing playback operations carried out in playback modes 2 to 5 to be described later.

As shown in FIG. 35, in a playback operation carried out after playback mode 1 is selected and set, track TR#1 is played back during a period to play back track TR#1. As the operation to play back the track is finished, track TR#2 is played back during a period to play back track TR#2. In the period to play back track TR#1, ATRAC data is transmitted to the external apparatus by using the isochronous system. That is to say, as described earlier with reference to FIG. 32, ATRAC data is transmitted to the external apparatus by storing them in isochronous packets.

In playback mode 1, AUX data is not read out from the magnetic optical disc 90 in the actual read operation. To put it in detail, in a playback operation carried out in playback mode 1, no access to the AUX-data area of the magnetic optical disc 90 is made to read out an AUX-data file even if the amount of ATRAC data accumulated in the buffer memory 13 exceeds a predetermined value and the operation to read out ATRAC data from the magnetic optical disc 90 is merely suspended.

Depending on the taste of the user, the user may want to listen to audio data only. In this case, the mini-disc recorder and player 1 is operated to carry out an operation to play back AUX-data files along with ATRAC data normally and the user may decide to just turn off the power supply of the display unit for displaying the AUX data or not to watch the display in particular.

In an operation to play back AUX-data files read out data from the magnetic optical disc 90 in synchronization with ATRAC data as described earlier, however, each time when the amount of ATRAC data accumulated in the buffer memory 13 exceeds a predetermined value, the operation to read out ATRAC data from the magnetic optical disc 90 is suspended and the access to the magnetic optical disc 90 is changed from the program area to the AUX-data area. In addition, when the operation to play back ATRAC data from the magnetic optical disc 90 is resumed, the access to the magnetic optical disc 90 is changed from the AUX-data area back to the program area. The change in access to the magnetic optical disc 90 is accompanied by a movement of the optical head 3 which is driven by the sled mechanism. If the sled mechanism operates frequently, mechanical sound will also be generated thereby frequently as well.

Even though the volume of the generated mechanical sound is not that large, the user who attaches importance to the quality of the musical sound will sense the mechanical sound as annoyance.

In order to solve the mechanical-sound problem described above, the embodiment is provided with playback mode 1 for allowing the user to take upon the user itself to listen to audio data only. In playback mode 1, no access to the AUX-data area on the magnetic optical disc 90 is made so that frequent generation of mechanical sounds accompanying movements of the sled mechanism can be suppressed. As a result, a desirable environment is provided to the user who attaches importance to the quality of the musical sound.

9-3 Playback Mode 2

Next, playback mode 2 is explained. In playback mode 2, text files which are each an AUX-data file used for storing a text are played back in synchronization with ATRAC data. That is to say, a picture file which is an AUX-data file used for storing a picture is not played back in playback mode 2.

Figure 36:
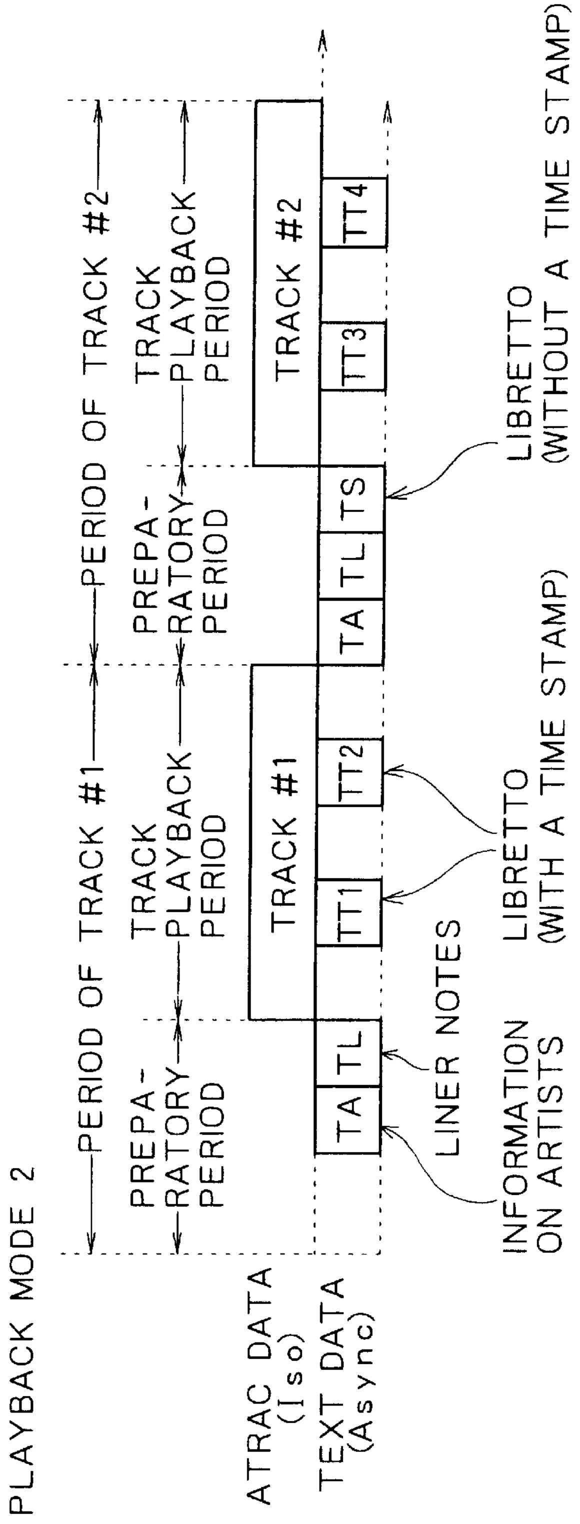
FIG. 36 is a modeling diagram showing an operation to play back audio data and text data in synchronization with the audio data in a second playback mode provided by the present invention.

FIG. 36 is a diagram showing an example of playback timing in playback mode 2 along the playback time axis. It should be noted that, as described earlier, in the case of the format of a text file, a time stamp serving as information on the synchronous playback operation thereof is embedded in the structure of the text file itself. Thus, in order to carry out an operation to synchronously play back a text file, basically, all text files must be read out from the magnetic optical disc 90 and stored into the buffer memory 13 prior to the start of the track playback operation. For this reason, the timing to play back text files shown in FIG. 36 is timing of operations to read out the text files from the buffer memory 13 instead of timing to read out them from the magnetic optical disc 90. As a matter of fact, each timing shown in subsequent figures for other playback operations of text files is timing of operations to read out the text files from the buffer memory 13 instead of timing to read out them from the magnetic optical disc 90.

As shown in FIG. 36, a period of track TR#1 to play back track TR#1 includes a track playback period to actually play back track TR#1 and a preparatory period at a stage prior to the track playback period. In the preparatory period which has a predetermined length, as a cover text, an artist-information text TA is played back to be followed by a liner-note text TL. It should be noted that the playback order shown in the figure is an order in which texts are read out from the buffer memory 13 and transferred to the display unit 24. In spite of the fact that the artist-information text TA and the liner-note text TL are read out sequentially, these texts appear to be displayed at the same time.

The preparatory period is followed by the track playback period. After an operation to play back track TR#1 is started at the beginning of the track playback period, in this example, libretto texts TT1 and TT2 are played back and output sequentially at their respective time stamps as shown in the figure. It should be noted that, in actuality, the libretto text TT1 is displayed typically before an operation to display the libretto text TT2 is started. On the other hand, the libretto text TT2 is displayed typically before the operation to display track TR#1 is ended.

The period of track TR#1 to play back track TR#1 is followed by a period of track TR#2 to play back track TR#2. Much like the period of track TR#1 to play back track TR#1, the period of track TR#2 to play back track TR#2 includes a track playback period to actually play back track TR#2 and a preparatory period at a stage prior to the track playback period. First of all, in the preparatory period, the artist-information text TA is played back to be followed by the liner-note text TL. In this case, a libretto text with no time stamp is further played back as well.

It should be noted that, in this case, the artist-information text TA and the liner-note text TL are not read out again from the magnetic optical disc 90. Instead, the artist-information text TA and the liner-note text TL were read out from the magnetic optical disc 90 and stored in the buffer memory 13 only once to be displayed during the preparatory period of the period of track TR#1. In the preparatory period of the period of track TR#2, the artist-information text TA and the liner-note text TL are again read out from the memory buffer 13 to be played back and transferred to the external apparatus.

Also in the case of the period of track TR#2, the preparatory period is followed by the track playback period. After an operation to play back track TR#2 is started at the beginning of the track playback period, in this example, libretto texts TT3 and TT4 are played back and output sequentially in accordance with the values of their respective time stamps as shown in the figure.

Also in this case, ATRAC data is transmitted and output to the external apparatus by isochronous communication with timing typically almost like the one shown in the figure. On the other hand, data of the text files is transmitted and output to the external apparatus by asynchronous communication with timing typically almost like the one shown in the figure. To be more specific, the data of the text files is transmitted and output to the external apparatus by putting the data in asynchronous packets explained earlier with reference to FIG. 32. To put it in detail, the data of the text files is transmitted to the external apparatus in an asynchronous communication by using an AV/C command (403) in a protocol prescribed by the FCP (402) as shown in FIG. 31.

It should be noted that, for example, the artist-information text TA and the liner-note text TL which are prescribed as cover texts are, strictly speaking, not played back truly in synchronization with the operation to play back track TR#1. In this specification, however, the file of a cover text is prescribed as an AUX-data file to be played back and output with required timing during a track playback operation such as during the preparatory period of the track playback period. Thus, the file of the cover text is also prescribed in the AUX-TOC sector 3 as a file to be played back and output in synchronization with the operation to play back a track. This prescription also applies to the picture file of a cover picture which is played back and output during a preparatory period as will be described later.

9-4 Playback Mode 3

Playback mode 3 is a mode for playing back AUX-data files or, to be more specific, text files and a picture file of a cover picture only, in synchronization with ATRAC data.

Figure 37:
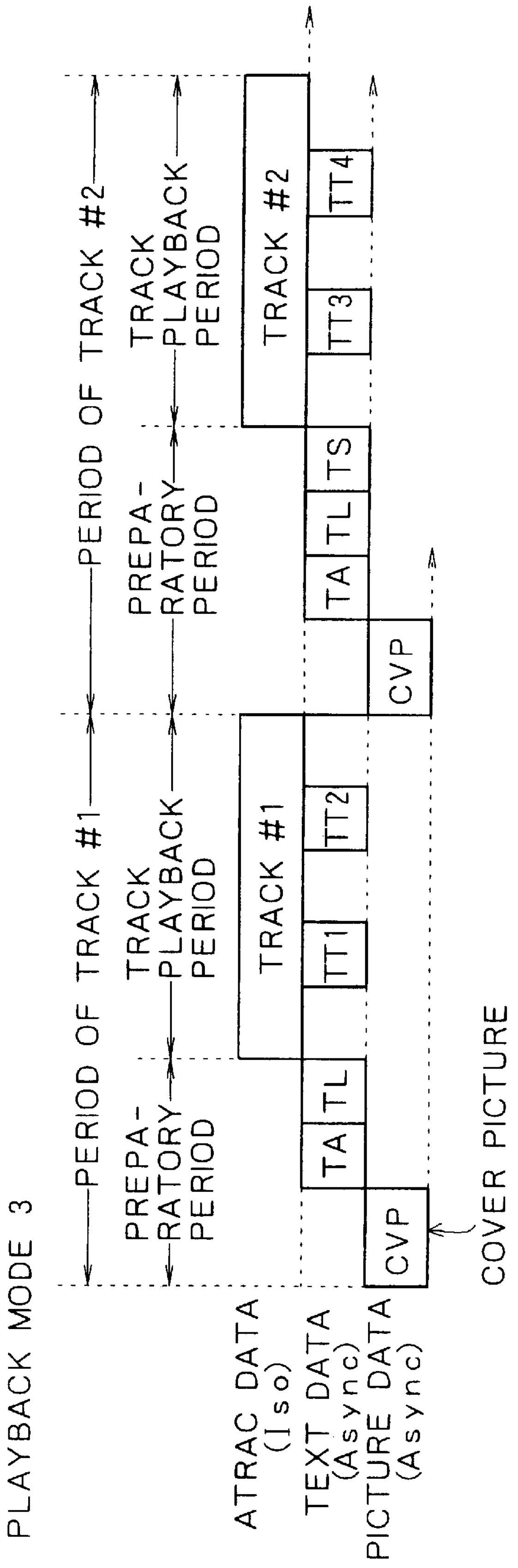
FIG. 37 is a modeling diagram showing an operation to play back audio data as well as text data and a cover picture in synchronization with the audio data in a third playback mode provided by the present invention.

FIG. 37 is a diagram showing an example of typical playback timing of playback mode 3.

In the preparatory period of the period of track TR#1, for example, a cover picture CVP is first of all read out from the magnetic optical disc 90, played back, output and transmitted to the external apparatus as shown in the figure. Then, an artist-information text TA is subsequently played back and output as a cover text to be followed by a liner-note text TL much like the preparatory period of the period of track TR#1 shown in FIG. 36.

The preparatory period is followed by the track playback period. After an operation to play back track TR#1 is started at the beginning of the track playback period, in this example, libretto texts TT1 and TT2 are played back and output sequentially as is the case with the track playback period of the period of track TR#1 shown in FIG. 36.

As the track playback period of track TR#1 is ended, the period of track TR#2 is started. Much like the preparatory period of the period of track TR#1, in the preparatory period of the period of track TR#2, the cover picture CVP is first of all played back, output and transmitted to the external apparatus. Then, the artist-information text TA is subsequently played back and output as a cover text to be followed by the liner-note text TL. In this case, a libretto text TS with no time stamp is further played back as well.

Also in the case of the period of track TR#2, the preparatory period is followed by the track playback period. After an operation to play back track TR#2 is started at the beginning of the track playback period, in this example, libretto texts TT3 and TT4 are played back and output sequentially in accordance with the values of their respective time stamps as shown in the figure.

The transmission of ATRAC data and text files through the IEEE1394 bus to the external apparatus is the same as the example shown in FIG. 36. Data of the picture file which is an AUX-data file is transmitted and output to the external apparatus by asynchronous communication with timing typically almost like the one shown in the FIG. 37. Much like a text file which is also an AUX-data file, data of the picture file is transmitted to the external apparatus by using an AV/C command (403) in a protocol prescribed by the FCP (402).

9-5 Playback Mode 4

Playback mode 4 is a mode for playing back AUX-data files or, to be more specific, text files and picture files, in synchronization with ATRAC data. Playback mode 4 is the normal playback mode of this embodiment.

Figure 38:
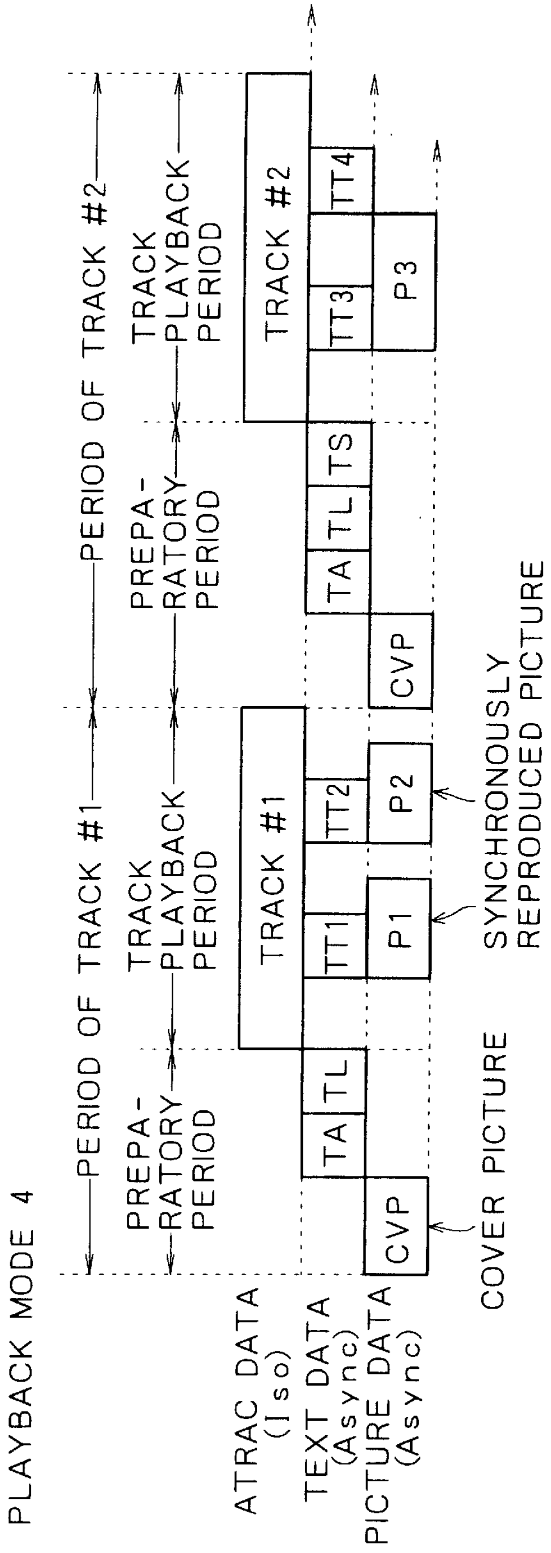
FIG. 38 is a modeling diagram showing an operation to play back audio data and text data as well as picture data in synchronization with the audio data in a fourth playback mode provided by the present invention.

FIG. 38 is a diagram showing an example of typical playback timing of playback mode 4.

Since timing to play back ATRAC data, text data and a cover picture stored in a picture file during the period of track TR#1 is the same as the example shown in FIG. 37, its explanation is not repeated.

After an operation to play back track TR#1 is started at the beginning of the track playback period, in this example, libretto texts TT1 and TT2 are played back and output sequentially in accordance with their respective time stamps as is the case with the track playback period of the period of track TR#1 shown in FIG. 37. In this case, picture files P1 and P2 are played back synchronously and transmitted to the external apparatus with timing like the one shown in the figure in accordance with the contents of the AUX-TOC sector 3.

It should be noted that, in this example, the picture files P1 and P2 are prescribed to be played back with the same timing as the libretto texts TT1 and TT2. To be more specific, the picture file P1 is displayed on the screen at the same time as the libretto text TT1 whereas the picture file P2 is displayed on the screen at the same time as the libretto text TT2.

It is worth noting that, the actual operation carried out by the real mini-disc recorder and player 1 includes an operation to display the libretto text TT1 and the picture file P1 at the same time. In the operation to display the libretto text TT1 and the picture file P1 at the same time, an operation to read out the libretto text TT1 already stored in the buffer memory 13, to display and to output it, and an operation to read out the picture file P1 from the magnetic optical disc 90, to store it into the buffer memory 13, to read out it back from the buffer memory 13, to display and to output it are carried out with proper timing. The same operations are also carried out to display the libretto text TT2 and the picture file P2 at the same time.

A playback operation carried out during the preparatory period of the period of track TR#2 following the period of track TR#1 is carried out in the same way as the example shown in FIG. 37. During this preparatory period, a cover picture CVP read out from the buffer memory 13 is played back and transmitted to the external apparatus. Then, an artist-information text TA, a liner-note text TL and a libretto text TS with no time stamp are played back and transmitted to the external apparatus.

Also in the case of the period of track TR#2, the preparatory period is followed by the track playback period. After an operation to play back track TR#2 is started at the beginning of the track playback period, also in this example, libretto texts TT3 and TT4 are played back and output sequentially in accordance with the values of their respective time stamps. In this example, a picture file P3 is further played back synchronously and transferred to the external apparatus with timing like the one shown in the figure in accordance with the contents of the AUX-TOC sector 3.

It should be noted that, in this example, the picture file P3 is prescribed to be displayed with the same timing as the libretto text TT3 in the period to play back the track TR#2.

In this example, various kinds of data can be transmitted to the external apparatus through the IEEE1394 in the same way as what has been explained with reference to FIG. 37. To be more specific, ATRAC data is transmitted to the external apparatus by using the isochronous communication system while text data and picture files are transmitted to the external apparatus by using the asynchronous communication system.

In this case, however, there are files to be displayed at the same time as text and picture files which are to be played back synchronously. Examples of such files are the libretto text TT1 and the picture file P1. In an operation to transmit the libretto text TT1 and the picture file P1 to the external apparatus through the IEEE1394 bus, the libretto text TT1 and the picture file P1 are transmitted on the time-division basis by using asynchronous packets with timing meeting required timing to start the operation to display the libretto text TT1 and the picture file P1. Such data transmission applies to subsequent files such as the libretto text TT2, the picture file P2, the libretto text TT3 and the picture file P3.

9-6 Playback Mode 5

Playback mode 5 is a mode for playing back and outputting picture files only with synchronous-playback timing prescribed in the AUX-TOC sector 3.

Figure 39:
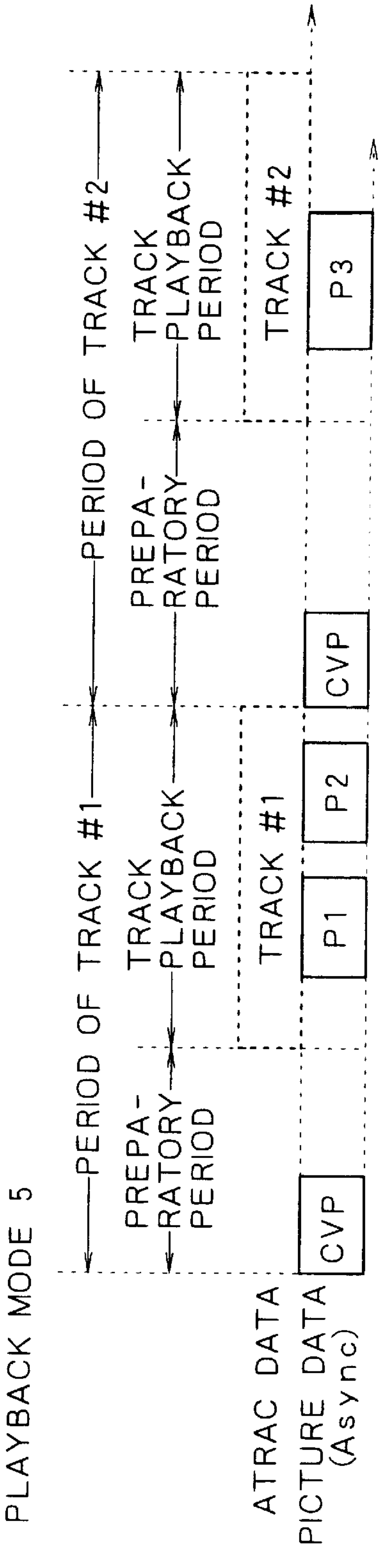
FIG. 39 is a modeling diagram showing an operation to play back only picture data in a fifth playback mode provided by the present invention.

FIG. 39 is a diagram showing an example of playback timing of playback mode 5 along the time axis. The figure also shows timing to play back and output ATRAC data in terms of broken lines only for a purpose of comparison with the playback timing of picture files. It should be noted, however, that the ATRAC data itself is not actually played back.

The timing to output picture files shown in this figure is the same as the timing to output picture files shown in FIG. 38. To be more specific, in a period corresponding to the preparatory period of the period of track TR#1, the cover picture CVP is read out from the magnetic optical disc 90 and stored in the buffer memory 13 to be played back and output in advance. Then, in a period corresponding to the track playback period to play back track TR#l, the picture file P1 is read out from the magnetic optical disc 90 and stored in the buffer memory 13 to be played back and output with timing prescribed in the AUX-TOC sector 3 and, then, the picture file P2 is read out from the magnetic optical disc 90 and stored in the buffer memory 13 to be played back and output with timing also prescribed in the AUX-TOC sector 3.

The period of track TR#1 is followed by a period of track TR#2. In the preparatory period of the period of track TR#2, the cover picture CVP is read out from the buffer memory 13, played back and output. The preparatory period is followed by a track playback period in which the picture file P3 is read out from the magnetic optical disc 90 and stored in the buffer memory 13 to be played back and output with timing also prescribed in the AUX-TOC sector 3.

Then, the picture files are transmitted to the external apparatus through the IEEE1394 bus by using the asynchronous communication system with approximately timing like the one shown in the figure.

It should be noted that, in the periods to play back and output the picture files, ATRAC data of tracks TR#1 and TR#2 is not read out from the magnetic optical disc 90, played back and output as described above. That is to say, in this mode, the optical head 3 accesses only the AUX-data area on the magnetic optical disc 90, making no access to the program area thereon. As a result, in this case, it is possible to suppress the frequency of generation of mechanical sounds by the sled mechanism accompanying movements thereof in comparison with a mode in which ATRAC data and AUX-data files are played back synchronously.

In addition, there are some other conceivable ways to play back only picture files in addition to playback mode 5 in which picture files are played back and output with prescribed synchronous-playback timing.

For example, ignoring the synchronous-playback timing with respect to ATRAC data, it is conceivable to display picture files recorded on the magnetic optical disc 90 each for a fixed period of time in a predetermined order. The display order can be the synchronous playback order according to the AUX-TOC sector 3 or the file-number order.

In addition, it is also possible to set a playback mode to play back only text files besides the playback modes described above. As ways to play back text files in this playback mode, there are some techniques which conform to the method of playing back text files described above.

9-7 Processing Operations

Figure 40:
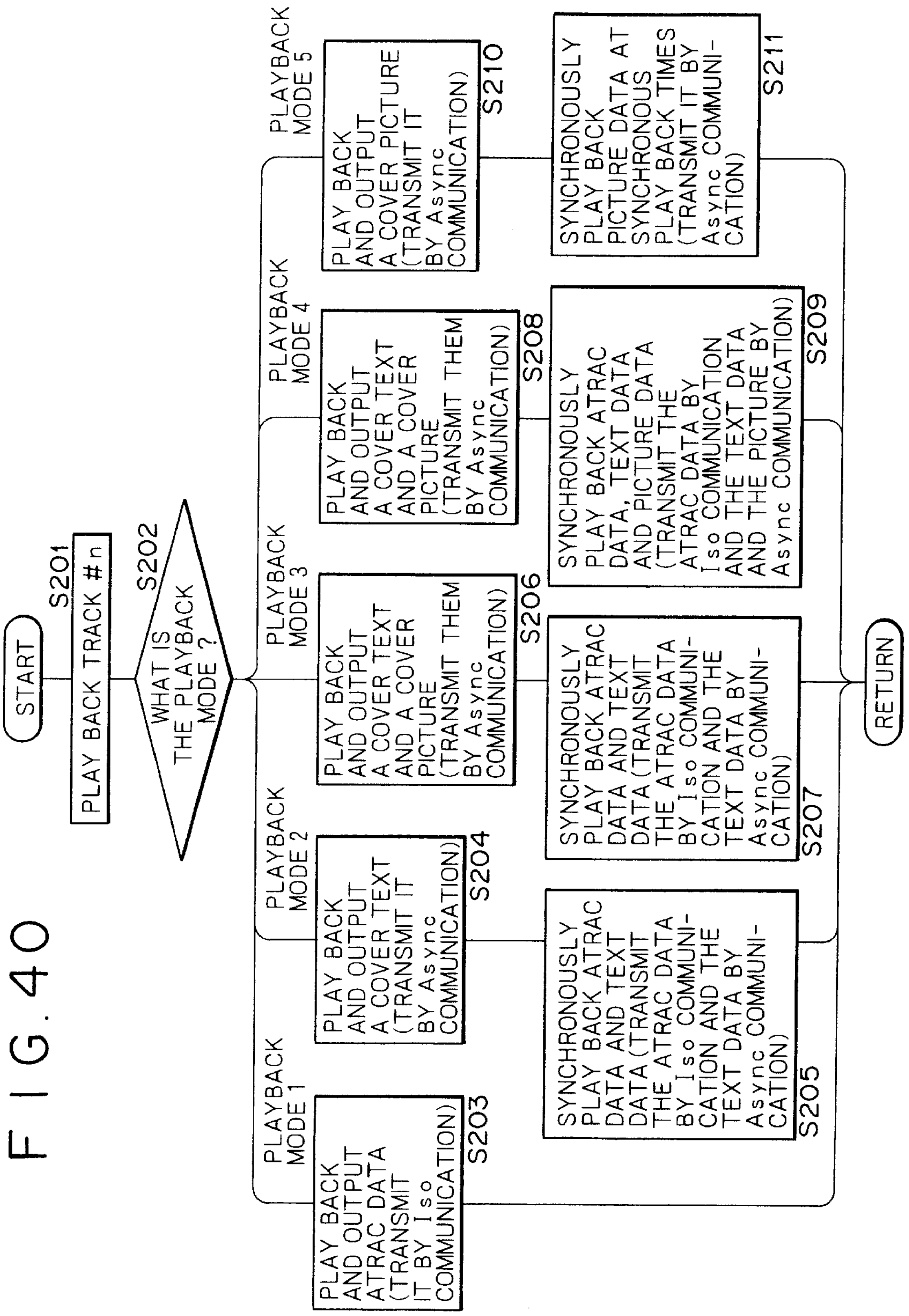
FIG. 40 shows a flowchart representing processing carried out in a variety of playback modes.

The following description explains processing to implement operations to play back data from the magnetic optical disc 90 in accordance with the playback modes with reference to a flowchart shown in FIG. 40. That is to say, the following description explains processing to implement operations to transmit the playback data to the external apparatus through the IEEE1394 bus as described earlier with reference to FIGS. 35 to 39. It should be noted that the processing is carried out by the system controller 11.

The processing is carried out in one of playback modes 1 to 5 selected arbitrarily by the user by carrying a predetermined operation on the operation unit 23 or the remote controller 32 in the course of execution of the processing. Explanation of details of the operation procedure is omitted. The user is capable of specifying a playback mode in accordance with a procedure set in common to all tracks to be played back. As a conceivable alternative, the user is capable of specifying any arbitrary playback modes varying from track to track in accordance with an operation procedure like one for playing back a program.

In addition, the system controller 11 is made capable of referencing the time stamp of each text file read out from the magnetic optical disc 90 and stored in the buffer memory 13. The time stamp of a text file is information used for controlling the synchronous playback operation of the text file.

As shown in FIG. 40, the flowchart begins with a step S201 to play back track #n when the user starts a playback operation or the operation to play back a current track is completed to be followed by an operation to play back another track.

The flow of the processing then goes on to a step S202 to determine what playback mode is specified currently before carrying out processing in the specified playback mode.

If playback mode 1 is specified at the step S202, the flow of the processing proceeds to a step S203. At the step S203, the optical head 3 and the signal processing block are controlled to play back and output ATRAC data only as explained earlier with reference to FIG. 35. In order to assure the time-axis continuity of the reproduced ATRAC data, control is also executed to transmit the data to an external apparatus through the IEEE1394 bus by using isochronous packets. The transmission of ATRAC data is typically accomplished by necessary operations carried out by the IEEE1394 interface unit 25 under the control executed by the system controller 11.

The processing carried out at the step S203 corresponds to processing performed in the playback period of 1 track. That is to say, the processing carried out at the step S203 corresponds to the processing performed in the period of track TR#1 or TR#2 shown in FIG. 35.

If playback mode 2 is specified at the step S202, the flow of the processing proceeds to a step S204.

The processing carried out at the step S204 corresponds to processing performed in the preparatory period of the playback period of track #n. In the case of the example shown in FIG. 36, for instance, the processing carried out at the step S204 corresponds to processing performed in the preparatory period of the playback period of track TR#1 or TR#2. At the step S204, text files each prescribed as a cover text such as information on the artist or liner notes are read out from the buffer memory 13 to be played back and output. In some cases, the cover text is transmitted to an external apparatus through the IEEE1394 bus 116 by using asynchronous packets. In these cases, the IEEE1394 interface unit 25 is controlled to transmit the text to an external apparatus.

After the processing of the step S204 is finished, the flow of the processing goes on to a step S205.

The processing carried out at the step S205 corresponds to processing performed in the track playback period of track #n. In the case of the example shown in FIG. 36, for instance, the processing carried out at the step S205 corresponds to processing performed in the track playback period of track TR#1 or TR#2.

At the step S205, ATRAC data is played back and output by assuring continuity along the time axis and, at the same time, control is executed to read out, reproduce and output text files to be played back synchronously from the buffer remory 13 in accordance with the values of their respective time stamps.

In addition, the reproduced and output ATRAC data is transmitted to an external apparatus by using isochronous packets whereas the reproduced and output text files are transmitted to an external apparatus by using asynchronous packets.

At the steps S204 and S205, processing in the period of 1 period, namely, track #n, in playback mode 2 is carried out and completed.

If playback mode 3 is specified at the step S202, the flow of the processing proceeds to a step S206.

The processing carried out at the step S206 corresponds to processing performed in the preparatory period of the playback period of track #n. At the step S206, control is executed to read out text files each prescribed as a cover text which is prescribed as a cover picture from the magnetic optical disc 90, store them into the buffer memory 13 and then play back and output the text files stored in the buffer memory 13 much like the preparatory period of the period of track TR#1 shown in FIG. 37. There is a case, however, that the processing is similar to that carried out in the preparatory period of the period of track TR#2, that is to say, a cover picture already stored in the buffer memory 13 during the preparatory period of the period of track TR#1 is not read out again from the magnetic optical disc 90. Such a cover picture is merely read out from the buffer memory 13 to be played back and output.

Furthermore, at the step S206, in addition to the operation to play back and output the cover picture, a text file prescribed as a cover text is also read out from the buffer memory 13 to be played back and output.

In case it is necessary to transmit the cover text and the cover picture to an external apparatus as playback outputs through the IEEE1394 bus, control is also executed to transmit their files to the external apparatus by using asynchronous packets.

The flow of the processing then continues from the step S206 to a step S207 at which operations in the track playback period are carried out in playback mode 3. Since the processing carried out at the step S207 is the same as the processing performed at the step S205, its explanation is not repeated.

If playback mode 4 is specified at the step S202, the flow of the processing proceeds to a step S208.

The processing carried out at the step S208 corresponds to processing performed in the preparatory period of the playback period of track #n in playback mode 4. Since the processing carried out at the step S208 is the same as the processing performed at the step S206, its explanation is not repeated.

The flow of the processing then continues from the step S208 to a step S209 at which operations in the track playback period are carried out in playback mode 4. In the case of the example shown in FIG. 38, the processing in the track playback period of track TR#1 or TR#2 is carried out.

At the step S209, control is executed to play back picture files in synchronization with ATRAC data, entailing operations to read out them from the magnetic optical disc 90 as explained earlier with reference to FIGS. 23 to 30. Concurrently with this control, control is executed to read out, reproduce and output text files to be played back synchronously from the buffer memory 13 in accordance with their respective time stamps. Thus, at the step S209, text and picture files are played back and output in synchronization with the operation to play back the track.

In addition, in the processing carried out at the step S209, in order to sustain continuity along the time axis, control is executed to transmit the ATRAC data to the external apparatus by using isochronous packets while transmit the data of the text and picture files to the external apparatus by using asynchronous packets with proper timing so that these files can be played back synchronously at the external apparatus.

Finally, if playback mode 5 is specified at the step S202, the flow of the processing proceeds to a step S210.

The processing carried out at the step S210 corresponds to processing performed in the preparatory period shown in FIG. 39. To be more specific, control is executed to play back a picture file used for storing a cover picture. Assume that the picture file used for storing a cover picture has not been stored in the buffer memory 13 at a stage prior to the preparatory period of the period of track TR#1 shown in FIG. 39. In this case, control is executed to read out the picture file used for storing a cover picture from the magnetic optical disc 90, store the picture file into the buffer memory 13 and read out the cover picture back from the buffer memory 13 to be played back and output. If the picture file used for storing a cover picture has been stored in the buffer memory 13 as is the case with the preparatory period of the period of track TR#2 shown in FIG. 39, on the other hand, control is executed to merely read out the cover picture from the buffer memory 13 to be played back and output.

The flow of the processing then goes on to a step S211 to execute control to read out only picture files from the magnetic optical disc 90 in accordance with the contents of the AUX-TOC sector 3, store the files into the buffer memory 13, read out the picture files back from the buffer memory 13 to be played back and output in synchronization with an operation to play back actual ATRAC data along the time axis. At that time, however, ATRAC data is not read out from the magnetic optical disc 90 as described earlier. In addition, time control of playback output timing at that time is executed typically by the system controller 11 which converts an offset address recorded in the AUX-TOC sector 3 into a time and uses a time computed by a timer provided internally as a reference.

In addition, at the step S211, control is executed to transmit picture data played back and output as described above to an external apparatus by using asynchronous packets so that the external apparatus is capable of obtaining playback output timing according to the contents of the AUX-TOC sector 3.

When the processing carried out at the step S203, S205, S207, S209 or S211 in playback mode 1, 2, 3, 4 or 5 respectively for 1 track playback period is finished, the processing once gets out of the routine shown in this figure to return again to the step S201. It should be noted that at a stage of returning to the step S201, the value n (not shown in the figure) representing a track number is updated to the number of a track to be played back next. In this way, tracks are played back sequentially one after another in a playback mode specified for each of the tracks.

By the way, in the transmission of various kinds of data such as ATRAC data, text files and picture files to an external apparatus through the IEEE1394 bus, a transmission channel can be specified for ATRAC data which is transmitted to a specific external apparatus by using the isochronous communication system so that the ATRAC data is transmitted only to the specific external apparatus. On the other hand, a plug can be set for each of text and picture files transmitted to a specific external apparatus by using the asynchronous communication system so that the file can be transmitted only to the specific external apparatus. In addition, a channel in the isochronous communication system and a plug in the asynchronous communication system can be set independently of each other. Also in the asynchronous communication, a plug set for a text file may be different from a plug set for a picture file. Explanation of details of the channel and plug transmissions is omitted.

Thus, at the steps S205 and S207, ATRAC data and data of a text file can be transmitted through the IEEE1394 bus to specified external apparatuses which are different from each other. By the same token, in the processing carried out at the step S209, ATRAC data, data of a text file and data of a picture file can be transmitted to specified external apparatuses which are different from each other.

For example, ATRAC data can be transmitted typically to a high-sound-quality audio apparatus for outputting an audio signal whereas data of text and picture files can be transmitted to a high-picture-quality monitor unit to be displayed thereon.

It should be noted that the explanation of the playback modes with reference to FIGS. 35 to 39 and the processing represented by the flowchart shown in FIG. 40 also hold true of the configuration of a complete system comprising a standalone mini-disc recorder and player 1 like the one shown in FIG. 34. In this case, however, the standalone mini-disc recorder and player 1 has a configuration wherein ATRAC data and AUX data are not transmitted to an external apparatus through the IEEE1394 bus. Instead, control is executed to convert ATRAC data to be played back and output into an analog audio signal which is then output to typically a headphone output terminal. On the other hand, control is executed to carry out a decoding process to convert an AUX-data file to be played back and output into a picture signal so that the AUX-data file can be displayed on the display unit 24.

In addition, the scope of the present invention is not limited to the configurations described above. A variety of changes and modifications can be made to the configurations. For example, even though the embodiment has been exemplified by a mini-disc recorder and player 1 serving as a playback apparatus, the present invention can of course be applied to a special-purposed playback apparatus for only playing back a mini disc as well.

Moreover, the present invention can also be applied to an apparatus, which is capable of at least playing back a disc-shaped recording medium used for recording programs as main data and data files as sub-data associated with the main data, other than a mini-disc system.

Furthermore, programs or main data are not limited to audio data whereas AUX-data files are not limited to text files or still-picture files. For example, as a conceivable alternative, a program or main data can be a moving-picture or video source while text files and still-picture files are prescribed as sub data. As another conceivable alternative, a data file for storing a moving picture with a predetermined format can be prescribed as sub data associated with audio data used as main data.

On the top of that, the present invention can also be applied to a communication format with a communication mode for transmitting data periodically coexisting with a communication mode for communicating data asynchronously besides the IEEE1394 format.

As described above, the present invention allows at least a playback mode to play back and output both main data and sub data or a playback mode to play back only main data to be selected for a playback apparatus capable of carrying out synchronous playback operations based on synchronous-playback control information stored in the AUX-TOC to play back typically programs of audio data recorded on a magnetic optical disc as main data and AUX-data files such as text-data files and picture-data files recorded on the disc as sub data associated with the main data.

Thus, in the first place, the user is allowed to select a normal playback mode to play back and output at least audio data and data file in synchronization with the main data and a playback mode to play back only audio data in accordance with the user's desire. That is to say, from the amusement point of view, the user is given a higher level of freedom to select a playback mode.

From the functional point of view as a playback apparatus, with the playback mode to play back only main data selected to carry out a playback operation, an access to only the audio-data area on the disc is made to read out audio data, and the sub-data area on the disc is not accessed. For this reason, the frequency to move the optical head by using the sled mechanism is low and the frequency of generation of mechanical sounds by movements of the sled mechanism is also low in comparison with the normal playback mode to play back and output main data and sub data in synchronization with the main data. In other words, the frequency of generation of peripheral noise at an audio listening time is low as well. For a listener who attaches importance to the quality of the musical sound, for example, the audio listening environment is better.

In addition, the present invention provides a configuration wherein, besides the playback mode to play back sub data only, it is also possible to select a playback mode to play back audio data recorded as main data and only character-information files recorded as sub data or a playback mode to play back audio data recorded as main data and only picture-data files recorded as sub data. Thus, since a variety of ways to play back main data and sub data are provided, the object of the present invention in the amusement aspect can be achieved.

In addition, as a configuration allowing a variety of playback modes to play back main data and sub data to be selected, the present invention provides a configuration wherein data can be transferred to an external apparatus through a data bus conforming typically to the IEEE1394 specifications. Thus, it is possible to carry out operations such as playing back an audio signal and displaying a picture by using, among other external apparatuses, a personal computer, a digital audio apparatus and a monitor unit. Also in this respect, various kinds of amusement are offered.

Furthermore, in the transmission of data through a data bus conforming typically to the IEEE1394 specifications, audio data recorded as main data is transmitted by using the isochronous communication system (a first communication system) to assure the continuity of the audio data along the time axis while sub data is transmitted by using the asynchronous communication system (the second communication system) so that the data communication processing and the configuration of hardware can be made simple.

Given a playback apparatus capable of playing back programs such as audio data recorded as main data and data files of character information and pictures recorded as sub data associated with the main data, improvements in the amusement and functional aspects are provided to the user, making it possible to take advantage of the peculiarity of the fact that both main data and sub data are playback objects as effectively as possible.

What is claimed is:

1. A playback apparatus for carrying out playback operations on a disc-shaped recording medium comprising:

a main-data area for recording main data;

a main-data management area for recording main-data management data for controlling said main data;

a sub-data area for recording sub-data associated with said main data; and a sub-data management area for recording sub-data management data for controlling said sub-data, said playback apparatus comprising:

a playback means for playing back said main data from said main-data area in accordance with said main-data management data recorded in said main-data management area and for playing back said sub-data from said sub-data area in accordance with said sub-data management data recorded in said sub-data management area;

a transport means for transporting said playback means in a radial direction of said disc-shaped recording medium;

a memory means for storing at least one of said main data and said sub-data played back by said playback means;

a control means for controlling said transport means to transport said playback means to at least one of said main-data area for recording said main data during a period to read out said sub-data and said sub-data area for recording said sub-data during a period to read out said main-data; and an operation means for specifying a first playback mode to play back said main data and said sub-data synchronously or a second playback mode to play back at least one of said main data and said sub-data, wherein said control means inhibits transportation of said playback means by said transport means between said main-data area and said sub-data area when said second playback mode is specified by said operations means.

2. A playback apparatus according to claim 1 wherein said main data is audio data and said sub-data is character data associated with said audio data.

3. A playback apparatus according to claim 1 wherein said main data is audio data and said sub-data is picture data associated with said audio data.

4. A playback apparatus according to claim 1 wherein said main data is audio data and said sub-data is picture data for said disc-shaped recording medium.

5. A playback apparatus according to claim 1 wherein said main data is audio data and said sub-data is character data and picture data associated with said audio data.

6. A playback apparatus according to claim 5 wherein said operation means can be used for further specifying a third playback mode to play back said main data and said character data synchronously or a fourth playback mode to play back said main data, said character data and said picture data synchronously.

7. A playback apparatus for carrying out playback operations on a disc-shaped recording medium comprising:

a main-data area for recording main data;

a main-data management area for recording main-data management data for controlling said main data;

a sub-data area for recording sub-data comprising text data and still-picture data associated with said main data; and a sub-data management area for recording sub-data management data for controlling said sub-data, said playback apparatus comprising:

a playback means for playing back data from said main-data area, said main-data management area, said sub-data area and said sub-data management area;

an operation means for specifying:

a first playback mode to play back said main data only;

a second playback mode to synchronously play back said main data and said text data associated with said main data;

a third playback mode to synchronously play back said main data, said text data and said still-picture associated with said main data; or a fourth playback mode to play back said still-picture data only; and a transport control means for transporting said playback means in a radial direction of said disc-shaped recording medium in accordance with a playback mode selected by said operation means.

* * * * *